US011348067B2

(12) United States Patent
Schoening

(10) Patent No.: US 11,348,067 B2
(45) Date of Patent: May 31, 2022

(54) RFID-BASED INVENTORY TRACKING SYSTEM

(71) Applicant: A-1 PACKAGING SOLUTIONS, INC., St. Charles, IL (US)

(72) Inventor: Kenneth F. Schoening, St. Charles, IL (US)

(73) Assignee: A-1 PACKAGING SOLUTIONS, INC., St. Charles, IL (US)

(*) Notice: Subject to any disclaimer, the term of this patent is extended or adjusted under 35 U.S.C. 154(b) by 223 days.

(21) Appl. No.: 16/855,636

(22) Filed: Apr. 22, 2020

(65) Prior Publication Data

US 2020/0250610 A1 Aug. 6, 2020

Related U.S. Application Data

(63) Continuation-in-part of application No. 16/370,742, filed on Mar. 29, 2019, now Pat. No. 11,023,851.
(Continued)

(51) Int. Cl.
*G06Q 10/08* (2012.01)
*G06K 7/10* (2006.01)
*G06K 19/077* (2006.01)

(52) U.S. Cl.
CPC ....... *G06Q 10/087* (2013.01); *G06K 7/10366* (2013.01); *G06K 19/07773* (2013.01)

(58) Field of Classification Search
CPC ............. G06Q 10/087; G06Q 10/0833; G06K 7/10336; G06K 7/10386
(Continued)

(56) References Cited

U.S. PATENT DOCUMENTS 5,832,814 A 11/1998 Nakatani
6,600,418 B2 7/2003 Francis et al.
(Continued)

FOREIGN PATENT DOCUMENTS

JP 2856242 B2 2/1999
JP 2008-006516 1/2008
(Continued)

OTHER PUBLICATIONS

International Search Report and Written Opinion issued in PCT Patent Application Publication No. PCT/US2020/029308 dated Aug. 10, 2020.
(Continued)

*Primary Examiner* — Paultep Savusdiphol
(74) *Attorney, Agent, or Firm* — Marshall, Gerstein & Borun LLP

(57) ABSTRACT

An asset management and tracking system for use in a facility having a product designation RFID tag having product information is attached to a product and at least one location designation RFID tag having location information. The system includes a RFID reader and a portable communication device. The RFID reader reads at least one of the product designation RFID tag and the at least one location designation RFID tag and the portable communication device receives product information from and transmits product information to an asset tracking and management device. The RFID reader transmits product information read from the product designation RFID tag and the location information read from the location designation RFID tags to the portable communication device. The portable communication device, in turn, transmits the received product information and location information to the asset tracking device and queries the asset tracking device for additional product and location information.

64 Claims, 22 Drawing Sheets

Related U.S. Application Data

(60) Provisional application No. 62/837,138, filed on Apr. 22, 2019, provisional application No. 62/650,894, filed on Mar. 30, 2018.

(58) Field of Classification Search
USPC .................................................. 235/375, 385
See application file for complete search history.

(56) References Cited

U.S. PATENT DOCUMENTS

| | | |
|---|---|---|
| 6,661,278 B1 | 12/2003 | Gilliland |
| 6,664,909 B1 | 12/2003 | Hyde et al. |
| 6,842,327 B1 | 1/2005 | Diorio et al. |
| 6,853,583 B2 | 2/2005 | Diorio et al. |
| 6,873,281 B1 | 3/2005 | Esterberg et al. |
| 6,909,389 B1 | 6/2005 | Hyde et al. |
| 6,943,678 B2 | 9/2005 | Muirhead |
| 6,950,342 B2 | 9/2005 | Lindhorst et al. |
| 6,954,159 B1 | 10/2005 | Cooper et al. |
| 6,958,646 B1 | 10/2005 | Colleran et al. |
| 6,965,142 B2 | 11/2005 | Diorio et al. |
| 6,977,527 B1 | 12/2005 | Hyde |
| 7,026,935 B2 | 4/2006 | Diorio et al. |
| 7,030,786 B2 | 4/2006 | Kaplan et al. |
| 7,038,544 B2 | 5/2006 | Diorio et al. |
| 7,038,603 B2 | 5/2006 | Diorio et al. |
| 7,042,701 B2 | 5/2006 | Diorio et al. |
| 7,049,872 B2 | 5/2006 | Diorio et al. |
| 7,049,964 B2 | 5/2006 | Hyde et al. |
| 7,061,324 B2 | 6/2006 | Diorio et al. |
| 7,071,507 B2 | 7/2006 | Diorio et al. |
| 7,102,438 B1 | 9/2006 | Colleran et al. |
| 7,107,022 B1 | 9/2006 | Thomas et al. |
| 7,116,240 B2 | 10/2006 | Hyde |
| 7,120,550 B2 | 10/2006 | Diorio et al. |
| 7,123,171 B2 | 10/2006 | Kaplan et al. |
| 7,145,203 B2 | 12/2006 | Wang |
| 7,145,370 B2 | 12/2006 | Bernard et al. |
| 7,149,118 B2 | 12/2006 | Diorio et al. |
| 7,177,182 B2 | 2/2007 | Diorio et al. |
| 7,183,926 B2 | 2/2007 | Diorio et al. |
| 7,187,237 B1 | 3/2007 | Diorio et al. |
| 7,187,290 B2 | 3/2007 | Hyde et al. |
| 7,199,663 B2 | 4/2007 | Diorio et al. |
| 7,212,446 B2 | 5/2007 | Diorio et al. |
| 7,215,251 B2 | 5/2007 | Hyde |
| 7,221,596 B2 | 5/2007 | Pesavento et al. |
| D543,976 S | 6/2007 | Oliver |
| 7,233,274 B1 | 6/2007 | Kuhn |
| D546,819 S | 7/2007 | Oliver |
| D546,820 S | 7/2007 | Oliver |
| D546,821 S | 7/2007 | Oliver |
| D546,822 S | 7/2007 | Oliver |
| D547,306 S | 7/2007 | Oliver |
| D547,754 S | 7/2007 | Oliver |
| 7,242,614 B2 | 7/2007 | Diorio et al. |
| 7,245,213 B1 | 7/2007 | Esterberg et al. |
| 7,246,751 B2 | 7/2007 | Diorio et al. |
| D548,225 S | 8/2007 | Oliver |
| 7,253,719 B2 | 8/2007 | Diorio et al. |
| 7,257,033 B2 | 8/2007 | Wang et al. |
| 7,262,092 B2 | 8/2007 | Diorio et al. |
| 7,263,001 B2 | 8/2007 | Wang et al. |
| 7,283,037 B2 | 10/2007 | Diorio et al. |
| 7,283,390 B2 | 10/2007 | Pesavento |
| 7,289,358 B2 | 10/2007 | Pesavento et al. |
| 7,304,579 B2 | 12/2007 | Diorio et al. |
| 7,307,528 B2 | 12/2007 | Glidden et al. |
| 7,307,534 B2 | 12/2007 | Pesavento |
| 7,312,622 B2 | 12/2007 | Hyde et al. |
| 7,315,067 B2 | 1/2008 | Wang |
| D562,810 S | 2/2008 | Oliver |
| D563,397 S | 3/2008 | Oliver |
| 7,375,398 B2 | 5/2008 | Wang et al. |
| 7,380,190 B2 | 5/2008 | Hara et al. |
| D570,337 S | 6/2008 | Oliver |
| 7,382,257 B2 | 6/2008 | Thomas et al. |
| 7,388,420 B2 | 6/2008 | Diorio et al. |
| 7,388,468 B2 | 6/2008 | Diorio et al. |
| 7,389,101 B2 | 6/2008 | Diorio et al. |
| 7,391,329 B2 | 6/2008 | Humes et al. |
| 7,394,324 B2 | 7/2008 | Diorio et al. |
| 7,400,255 B2 | 7/2008 | Horch |
| 7,403,122 B1 | 7/2008 | Koepp et al. |
| 7,405,659 B1 | 7/2008 | Hyde |
| 7,405,660 B2 | 7/2008 | Diorio et al. |
| D574,369 S | 8/2008 | Oliver |
| D574,370 S | 8/2008 | Oliver |
| 7,408,466 B2 | 8/2008 | Diorio et al. |
| 7,408,809 B2 | 8/2008 | Diorio et al. |
| 7,417,548 B2 | 8/2008 | Kavounas et al. |
| 7,419,096 B2 | 9/2008 | Esterberg et al. |
| 7,420,469 B1 | 9/2008 | Oliver |
| 7,423,539 B2 | 9/2008 | Hyde et al. |
| D578,114 S | 10/2008 | Oliver |
| 7,432,814 B2 | 10/2008 | Dietrich et al. |
| 7,436,308 B2 | 10/2008 | Sundstrom et al. |
| 7,448,547 B2 | 11/2008 | Esterberg |
| 7,472,835 B2 | 1/2009 | Diorio et al. |
| 7,482,251 B1 | 1/2009 | Paulsen et al. |
| D586,336 S | 2/2009 | Oliver |
| D587,691 S | 3/2009 | Oliver |
| 7,525,438 B2 | 4/2009 | Hyde et al. |
| D592,192 S | 5/2009 | Oliver |
| 7,528,724 B2 | 5/2009 | Horch |
| 7,528,728 B2 | 5/2009 | Oliver et al. |
| 7,541,843 B1 | 6/2009 | Hyde et al. |
| 7,557,714 B2 | 7/2009 | Roeder et al. |
| 7,561,866 B2 | 7/2009 | Oliver et al. |
| 7,592,897 B2 | 9/2009 | Diorio et al. |
| 7,616,120 B1 | 11/2009 | Humes et al. |
| D605,641 S | 12/2009 | Oliver |
| D606,056 S | 12/2009 | Oliver |
| D606,057 S | 12/2009 | Oliver |
| 7,633,376 B2 | 12/2009 | Diorio et al. |
| 7,633,377 B2 | 12/2009 | Sadr |
| 7,651,882 B1 | 1/2010 | Bockorick et al. |
| D610,576 S | 2/2010 | Oliver |
| 7,667,231 B2 | 2/2010 | Hyde et al. |
| 7,667,575 B2 | 2/2010 | Husak et al. |
| 7,667,589 B2 | 2/2010 | Desmons et al. |
| 7,667,652 B2 | 2/2010 | Gevargiz et al. |
| D611,037 S | 3/2010 | Oliver |
| D613,276 S | 4/2010 | Oliver |
| 7,696,882 B1 | 4/2010 | Rahimi et al. |
| D617,320 S | 6/2010 | Oliver |
| 7,733,227 B1 | 6/2010 | Pesavento et al. |
| D620,484 S | 7/2010 | Oliver |
| D620,928 S | 8/2010 | Oliver |
| 7,768,248 B1 | 8/2010 | Hyde |
| 7,768,406 B1 | 8/2010 | Peach et al. |
| 7,804,400 B2 | 9/2010 | Muirhead |
| 7,808,387 B1 | 10/2010 | Kuhn |
| 7,830,262 B1 | 11/2010 | Diorio et al. |
| 7,830,322 B1 | 11/2010 | Oliver et al. |
| 7,872,582 B1 | 1/2011 | Diorio |
| 7,873,326 B2 | 1/2011 | Sadr |
| 7,907,899 B1 | 3/2011 | Oliver |
| 7,917,088 B2 | 3/2011 | Hyde et al. |
| 7,920,046 B1 | 4/2011 | Aiouaz et al. |
| 7,969,236 B1 | 6/2011 | Hyde et al. |
| 7,970,484 B2 | 6/2011 | Fontanot |
| 7,973,643 B2 | 7/2011 | Hyde et al. |
| 7,973,645 B1 | 7/2011 | Moretti et al. |
| 7,978,005 B1 | 7/2011 | Hyde et al. |
| 7,982,611 B1 | 7/2011 | Picasso et al. |
| 7,990,249 B1 | 8/2011 | Hyde et al. |
| 7,999,675 B2 | 8/2011 | Diorio et al. |
| 8,044,774 B1 | 10/2011 | Diorio |
| 8,044,801 B1 | 10/2011 | Hyde et al. |
| 8,063,740 B1 | 11/2011 | Diorio et al. |
| 8,072,311 B2 | 12/2011 | Sadr et al. |
| 8,072,327 B2 | 12/2011 | Enyedy et al. |
| 8,072,329 B1 | 12/2011 | Srinivas et al. |

(56) References Cited

U.S. PATENT DOCUMENTS

| | | | |
|---|---|---|---|
| 8,077,013 B2 | 12/2011 | Cooper | |
| 8,082,556 B1 | 12/2011 | Aiouaz et al. | |
| 8,115,590 B1 | 2/2012 | Diorio et al. | |
| 8,115,597 B1 | 2/2012 | Oliver et al. | |
| 8,115,632 B1 | 2/2012 | Rahimi et al. | |
| 8,120,488 B2 | 2/2012 | Bloy | |
| 8,120,494 B1 | 2/2012 | Aiouaz et al. | |
| 8,134,451 B1 | 3/2012 | Diorio | |
| 8,154,385 B2 | 4/2012 | Aiouaz et al. | |
| 8,159,367 B2 | 4/2012 | Hofer et al. | |
| 8,174,367 B1 | 5/2012 | Diorio | |
| 8,174,369 B2 | 5/2012 | Jones et al. | |
| 8,188,927 B1 | 5/2012 | Koepp et al. | |
| 8,193,912 B1 | 6/2012 | Gutnik et al. | |
| 8,201,748 B2 | 6/2012 | Koepp et al. | |
| 8,224,610 B2 | 7/2012 | Diorio et al. | |
| 8,228,175 B1 | 7/2012 | Diorio et al. | |
| 8,237,562 B1 | 8/2012 | Picasso et al. | |
| 8,244,201 B2 | 8/2012 | Oliver et al. | |
| 8,258,918 B1 | 9/2012 | Diorio et al. | |
| 8,258,955 B1 | 9/2012 | Hyde et al. | |
| 8,260,241 B1 | 9/2012 | Hyde | |
| 8,279,045 B2 | 10/2012 | Diorio et al. | |
| 8,294,582 B1 | 10/2012 | Humes et al. | |
| 8,313,594 B2 | 11/2012 | Muirhead | |
| 8,325,014 B1 | 12/2012 | Sundstrom et al. | |
| 8,325,042 B1 | 12/2012 | Hyde et al. | |
| 8,326,256 B1 | 12/2012 | Kuhn | |
| 8,332,656 B2 | 12/2012 | Jones et al. | |
| 8,344,823 B2 | 1/2013 | Bloy et al. | |
| 8,344,857 B1 | 1/2013 | Oliver et al. | |
| 8,344,858 B2 | 1/2013 | Bloy | |
| 8,350,665 B1 | 1/2013 | Sundstrom et al. | |
| 8,354,917 B2 | 1/2013 | Diorio et al. | |
| 8,390,425 B1 | 3/2013 | Cooper et al. | |
| 8,390,430 B1 | 3/2013 | Sundstrom et al. | |
| 8,390,431 B1 | 3/2013 | Diorio | |
| 8,391,785 B2 | 3/2013 | Hyde et al. | |
| 8,395,482 B2 | 3/2013 | Sadr et al. | |
| 8,400,271 B2 | 3/2013 | Sadr | |
| 8,421,631 B2 | 4/2013 | Bloy et al. | |
| 8,427,315 B2 | 4/2013 | Aiouaz et al. | |
| 8,428,515 B1 | 4/2013 | Oliver | |
| 8,493,182 B2 | 7/2013 | Hofer et al. | |
| 8,690,057 B2 | 4/2014 | Schoening et al. | |
| 9,224,125 B2 | 12/2015 | Schoening et al. | |
| 9,317,823 B2 | 4/2016 | Muirhead | |
| 9,489,650 B2 | 11/2016 | Schoening et al. | |
| 2003/0182193 A1* | 9/2003 | Kawamata | G07G 1/0036 705/16 |
| 2003/0227392 A1* | 12/2003 | Ebert | H04L 67/12 340/8.1 |
| 2004/0102870 A1 | 5/2004 | Andersen et al. | |
| 2004/0225384 A1 | 11/2004 | Onishi et al. | |
| 2005/0021561 A1* | 1/2005 | Noonan | G06Q 30/06 |
| 2005/0192694 A1 | 9/2005 | Toyoshima et al. | |
| 2006/0038684 A1 | 2/2006 | Lahiri | |
| 2006/0200261 A1 | 9/2006 | Monette et al. | |
| 2007/0046439 A1 | 3/2007 | Takaku et al. | |
| 2007/0106574 A1 | 5/2007 | Kappel et al. | |
| 2007/0115137 A1 | 5/2007 | Lyon et al. | |
| 2008/0042838 A1 | 2/2008 | Levin et al. | |
| 2008/0068171 A1 | 3/2008 | Ehrman et al. | |
| 2008/0079935 A1 | 4/2008 | Vertoprakhov | |
| 2008/0136598 A1 | 6/2008 | Chen et al. | |
| 2008/0186139 A1 | 8/2008 | Butler et al. | |
| 2008/0223274 A1 | 9/2008 | Okuyama | |
| 2009/0032367 A1 | 2/2009 | Anthome | |
| 2009/0146816 A1 | 6/2009 | Patel et al. | |
| 2010/0030353 A1 | 2/2010 | Koishi et al. | |
| 2010/0207738 A1 | 8/2010 | Bloy | |
| 2010/0219953 A1 | 9/2010 | Bloy | |
| 2010/0225480 A1 | 9/2010 | Bloy et al. | |
| 2010/0310019 A1 | 12/2010 | Sadr | |
| 2011/0032079 A1 | 2/2011 | Bloy et al. | |
| 2011/0063113 A1 | 3/2011 | Hook et al. | |
| 2011/0068924 A1 | 3/2011 | Muirhead | |
| 2011/0090059 A1 | 4/2011 | Sadr | |
| 2011/0090061 A1 | 4/2011 | Hofer et al. | |
| 2011/0090062 A1 | 4/2011 | Hofer et al. | |
| 2011/0095087 A1 | 4/2011 | Master et al. | |
| 2011/0240731 A1* | 10/2011 | Lee | G06Q 30/06 235/375 |
| 2011/0254664 A1 | 10/2011 | Sadr et al. | |
| 2011/0279261 A1 | 11/2011 | Gauger et al. | |
| 2011/0282476 A1 | 11/2011 | Hegemier et al. | |
| 2012/0066019 A1 | 3/2012 | Hinshaw et al. | |
| 2012/0112913 A1 | 5/2012 | Bloy | |
| 2012/0139704 A1 | 6/2012 | Sadr et al. | |
| 2012/0188058 A1 | 7/2012 | Lee et al. | |
| 2012/0212331 A1 | 8/2012 | Jones et al. | |
| 2012/0229257 A1 | 9/2012 | Kim | |
| 2012/0257733 A1 | 10/2012 | Kosseifi et al. | |
| 2012/0275546 A1 | 11/2012 | Divsalar | |
| 2013/0049925 A1 | 2/2013 | Subramanian | |
| 2013/0093572 A1 | 4/2013 | Bloy et al. | |
| 2013/0099898 A1 | 4/2013 | Bloy | |
| 2013/0099901 A1 | 4/2013 | Jones et al. | |
| 2013/0233922 A1* | 9/2013 | Schoening | G06Q 10/0875 235/385 |
| 2014/0224870 A1* | 8/2014 | Schoening | G06Q 10/0875 235/376 |
| 2016/0078395 A1* | 3/2016 | Schoening | G06Q 10/087 705/7.15 |
| 2017/0053239 A1* | 2/2017 | Schoening | G06F 16/245 |
| 2018/0089474 A1* | 3/2018 | Ramon | G06Q 50/28 |
| 2018/0162640 A1* | 6/2018 | Lee | B65G 1/1371 |

FOREIGN PATENT DOCUMENTS

| | | | |
|---|---|---|---|
| KR | 10-2018-0132223 A | 12/2018 | |
| WO | WO-2007/086808 A2 | 8/2007 | |
| WO | WO-2007086808 A3 | 7/2008 | |
| WO | WO-2009/035723 A1 | 3/2009 | |

OTHER PUBLICATIONS

Almaaitah et al., "3D Passive Tag Localization Schemes for Indoor RFID Applications," Exhibit 1015 of Consolidated Inter Partes Reviews IPR2014-01536 and IPR2015-00119 of U.S. Pat. No. 8,690,057.

Decision Institution of Inter Partes Review, Case IPR2014-01536, U.S. Pat. No. 8,690,057 B2, entered Mar. 28, 2016.

Decision Institution of Inter Partes Review, Case IPR2014-01536, U.S. Pat. No. 8,690,057 B2, entered Mar. 30, 2015.

Decision Institution of Inter Partes Review, Case IPR2015-00119, U.S. Pat. No. 8,690,057 B2, entered Apr. 29, 2015.

European Search Report for Application No. 13757623.7, dated Sep. 2, 2015.

Hekimian-Williams et al., "Accurate Localizatoin of RFID Tags Using Phase Difference," Exhibit 1019 of Consolidated Inter Partes Reviews IPR2014-01536 and IPR2015-00119 of U.S. Pat. No. 8,690,057.

International Preliminary Report on Patentability for Application No. PCT/US2013/029408, dated Sep. 9, 2014.

International Search Report and Written Opinion for Application No. PCT/US2013/029408, dated Jun. 26, 2013.

Miesen, "Where is the Tag?" Ehixibit 1018 of Consolidated Inter Partes Reviews IPR2014-01536 and IPR2015-00119 of U.S. Pat. No. 8,690,057.

Nikitin et al., "Phase Based Spatial Identification of UHF RFID Tags," Intermec Technologies Corporation, Exhibit 1017 of of Consolidated Inter Partes Reviews IPR2014-01536 and IPR2015-00119 of U.S. Pat. No. 8,690,057.

Patent owner response to the Decision of Institution of Inter Partes Review for IPR2014-01536 and IPR2015-00119, filed Jun. 26, 2015.

Petition for Inter Partes Review of U.S. Pat. No. 8,690,057, dated Oct. 23, 2014.

(56) References Cited

OTHER PUBLICATIONS

Petition for Inter Partes Review of U.S. Pat. No. 8,690,057, dated Sep. 23, 2014.
Preliminary Response to Inter Partes Review No. IPR2014-01536, dated Jan. 7, 2015.
Preliminary Response to Inter Partes Review No. IPR2015-00119, dated Jan. 30, 2015.
Reply Brief for Inter Partes Review of U.S. Pat. No. 8,690,057 (IPR2014-01536), dated Sep. 28, 2015.
Siragusa et al., "RFID Tags Localization along an axis using a Tunable Near-Field Focused Circular-Phase Array Antenna," of Exhibit 1016 of Consolidated Inter Partes Reviews IPR2014-01536 and IPR2015-00119 of U.S. Pat. No. 8,690,057.
Song et al., "Spaceannotator: A High Precision Location Based Asset Management System in Indoor Environment," Proceedings of ICCTA2011, 1 NEC Labs China, Exhibit 1013 of Consolidated Inter Partes Reviews IPR2014-01536 and IPR2015-00119 of U.S. Pat. No. 8,690,057.
Stelzer et al., "Concept and Application of LPM-A Novel 3-D Local Position Measurement System," Exhibit 1020 of Consolidated Inter Partes Reviews IPR2014-01536 and IPR2015-00119 of U.S. Pat. No. 8,690,057.
Xiong et al., "Design and Implementation of a Passive UHF RFID-Based Real Time Location System," State Key Laboratory of ASIC & System, Fudan University, Exhibit 1014 of Consolidated Inter Partes Reviews IPR2014-01536 and IPR2015-00119 of U.S. Pat. No. 8,690,057.
U.S. Appl. No. 13/857,616, Nonfinal Office Action, dated Aug. 2, 2013.
U.S. Appl. No. 13/857,616, Notice of Allowance, dated Nov. 12, 2013.
U.S. Appl. No. 14/190,453, Nonfinal Office Action, dated Jun. 5, 2014.
U.S. Appl. No. 14/190,453, Nonfinal Office Action, dated Dec. 4, 2014.
U.S. Appl. No. 14/190,453, Final Office Action, dated Apr. 20, 2015.
U.S. Appl. No. 14/190,453, Notice of Allowance, dated Aug. 7, 2015.
U.S. Appl. No. 14/950,192, Nonfinal Office Action, dated Jan. 4, 2016.
U.S. Appl. No. 14/950,192, Notice of Allowance, dated Jul. 6, 2016.
First Office Action (Chinese only), Chinese patent application No. 201380012804.7, dated Aug. 3, 2016.
European Office Action for Application No. 13757623.7, dated Jan. 10, 2018.
European Office Action for Application No. 13757623.7, dated Jul. 5, 2018.

* cited by examiner

RFID-BASED INVENTORY TRACKING SYSTEM

CROSS-REFERENCE TO RELATED APPLICATIONS

This application is a continuation in part of U.S. patent application Ser. No. 16/370,742, filed on Mar. 29, 2019. This application also claims priority benefit of U.S. Provisional Application No. 62/837,138, filed on Apr. 22, 2019. The disclosures of each of application Ser. Nos. 16/370,742 and 62/837,138 are hereby expressly incorporated by reference herein.

FIELD OF TECHNOLOGY

The present invention relates generally to inventory tracking and management systems and, more particularly, to an RFID-based inventory tracking and management system that may be used to manage the tracking of and shipping of products in a storage or warehouse environment.

DESCRIPTION OF THE RELATED ART

Storage facilities, such as warehouses, house numerous and various products until those products are needed in a manufacturing process, need to be shipped to a customer, etc. Products in storage facilities may sit in the storage facilities for varying amounts of time depending on the need for those products or the shelf life of the product. Once a product is needed, a storage facility worker must generally either manually locate the product, or look up where the particular product was placed when it was first stored, using a computer or some other device. The worker may then use a delivery or transport vehicle to pick up the particular product and drop off the particular product at a desired location within the storage facility, such as on a manufacturing line, a truck for delivery, at a loading bay, etc.

As the worker travels around the storage facility with the delivery or transport vehicle, either transporting a product to a new location or going to pick up a product that needs to be moved to a new location, the worker must generally rely on visual indicators, or markings, disposed on various surfaces to determine where they are, and where products are located, within the storage facility. However, as is common in storage facilities, such visual indicators may be obstructed, dirty, torn, or otherwise not easily visible to the worker as they travel around the storage facility. Further, even if the visual indicators are not obstructed, the workers field of view is regularly obstructed by the delivery or transport vehicle (e.g., forklift) they are driving or the products carried by the delivery or transport vehicle. Additionally, it is entirely possible that the visual indicators that are visible poorly communicate the particular location within the storage facility they are trying to designate. For example, the visual indicator can be placed between two shelves, or bays, in a manner that makes it difficult to discern which particular shelf or location the particular visual indicator is attempting to designate. As a result, workers traveling around the storage facility must generally rely on their memory or a visual indicator that may not be universally known to designate a particular location or area within the storage facility.

Often, however, the products housed in storage facilities are shuffled and moved around in order to accommodate other products, for cleaning purposes, or for any other reason that may necessitate moving a product from one location to another. It is possible that, during relocation of the product, two products become swapped or that a product is misplaced or "lost" within the warehouse. The inadvertent misplacement of a particular product often goes undocumented because the misplacement of the product happens without the knowledge of the storage facility worker or simply due to human error. Moreover, storage facility workers may inadvertently take the wrong product and place it on a truck for delivery. Many factors may contribute to such errors, such as mislabeled products, unclear marking of storage areas, relocated products whose new location was not updated in an inventory management system, or simply human error. Therefore, manually tracking and continuously updating the location of products as they are moved within a storage facility becomes a tedious and time-consuming task that is error prone. Such errors lead to incorrect products, or out of date products, being used during manufacturing and/or being shipped to customers and the inability to locate products resulting in shipping delays, costing money to the storage facility and potentially hazardous situations in the case of food products, pharmaceuticals, etc.

A known method that attempts to mitigate the inherent issues with individuals manually tracking and continuously updating the location of products involves manually scanning a barcode disposed on a product and updating the location of the product using a barcode scanner. In such methods, as the product is relocated within the storage facility or placed on a truck for delivery at a loading bay, an individual was required to manually scan the barcode disposed on the product using the barcode scanner, and then update an inventory database with the new location of the product. However, such a system is not without its problem. For example, individuals working in a facility may not immediately scan the barcode disposed on a product being moved nor update the inventory database with the new location of the product in a timely manner resulting in an incorrect location being stored within the inventory database. Many factors may contribute to the delay in updating the product location. For example, little to no downtime time between moving products within the storage facility and/or general human error, such as the inability to remember, or incorrectly remembering, where certain products were placed; manually entering an incorrect location for the moved product; simply choosing not to update the inventory database with the new product location. As such, this time-consuming and error prone methodology may result in workflow inefficiencies, misplaced products, and numerous dollars lost as a result of expired and/or lost product.

In response to the inherent issues associated with manually scanning barcodes on products and updating the location of the moved product using the barcode scanner, another known method involves using a network of scanners to read and detect RFID tags disposed at various locations within the storage facility and on products. Such systems generally include a network of scanners disposed high above the floor (e.g., ceiling) allowing for the greatest amount of coverage with the least amount of scanner. However, these systems have been used with very little success because of signal interference caused by various structures and products disposed between the RFID tags and scanners as a result of the distance between the RFID tags and the scanners. This is problematic because the signal interference reduces the accuracy of the readings and, ultimately, the efficacy of the system. An example of such a system can be found in U.S. Publication No. An example of such a system can be found in U.S. Pat. No. 8,690,057.

In view of the aforementioned difficulties experienced by known inventory tracking systems and methods, there have been attempts to detect where a forklift, or other movable device, is located within the storage facility at any given moment by placing RFID tags on the floor of the storage facility. However, known methods of placing RFID tags on floors often require drilling into the floor, or otherwise defacing the floor, so that the RFID tag may be placed disposed in the floor and then covered with an epoxy. Such heavy construction required to place the RFID tag on the floor disadvantageously requires considerable work to add, move, and/or replace the RFID tag around the storage facility and permanently defaces the storage facility floor. Other known methods of securing the RFID tag to the floor of the storage facility may avoid the need for heavy construction, but are plagued with other problem. Simply placing known RFID tags on the floor of the storage facility can detune the RFID tag. In other words, the floor of the storage facility may prevent, or otherwise inhibit, the placed RFID tag from receiving an interrogation signal from and/or transmitting an interrogation response signal to an interrogator, or RFID reader. A know remedy to mitigate detuning involves attaching a thick buffer layer, or several thick buffer layers, to the RFID tag to create a barrier between the RFID tag and that floor. However, this technique often requires the buffer layer, or several buffer layers, to be so thick that a forklift, or other movable device, cannot readily drive over the RFID tag placed on the floor.

SUMMARY

An inventory tracking and management system operates in a storage facility to detect and track products within a manufacturing or storage facility using an RFID system that includes readers disposed on a movable asset, such as a forklift, and a first set of RFID tags disposed on the products and a second set of RFID tags, referred to as location RFID tags, disposed throughout the storage facility, such as on the floor of the storage facility. Generally, the inventory tracking and management system detects the identity of the products being placed on or taken from selves in the facility using the first set of RFID tags as detected by the reader on the moveable asset, and detects the location of the product at any particular time, including the location of the product when it is removed from the movable asset, using the second set of RFID tags as detected by the reader on the movable asset. This RFID based tracking system is more reliable as it operates to automatically detect and track the movement of and locations of products within the facility without the need for operator input or initiation, and is not subject to the interference and loss of tracking issues experienced by other prior automatic RFID tracking systems. Generally, the inventory tracking and management system includes a radio frequency identification ("RFID") reader, in communication with antennas, disposed on a forklift (or other product transportation vehicles), wireless communication devices such as wireless routers and gateways disposed on the forklift, a user interface device located on the forklift, wireless communication nodes disposed at various locations within a storage and shipping environment having bays, shelves, racks, etc., each of which include various bays therein, a detection system disposed on the front of the forklift, and a centralized asset tracking and management device having a product and order database and a tracking and communication application. The user interface device includes a remote tracking and communication application that executes on a processor and communicates with the centralized asset tracking and management device, the RFID reader, and the wireless communication node or device on the forklift to perform various tasks. Additionally, the user interface device may include a display or interface screen to visually present information to the forklift operator or other user.

Moreover, the inventory tracking and management system includes various location designation RFID tags disposed around the storage and shipping environment with each of the location designation RFID tags having a known and unique identification number associated therewith. Some of the location designation RFID tags may be, for example, disposed at shipping portals or loading bays, while other location designation RFID tags may be disposed on the floor at the entrance or start of each bay or on other locations of the storage facility. Advantageously, the various location designation RFID tags may be easily and non-invasively placed and relocated on a floor of a storage facility in a manner that mitigates, and reduces, the issues experienced by known RFID tags when placed on a floor. Utilizing an inlay having a long, thin antenna, reduces the overall thickness of the location designation RFID tag, which allows layers to be disposed on the inlay that include a sufficient thickness to improve durability, mitigate detuning, and allow movable devices to readily pass over the location designation RFID tag. In addition to using adequately thick first and second layers, the long length of the antenna allows the location designation RFID tag to be easily read and detected by a reader on a moving forklift thereby further strengthening the communication connection between the location designation RFID tag and the reader. An adhesive applied to the layer allows the location designation RFID tag to be non-invasively placed and relocated by almost anyone working in the facility without the need for defacing the floor. Finally, an easily visible designation may be disposed on inlay that assists with identifying where the location designation RFID tag belongs within the storage facility and with identifying where an individual is located within the storage facility based on the location of the tags.

Further, a product designation RFID tag is located on each product in the storage and shipping environment. Each of the location designation RFID tags and the product designation RFID tags has a unique ID associated therewith and these IDs are known by the centralized asset tracking and management device, so that the centralized asset tracking and management device can associate some of the particular location designation RFID tags with a particular bay or rack, can associate some of the particular location designation RFID tags with a particular shipping portal or loading bay, and can associate reach of the product designation RFID tags with a particular product.

Generally speaking, the centralized asset tracking and management device includes a centralized tracking and communication application that is stored in a memory of and executed on a processor of the centralized asset tracking and management device. The centralized tracking and communication application is communicatively connected to one of the wireless communication nodes or gateways and so is connected to the wireless communication network within the facility. The centralized tracking and communication application operates to communicate with the user interface devices and the RFID tag readers to obtain information from and to provide information to the user interface devices and, additionally, operates to track and manage the placement and movement of the various different products with or between the bays, shelves and racks, and the shipping portals or loading bays.

In use, the centralized tracking and communication application may send a signal to the user interface device, the signal containing information regarding a product that needs to be one of placed at a particular bay in a shelf, moved from a particular bay in a shelf, or rack, to another bay in a shelf, or rack, (or a different shelf) or moved from a particular bay in a shelf, or rack, to a shipping portal or loading bay and onto a truck to be delivered to a client or another facility/location. The user interface device visually displays the information sent by the centralized tracking and communication application, which may include, for example, the product code, where the product is located, and the destination of the product. A forklift operator then drives the forklift to the proper shelf, rack, or bay and picks up the product from the desired shelf, rack, or bay. Once the desired product is held by the forklift, the detection system detects that a product has been picked up and turns on the RFID reader, which then turns on at least one front facing antenna to read or ping the product designation RFID tag disposed on the product held by the forklift all while the forklift operator backs out of the particular bay of the shelf where the product was located into, for example, the space between two shelves. When the forklift is parallel to the shelf from which the product was picked up, or, for example, five (5) to eight (8) feet away from the shelf, the RFID reader and front facing antenna lock onto the product designation RFID tag that is carried by the forklift. The user interface device may visually display, to the forklift operator or other user, that the RFID reader and the antenna have locked on to the product. The remote tracking and communication application of the user interface device queries the centralized tracking and communication application, which compares the product and product designation RFID tag ID sent by the remote tracking and communication application with the product and product designation RFID tag stored in a product and order database, which is stored on the centralized asset tracking and management device. If the centralized tracking and communication application determines that the information matches, then the centralized tracking and communication application may send a signal to the user interface device, which visually and audibly alerts the forklift driver (e.g., by displaying a green notification box) that he or she has picked up the correct product for the order the forklift operator is fulfilling. If, for example, the centralized tracking and communication application determines that the information does not match, then the centralized tracking and communication application sends a signal to the user interface device, which visually alerts the forklift operator (e.g., by displaying a red notification box and another type of audible alarm) that the operator has picked up the incorrect product for the order the forklift driver is filling and may instruct the operator to replace the current product back on the shelf. Once the correct product is carried by the forklift, the forklift operator may proceed to the required destination of the product (e.g., another bay of a shelf or a shipping portal or loading bay and onto a truck).

Once near the manufacturing lines, shipping portal, or loading bay, the RFID reader may selectively turn on the front facing antenna (if not already on) to read or detect location designation RFID tags disposed at manufacturing lines, shipping portals, or loading bays. As the forklift nears a location designation RFID tag disposed at the manufacturing lines, shipping portals, or loading bays, the RFID reader and the front facing antenna send the particular location designation RFID tag ID of the location designation RFID tag that the RFID reader and the front facing antenna read or detect. Similar to the process described in relation to when a product is picked up, the centralized tracking and communication application compares the sent location designation RFID tag ID and product designation RFID tag ID with the information stored in the product and order database for the particular order that the forklift operating is fulfilling. If, for example, the centralized tracking and communication application compares the sent information and the information stored in the product and order database and determines that the sent information and the information stored in the product and order database match, then the centralized tracking and communication application sends a signal to the user interface device, which visually alerts the forklift driver (e.g., by visually displaying a green notification box and audible alarm) that the operator has selected the correct shipping portal or loading bay for the order the forklift operator is fulfilling. If, for example, the centralized tracking and communication application compares the sent information and the information stored in the product and order database and determines that the sent information and the information stored in the product and order database do not match, then the centralized tracking and communication application sends a signal to the user interface device, which visually alerts the forklift operator (e.g., by displaying a red notification box and audible alarm) that he or she has delivered the product to the incorrect loading bay for the order the forklift driver is fulfilling. In such an example, the forklift operator may then try a different manufacturing line, shipping portal, or loading bay and the above process will repeat until the correct shipping portal or loading bay is located.

Furthermore, as the desired product is placed in the correct manufacturing line, shipping port, or loading bay and subsequently on a truck, the detection system and the user interface device may detect that the product has been dropped off and the remote tracking and communication application of the user interface device may send a signal, which includes, for example, the last known location of the product, to the centralized tracking and communication application, which is then stored to the product and order database as being the current location of the product. Once the information is stored, the centralized tracking and communication application may send the user interface device a signal to visually indicate to the forklift operator (e.g., by displaying a yellow, or purple, notification box on the display of the user interface device and emitting an audible alarm via a speaker of the user interface device) that he or she has successfully dropped off the product. The forklift operator may continue to pick up and drop off products until the order has been filled all while the above discussed processes take place with each newly picked up and dropped off product. Once the order has been filled, the user interface device receives an input that the order has been filled and the remote tracking and communication application sends a single to the centralized tracking and communication application, which then queries the product and order database to update the order as completed.

BRIEF DESCRIPTION OF THE DRAWINGS

FIG. 26 is an example display screen of a user interface device of a general overview of outstanding orders.

FIG. 27 is an example display screen of a user interface device that may be used to enter or view sales or order information.

DETAILED DESCRIPTION

Figure 1:
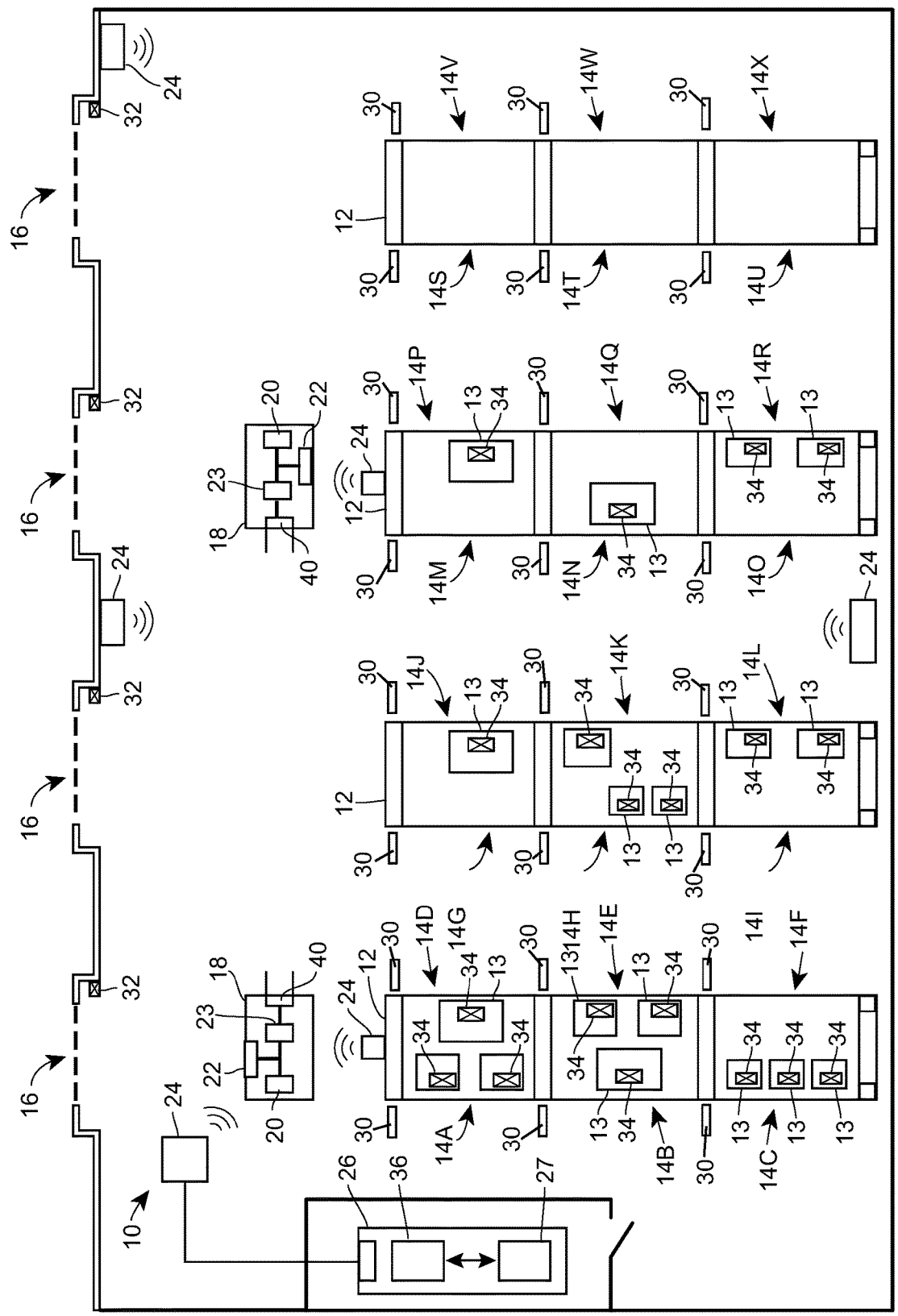
FIG. 1 is a top view of an example, storage and shipping environment in which an RFID-based inventory tracking system is located.

FIG. 1 depicts a top plan view of an example storage and shipping environment 10 (e.g., a warehouse, storage facility) in which an RFID-based inventory tracking system is disposed. The RFID-based inventory tracking system may be used to track the location of various different products, such as pallets of material, raw materials, rolls of material, etc., as these products are introduced into, stored in, produced in, and moved around within the environment 10, and as these products are taken from the storage and shipping environment 10 and placed onto one or more trucks or other delivery vehicles for delivery to a customer, for example.

As illustrated in FIG. 1, the storage and shipping environment 10 includes a series of storage shelves 12, upon which various different products 13 may be stored for a period of time before being used in a manufacturing process or being shipped to a customer. Each of the shelves 12 includes various bays 14 therein, which indicate portions of the shelves 12. As is typical in a warehouse environment, each bay 14 (labeled as bays 14A-14X in FIG. 1) may be labeled with or designated with a unique identifier number within the context of the storage environment 10. Each shelf 12 may be double-sided, for example, so that there is a bay 14 on either side of each shelf 12. Likewise, the storage and shipping environment 10 includes a series of shipping portals or loading bays 16 that may be, for example, associated with loading bays at which trucks park to drop off or accept delivery of the products 13 within the environment 10. Still further, the storage and shipping environment 10 includes various movable devices or forklifts 18 (or other delivery vehicles) which are used to place various ones of the products 13 on the shelves 12 in various ones of the bays 14 for storage; to move products 13 around within the shelves 12 if desired; to take products off the shelves 12 and deliver those products to one of the loading bays 16 to be placed on a truck or other delivery vehicle, etc. Likewise, the forklifts 18 may pick up new products or materials from the loading bays 16 (or from trucks at the loading bays 16) and place the new products or materials at any of the various bays 14 of the shelves 12 for storage and later use.

As is known, in a busy and large storage facility, it is difficult to track the locations at which various different materials or products 13 are placed in a manner that makes it easy to find those products when needed, such as when needed in a manufacturing process, when these products need to be shipped to a customer, etc., and difficult to ensure the busy and large storage facility is using the first in, first out ("FIFO") inventory method. An RFID-based tracking system as described herein can be used to enable automatic recognition of, and tracking of the various products 13 as they are placed in various bays 14A-14X of the shelves 12, as these products 13 are moved between different bays 14A-14X of the shelves 12, and as these products 13 are loaded onto delivery trucks at the loading bays 16.

In particular, an RFID-based tracking system includes an RFID reader 20, disposed on each of the forklifts 18 (or other product transportation vehicles), wireless communication devices such as wireless routers and gateways 22 disposed on the forklifts 18, user interface devices 23 located on the forklifts 18, wireless communication nodes 24 disposed at various locations within the environment 10, and a centralized asset tracking and management device 26 (having a product and order database 27 and a centralized asset tracking and management application 36), as well as a display or interface screen 28 that communicates with the wireless communication nodes or gateways 24.

Figure 2:
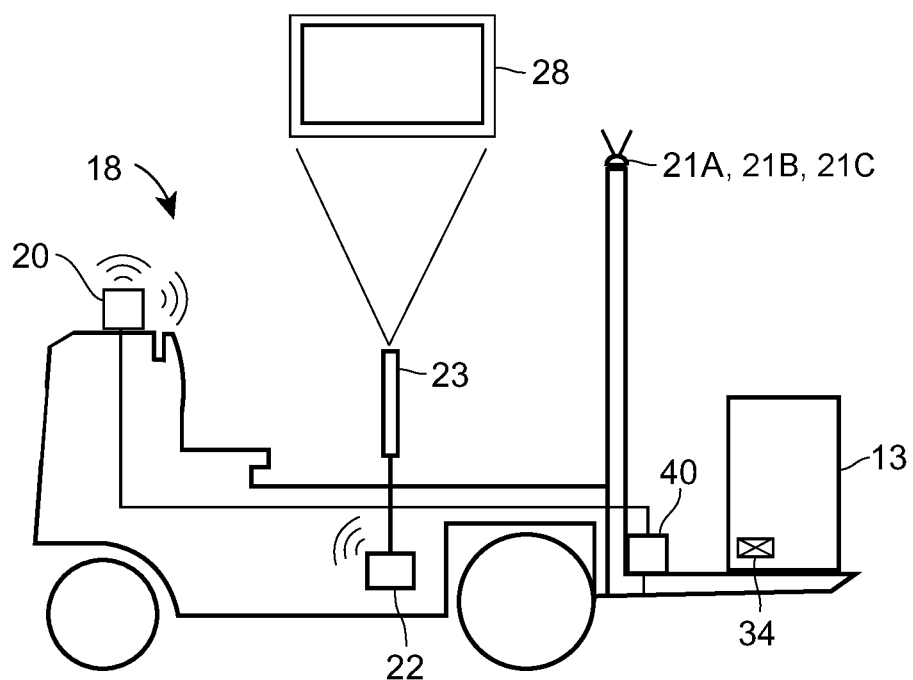
FIG. 2 is a diagram of a fork lift having various RFID tracking system components installed thereon.

FIG. 2 illustrates a single forklift 18 having an RFID reader 20 disposed thereon, typically at an upper location thereof such as on the top of the forklift 18 and disposed to be able to read RFID tags that are disposed near the forklift 18, such as on walls, shelves, etc. and on products that may be disposed on the tongs of the forklift 18. While a forklift 18 has been illustrated in FIG. 2, the RFID reader 20, and any additional equipment, may be placed on any movable device, such as, for example, a product transportation vehicle (e.g., a forklift). In particular, the RFID reader 20 may be attached to a plate on a first side of the plate, which includes a magnet disposed on a second side of the plate. In such an example, the plate can be used to releasably attach the RFID reader 20 to the forklift 18 or other surfaces capable to interacting with the magnet. The magnet can be any magnet strong enough to attach the RFID reader 20 to a magnetic surface, such as, for example, a rare earth magnet. Additionally, multiple antennas 21, in communication with the RFID reader 20, may be disposed on the forklift 18 for detecting and reading RFID tags. The antennas 21 may be placed around the forklift 18 to minimize interference with the operation of the forklift 18 and to ease maintenance should the antennas 21 need to be replaced. In particular, for example, multiple front facing antennas 21A, 21B, 21C are placed toward the front end of the forklift 18 (i.e., towards the tongs of the forklift 18) to detect and read an RFID tag placed on a product 13, to detect and read an RFID tag placed on the storage shelf 12 and the bays 14, to detect and read an RFID tag placed near a loading bay 16, and to detect and read an RFID tag placed on a floor of the environment 10 near storage shelf 12, the bays 14, and the loading bay 16. In some examples, a plurality of antennas can be placed towards the rear end of the forklift 18 (i.e., the side opposite the tongs of the forklift 18) to detect and read one or more RFID tags placed on the storage shelf 12 and the bays 14. Further, each of the multiple antennas 21 may be coded to detect and selectively read only RFID tags placed on products 13 and near the loading bays 16 or only RFID tags placed on the storage shelf 12 and the bays 14. For example, the front facing antenna 21A can be coded to read only RFID tags disposed on products 12 and near the loading bays 16, and the front facing antennas 21B, 21C can be coded to detect and read only RFID tags placed on the storage shelf 12 and the bays 14. The antennas 21 also may have a detection radius of, for example, four (4) feet. As a result of the detection radius of the antennas 21, the front facing antenna 21A and the plurality of rear facing antennas 21B, 21C may be selectively turned on by, or used by, the RFID reader 20 to limit the amount of RFID tags that are being read by the RFID reader 20 when the forklift 18 is around many products 13 or between shelves 12 or bays 14 of the shelves 12. Thus, the multiple antennas 21 help determine the position of the forklift 18 in the environment 10 and, in turn, the location of the product 13. Further, the antennas 21A, 21B, and 21C may be oriented in different directions to read RFID tags placed on various surfaces (e.g., shelves, bays, loading bays, flood, ceiling, etc.). For example, the front facing antenna 21A can be oriented to point straight ahead of the forklift 18, the front facing antenna 21B can be oriented to point above the forklift 18, and the front facing antenna 21C can be oriented to point below the forklift 18. It will be appreciated that the antennas 21A, 21B, and 21C may also be oriented to point to the left and right of the forklift 18. FIG. 2 also illustrates that the forklift 18 includes a network communication device, or a wireless communication device 22, which communicates with wireless nodes or gateway devices 24 (FIG. 1) to perform wireless communications. Moreover, a portable communication device, or user interface device 23, is typically disposed on the forklift 18 in a position that is viewable and accessible by the forklift operator. In particular, the user interface device 23 may be positioned, for example, to the right side of the forklift operator. Generally speaking, the user interface device 23 may be a standalone computing device, such as a laptop, a tablet device, a phone or other handheld device, etc., but this user interface device 23 could be incorporated into the forklift 18, if so desired. The user interface device 23 includes a remote tracking and communication application that executes on a processor and that will be used, as described herein, in more detail, to communicate with the asset tracking and management device 26, the RFID reader 20, and the wireless communication node or device 22 on the forklift 18 to perform various tasks. The user interface device 23 may also include a display or interface screen 28, illustrated in an expanded display in FIG. 2, that may be used to visually present information to the forklift operator or other user, and may include a speaker or other audible device that may be used to provide sounds, alarms, etc. to the forklift operator or other user and an operator input device, such as a touch screen, a keyboard, etc., that may be used to accept inputs from the forklift operator or other user. As also illustrated in FIG. 2, the user interface device 23 is communicatively coupled to the RFID reader 20 and to the wireless communication device 22.

Referring back to FIG. 1, the wireless communication nodes or gateways 24 may be located at various locations within the environment 10, such as on the shelves 12, hanging from the ceiling, disposed near the loading bays 16, etc., or may be located in any other positions that provide wireless communication coverage in any known manner throughout the area covered by the environment 10 (and particularly the area traversed by the forklifts 18). The wireless communication devices 22 and 24 may communicate using any desired wireless communications standard, such as an 802.11 protocol, a TCP/IP protocol, a Bluetooth protocol, any Wi-Fi protocol, etc.

Various location designation RFID tags 30 and 32 are disposed around the environment 10 to indicate various different locations within the environment 10. Each of the tags 30 and 32 may have a known and unique identification number associated therewith, such that the antennas 21A, 21B, 21C disposed on the forklift 18 can identify the various location designation RFID tags 30, 32 disposed within the environment 10. In the example of FIG. 1, a different location designation RFID tag 30 is illustrated as being disposed at each of the bays 14A-14X, such as on the floor at the entrance or start of each bay 14, while a different location designation RFID tag 32 is located at or near each of the loading bays 16 in a fixed location such as, for example, the floor near the loading bays 16. The various location designation RFID tags 30 and 32 may be releasably attached to the floor, so that the location designation RFID tags 30 and 32 may be moved to a different location if warehouse layout is reorganized.

Figure 3:
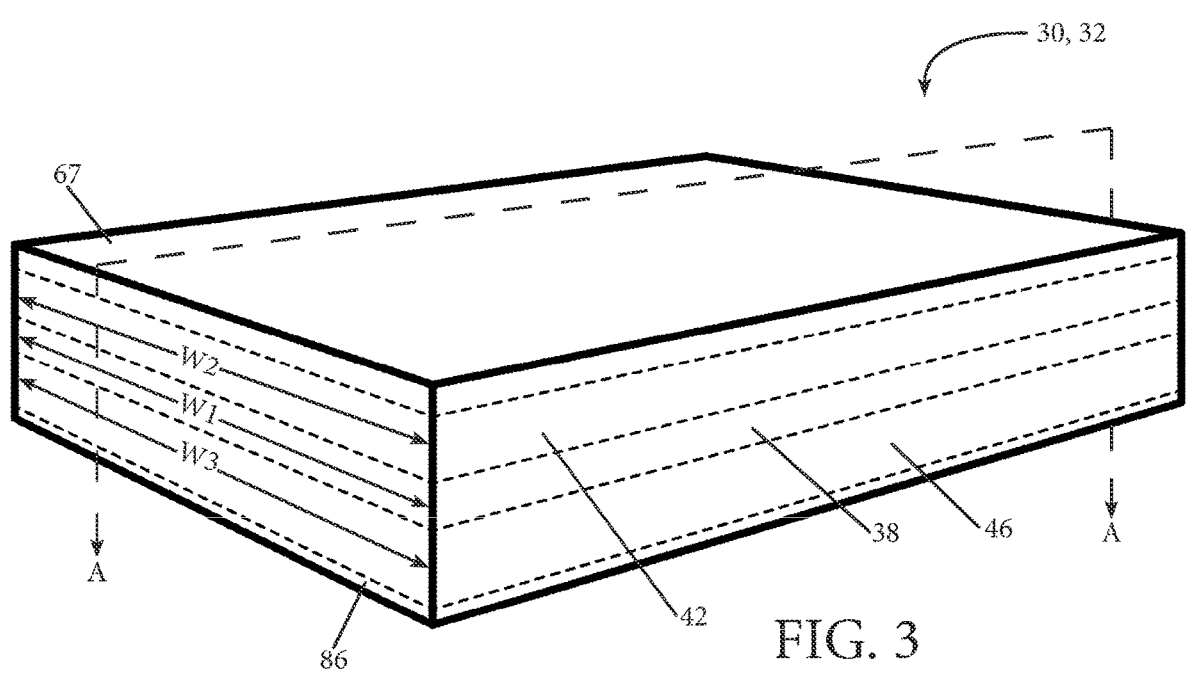
FIG. 3 is a perspective view of an example location designation RFID disposed in the storage and shipping environment of FIG. 1.
Figure 4:
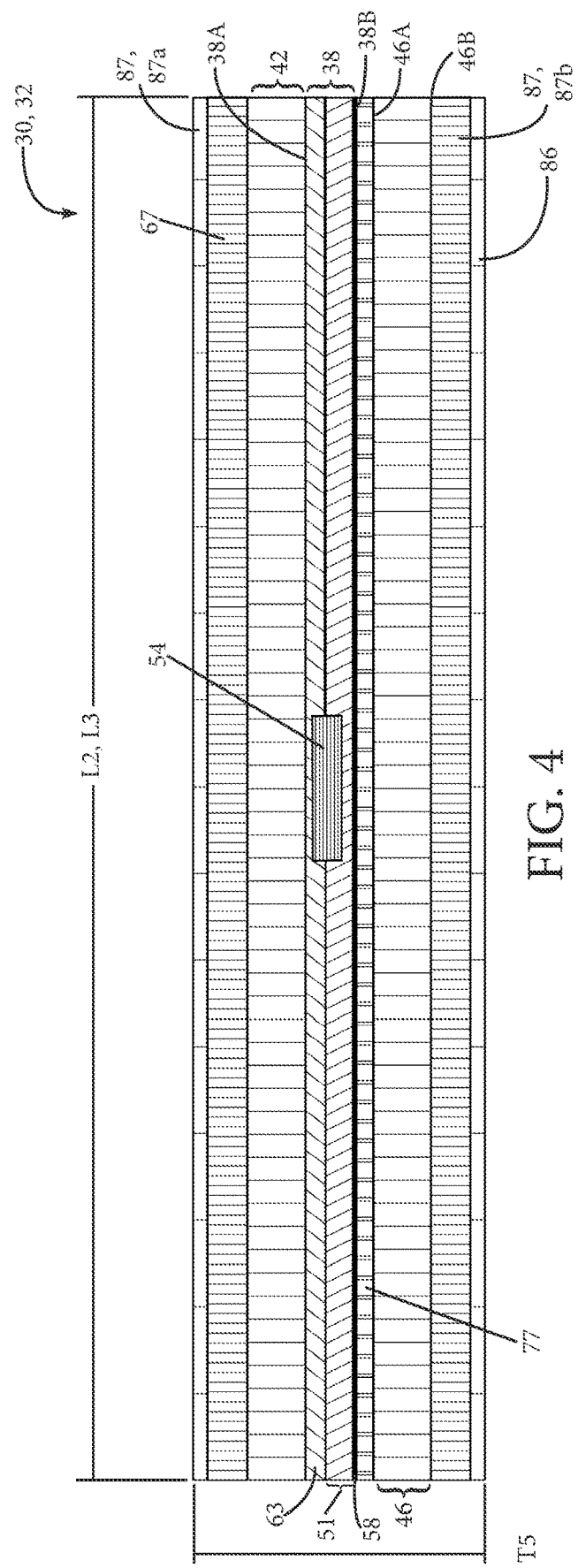
FIG. 4 is a cross-sectional view of the location designation RFID tag of FIG. 3 along line A-A.
Figure 5:
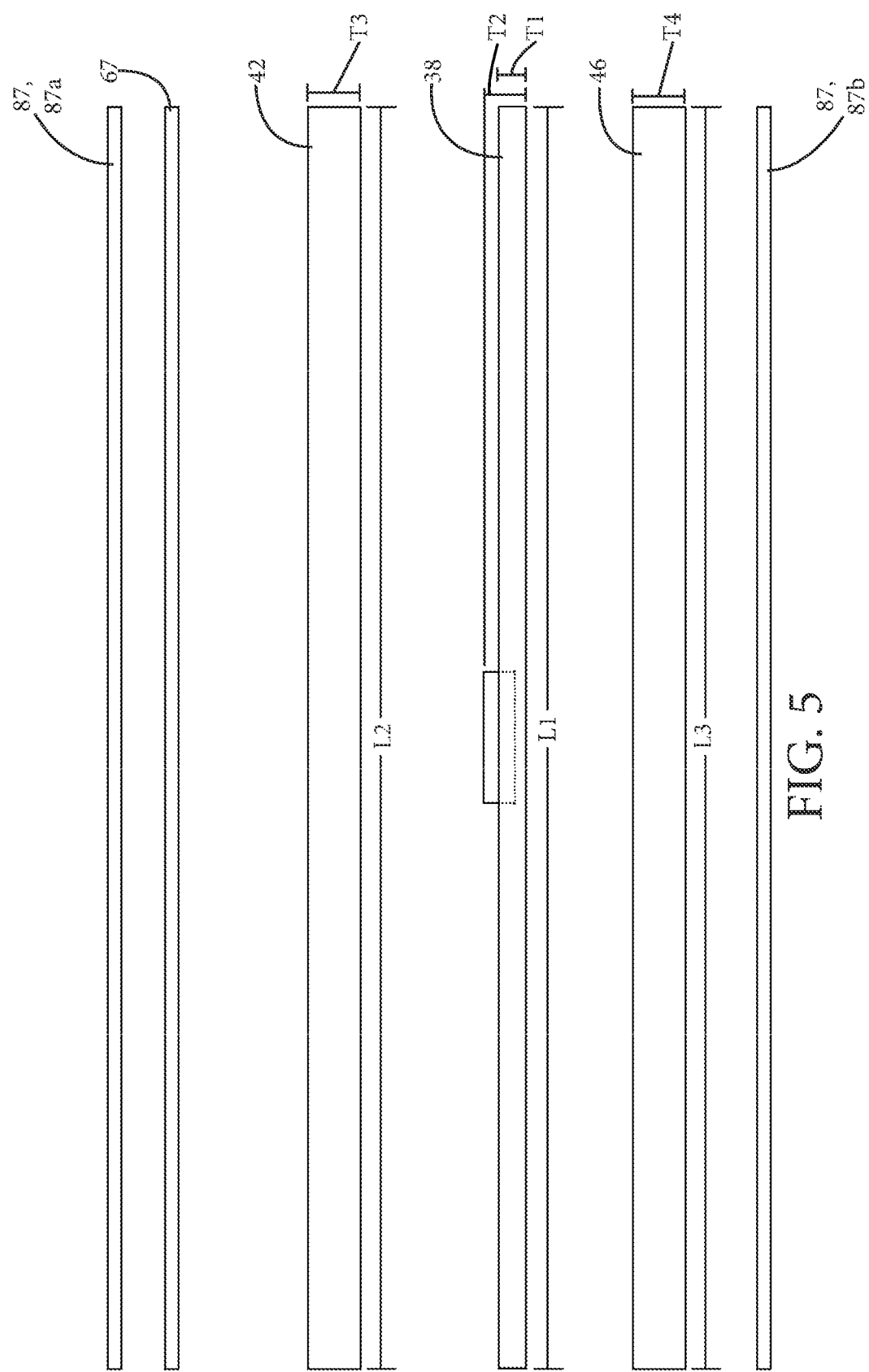
FIG. 5 is an exploded side view of the location designation RFID tag of FIG. 3.

FIGS. 3-6 illustrates a location designation RFID tag 30, 32 for use in the inventory tracking system described above. In particular, FIG. 2 illustrates a perspective view of a single location designation RFID tag 30, 32; FIG. 3 illustrates a cross-sectional view of the location designation RFID tag 30, 32 of FIG. 2 along line A-A; FIG. 4 illustrates an exploded view of the location designation RFID tag 30, 32 of FIG. 2; and FIG. 5 illustrates a top view of the location designation RFID tag 30, 32 of FIG. 2. The location designation RFID tag 30, 32 may be non-invasively placed anywhere in the environment 10 to mark, or designate, a particular location within the environment 10 because of an adhesive disposed on a side of the location designation RFID tag 30, 32. In other words, because of the adhesive, the location designation RFID tag 30, 32 may be secured to a surface without defacing the surface. For example, the location designation RFID tag 30, 32 can be placed on the floor of the environment at or near a shelf 12, on the floor of the environment at or near a particular bay 14A-X of a shelf 12, or on the floor of the environment at or near a particular loading bay 30 to designate that location as a point of interest within the environment.

As best illustrated in FIGS. 4 and 5, the location designation RFID tag 30, 32 generally includes an inlay 38, a first layer 42 adhered to a first side 38A of the inlay 38, and a second layer 46 adhered to a second side 38B of the inlay 38. In particular, the inlay 38 includes an antenna 51, an RFID chip, or integrated circuit, 54 conductively bonded to the antenna 51, and a substrate 58 on which the antenna 51 and the RFID chip 54 are disposed. The conductive bond communicatively couples the antenna 51 and the RFID chip 54 such that the antenna 51 receives the interrogation signal and power therewith sent by an RFID reader 20 and transmits the received interrogation signal and power to the RFID chip 54. In turn, the antenna 51 receives an interrogation response signal from the RFID chip 54 and transmits the received interrogation response signal to the RFID reader 20. As discussed above in relation to FIG. 1, the RFID reader 20 that reads and detects various location designation RFID tags 30, 32 may be place on the forklift 34. Because the forklift 34 is often moving quickly throughout the environment, it is desirable to ensure a strong communication connection between the RFID reader and the location designation RFID tags 30, 32. It has been found that inlays 38 having a length L1 (FIG. 5) and a width W1 (FIG. 3) that create a large surface area for the RFID reader 20 to detect may help facilitate the strong communication connection. For example, the length L1 (FIG. 5) of the inlay 38 can be between 1 and 10 inches (25.4 to 254 mm) and the width W1 (FIG. 3) of the inlay 28 can be between 0.10 and 10 inches (2.54 and 254 mm) and, in particular, the length L1 (FIG. 5) can be between 3 and 4 inches (76.2 and 101.6 mm) and the width W1 (FIG. 3) can be between 0.30 and 1 inches (7.62 and 25.4 mm). In other examples, the length L1 (FIG. 5) of the inlay 38 can be approximately 3.25 inches (82.55 mm), 3.55 inches (90 mm), 3.87 inches (98.18 mm), etc., and the width W1 (FIG. 3) of the inlay 38 can be approximately 0.48 inches (12.31 mm), 0.50 inches (12.70 mm), 0.75 inches (19 mm), etc.

Examples of antennas 51 that can provide a sufficiently strong communication connection between the location designation RFID tag 30, 32 and the RFID reader include a squiggle antenna, a squiglette antenna, a squiglette-E antenna, a short squiggle antenna, an express squiggle antenna, or a squig antenna. In particular, the antenna 51 can be an Alien Squiggle version 9740 or 9840, an Alien Document inlay version 9841, an Alien Garment Tag Inlay versions 9827, an AD-661r6 UHF RFID inlay, or an AD-661r6-P UHF RFID inlay. The RFID chip 54 can, for example, be a Higgs™ 9 RFID tag IC, a Higgs™-EC RFID tag IC, an Impinj Monza r6, or an Impinj Monza r6-P.

Moreover, the inlay 38 may also have an antenna thickness T1 (FIG. 5) that corresponds to the distance from the bottom surface of the inlay 38 to the top surface of antenna 51 and an RFID chip thickness T2 that corresponds to the distance from the bottom surface of the inlay 38 to the top surface of the RFID chip 54. For example, the antenna thickness T1 (FIG. 5) can be between 0.0039 to 0.0197 inches (0.10 to 0.50 mm) and the RFID chip thickness T2 (FIG. 5) can be between 0.010 to 0.0394 inches (0.254 to 1 mm), and, more particularly the antenna thickness T1 (FIG. 5) can be approximately 0.0063 inches (0.16 mm) and the RFID chip thickness T2 (FIG. 5) can be approximately 0.014 inches (0.36 mm).

As illustrated in FIGS. 4 and 5, the location designation RFID tag 30, 32 has the first layer 42 disposed on the first side 38A of the inlay 38 and the second layer 46 disposed on the second side 38B of the inlay 38. In particular, the first layer 42 is adhered to the first side 38A of the inlay 38 using a first adhesive 63 such as, for example, a heat activated adhesive, an epoxy, a pressure sensitive adhesive, or any other mechanical means. So configured, the first layer 42 may help reduce, or absorb, impact as the forklift 34 drives over the location designation RFID tag 30, 32 thereby protecting the underlying inlay 38 and potentially extending the useful life of the location designation RFID tag 30, 32. Accordingly, it is desirable that the first layer 42 be made of a material strong enough to withstand the weight of the forklift 34, or other heavy machinery, driving over the location designation RFID tag 30, 32 yet conducive enough to allow the RFID reader 20 to establish a communication connection strong enough to properly transmit the interrogation signal to and receive the interrogation response signal from the location designation RFID tag 30, 32. Such material properties can be achieved by forming the first layer 42 from, for example, a durable thermoplastic material such as a semi-rigid polyester, a rigid polyvinyl chloride (PVC), a polycarbonate, a polyethylene, or a polypropylene.

Further, the first layer 42 includes a length L2 (FIG. 4) and a width W2 (FIG. 3) that extend past, or encapsulate, the inlay 38 thereby providing additional protection of the inlay 38. For example, the length L2 (FIG. 4) of the first layer 42 can be between 2 and 10 inches (50.8 and 254 mm)), 3 to 8 inches (76.2 to 203.2 mm), 4 to 7 inches (101.6 to 177.8 mm), 5 to 10 inches (127 to 254 mm), 6 to 9 inches (152.4 to 228.6 mm), 4 to 8 inches (101.6 to 203.2 mm), and the width W2 (FIG. 3) of the first layer 42 can be between 0.5 and 5 inches (12.7 and 127 mm), 1 to 3 inches (25.4 to 127 mm), 2 to 5 inches (50.8 to 127 mm), 3 to 4 inches (76.2 to 101.6 mm). In particular, the length L2 (FIG. 4) of the first layer 42 may be approximately 4 inches (101.6 mm) and the width W2 (FIG. 3) of the first layer 42 may be approximately 1 inch (25.4 mm).

As discussed above, to avoid disposing a location designation tag in a hole drilled in the floor of a storage facility, location designation tags were mechanically secured to the floor (e.g., using a nut and bolt, a screw, or other fastener), but, disadvantageously, were often too thick to be driven over by a forklift, or other movable device. Unlike known location designation tags, it is desirable that the first layer 42 of the claimed location designation RFID tag 30, 32 includes a thickness T3 such that the forklift 34, or other heavy machinery, moving through the environment may drive over the location designation RFID tag 30, 32 with minimal, or without any, disturbances. So configured, the thickness T3 of the first layer 46 can, for example, be between approximately 0.10 and 1 inches (2.54 and 25.4 mm), between 0.10 and 0.30 inches (2.54 and 7.62 mm), and, more particularly, the thickness T3 of the first layer 42 can be approximately 0.1095 inches (2.78 mm).

The second layer 46, illustrated in FIGS. 4 and 5, is similar to the first layer 42 in that the second layer 46 is adhered to the inlay 38 using a second adhesive 77, but, unlike the first layer 42, the second layer 46 is adhered to the second side 38B of the inlay 38. Because the second layer 46 is disposed between the floor and the inlay 38 In particular, a first side 46A of the second layer 46 is adhered to the second side 38B of the inlay 38 using the second adhesive 77 such as, for example, a heat activated adhesive, an epoxy, or a pressure sensitive adhesive. So configured, the second layer 46 may aid the first layer 42 in reducing, or absorbing, impact as the forklift 34 drives over the location designation RFID tag 30, 32. Accordingly, it is desirable that the second layer 46 be made of a material that is strong enough to withstand the weight of the forklift 34, or other heavy machinery, driving over the location designation RFID tag 30, 32. Such material properties may be achieved by forming the second layer 46 from, for example, a durable thermoplastic material such as a semi-rigid polyester, a rigid polyvinyl chloride (PVC), a polycarbonate, a polyethylene, or a polypropylene.

Further, the second layer 46 includes a length L3 (FIG. 4) and a width W3 (FIG. 3) that extend past, or encapsulate, the inlay 38. In particular, the length L3 (FIG. 4) and width W3 (FIG. 3) of the second layer 46 may be substantially equal to the length L2 (FIG. 3) and the width W2 (FIG. 3) of the first layer 42. In other words, the length L3 (FIG. 4) of the second layer 46, for example, can be between 2 and 10 inches (50.8 and 254 mm), 3 to 8 inches (76.2 to 203.2 mm), 4 to 7 inches (101.6 to 177.8 mm), 5 to 10 inches (127 to 254 mm), 6 to 9 inches (152.4 to 228.6 mm), 4 to 8 inches (101.6 to 203.2 mm), and the width W3 (FIG. 3) of the second layer 46 can be between 0.5 and 5 inches (12.7 and 127 mm), 1 to 3 inches (25.4 to 127 mm), 2 to 5 inches (50.8 to 127 mm), 3 to 4 inches (76.2 to 101.6 mm). More particularly, the length L3 (FIG. 4) of the second layer 46 may be approximately 4 inches (101.6 mm) and the width W3 (FIG. 3) of the second layer 46 may be approximately 1 inch (25.4 mm). However, in some examples, the length L3 (FIG. 4) and the width W3 (FIG. 3) of the second layer 46 can be different than the length L2 (FIG. 4) and the width W2 (FIG. 3) of the first layer 42.

Known RFID tags have been used with limited success when placed on a floor (e.g., a concrete floor) of a storage facility because the floor may "detune" the RFID tag, which undesirably inhibits an RFID reader from establishing a strong communication connection with the RFID tag disposed on the floor. Disposing the second layer 46 on the second side 38B of the inlay 38 (i.e., between the floor of the environment 10 and the inlay 38) advantageously creates a barrier between the inlay 38 and the floor, which may prevent, or at least mitigate, detuning of the location designation RFID tag 30, 32. It is therefore important that a thickness T4 of the second layer 46 creates a sufficient barrier between the floor and the inlay 38 to prevent, or at least mitigate, detuning of the location designation RFID tag 30, 32. It has been found that, for example, the thickness T4 (FIG. 5) of the second layer 46 can be between 0.10 and 1 inches (2.54 and 25.4 mm), between 0.10 and 0.30 inches (2.54 and 7.62 mm), and, more particularly, the thickness T4 of the second layer 46 can be approximately 0.1095 inches (2.78 mm).

Moreover, known location designation tags require defacing the floor of the storage facility by either creating a hole in the floor large enough to receive the location designation tag or securing the location designation tags to the floor using a mechanical fastener (e.g., using a nut and bolt, a screw, or other fastener). Unlike known location designation tags, it is desirable that the location designation RFID tag 30, 32 be applied to the floor of the environment 10 in a non-invasive manner. It is therefore important that the second layer 46 includes an adhesive capable of releasably attaching the location designation RFID tag 30, 32 to the floor of the environment 10. Accordingly, as illustrated in FIG. 4, a second side 46B of the second layer 46 includes a third adhesive 86 such as, for example, cyanoacrylates, structural acrylic adhesives, or epoxy adhesives, disposed thereon. The third adhesive 86 may be a semi-permanent adhesive that acts similar to a permanent adhesive in that the third adhesive 86 makes it difficult for the location designation RFID tag 30, 32 to be removed from the floor accidently. However, the third adhesive 86 may be releasable enough that the location designation RFID tag 30, 32 may be removed from the floor using a scraper and then reapplied using a spray adhesive. While the third adhesive 86 has been discussed as releasably attaching the location designation RFID tag 30, 32 to the floor of the environment 10, in other examples, the third adhesive 86 can permanently attach the location designation RFID tag 30, 32 to the floor of the environment 10.

Figure 6:
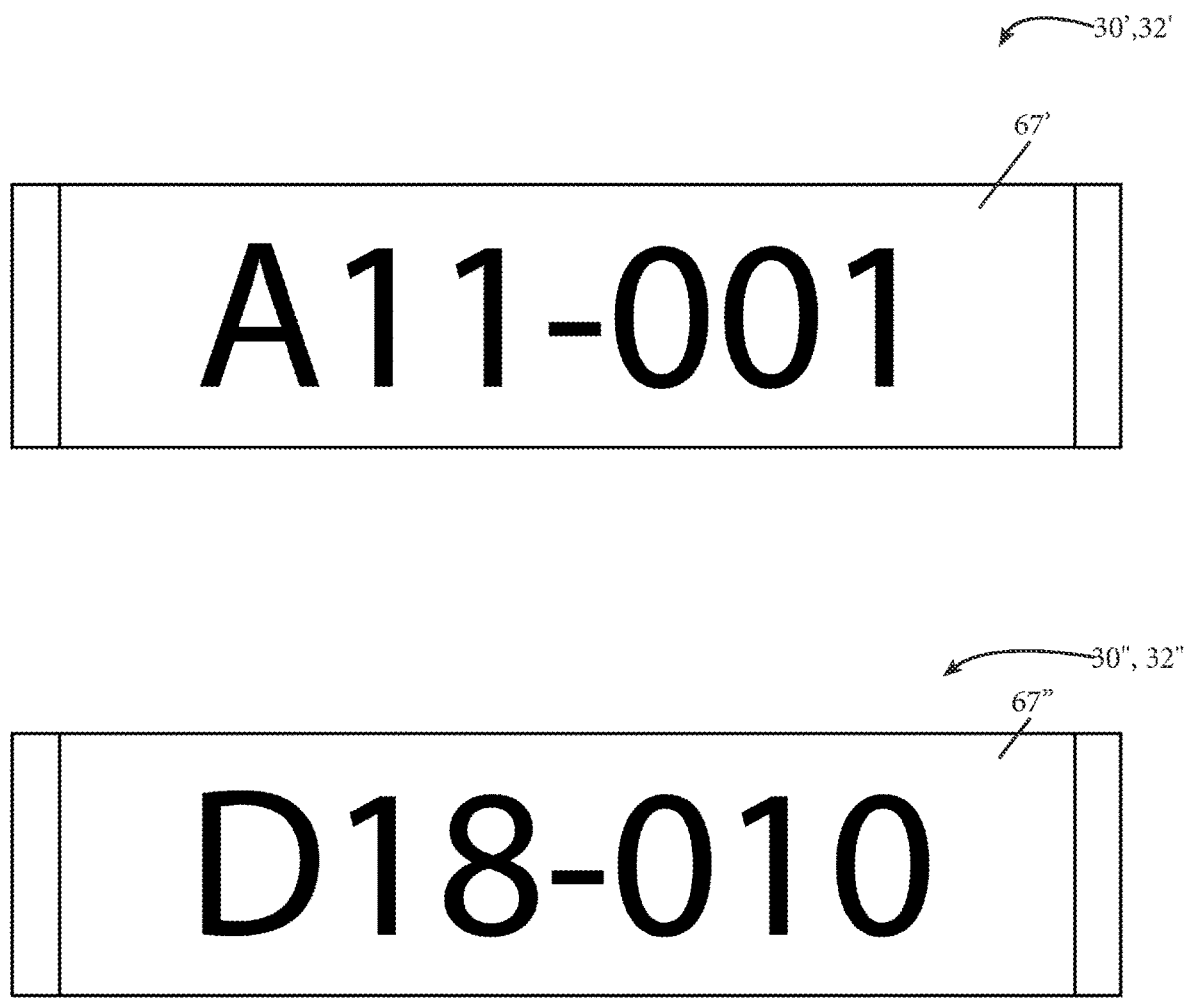
FIG. 6 is a top view of the location designation RFID tag of FIG. 3, including information about the location designation RFID tag disposed thereon.

Additionally, as illustrated in FIG. 6, the location designation RFID tag 30, 32 includes a printing layer 67 that may have words, letters, phrases, and/or numbers that visually convey information about the particular location designation RFID 30, 32 to a user. It is desirable that a location designation RFID tag 30, 32 be able to visually convey information about the particular location designation RFID tag 30, 32 because doing so may aid in the placement of the location designation RFID tags 30, 32 around the environment 10 and as well as aid a forklift driver in determining where they are in the environment 10. The printing layer 67 may be disposed on the first layer 42 using a similar attachment technique as discussed above with regard to adhering the first layer 42 or second layers 46 to the inlay 38. For example, the printing layer 67 can be adhered to the first layer 42 using a heat activated adhesive, an epoxy, or a pressure sensitive adhesive. The printing layer 67 may be between 0.001 and 0.010 inches (0.0254 to 0.254 mm) thick and, more particularly, may be approximately 0.003 inches thick (0.0762 mm). The printing layer 67 may also disguise the location designation RFID tag 30, 32 such that the location designation RFID tag 30, 32 blends in with the area surrounding the placed location designation RFID tag 30, 32. For example, if the location designation RFID tag 30, 32 is placed on a concrete floor, the printing layer 67 can be colored gray to help the location designation RFID tag 30, 32 blend in with the floor. In other examples, the printing layer 67 may be the top surface of the first layer 42 provided that the first layer 42 is made of a material capable of being printed on.

After coupling the printing layer 67 to the first layer 42, the first layer 46 to the inlay 38, and the second layer 46 to the inlay 38 (i.e., once the location designation RFID tag 30, 32 is assembled) the location designation RFID tag 30, 32 has an overall thickness T5 (FIG. 4). In particular, the overall thickness T5 may vary depending on the RFID chip thickness T2, the thickness T3 of the first layer 42, and the thickness T4 of the second layer 46. However, it is desirable, for reasons discussed extensively above, that the RFID chip thickness T2, the thickness T3 of the first layer 42, and the thickness T4 of the second layer 46 be such that the overall thickness T5 allows for the forklift 34 to drive over the location designation RFID tag 30, 32 with little to no disturbances. It has been found that, for example, the overall thickness T5 can be between 0.10 and 0.50 inches (2.54 and 12.7 mm), between 0.20 and 0.30 inches (5.08 and 7.62 mm) and more particularly approximately 0.236 inches (5.99 mm).

Additionally, forklifts 34 driving over location designation RFID tags 30, 32 may leave tire marks or debris on the printing layer 67 making it difficult for an individual in the environment 10 to read and/or understand the visual indication on the printing layer 67. Similarly, a forklift operator with a tire of the forklift 34 resting on the location designation RFID tag 30, 32 may unintentionally spin the tires in place (e.g., a burnout) thereby damaging, removing, loosening, and/or repositioning the location designation RFID tag 30, 32. It is therefore desirable that the location designation RFID tag 30, 32 includes a plurality of lamination layers 87 adhered to the first and second layers 42, 46 that may mitigate, and/or prevent, against such damage, removal, loosening, and/or repositioning. The plurality of lamination layers 87 may also provide protection against the elements such as water, dust, mold, etc. and chemical spills.

For example, as illustrated in FIG. 5, the plurality of lamination layers 87 can include a first lamination layer 87a adhered to the first layer 42 and a second lamination layer 87b adhered to the second layer 46. To adequately protect the location designation RFID tag 30, 32, the first and second lamination layers 87a, 87b may extend past the first and second layers 42, 46 such that when the first and second lamination layers 87a, 87b are coupled to one another, the location designation RFID tag 30, 32 is encapsulated by the plurality of lamination layers 87. So configured, an adhesive (not illustrated) may be disposed on at least one of the pluralities of lamination layers 87 instead of, or in addition to, the third adhesive 86 for attaching the laminated location designation RFID tag 30, 32 to the floor of the environment 10. The plurality of lamination layers 87 can be, for example, a rigid polyester, vulcanized fiber, phenolic, polyester, malemine resin, an epoxy, or silicone. In other examples, the location designation RFID tag 30, 32 can be laminated directly to the floor of the environment 10 using a single lamination later rather than a plurality of lamination layers 87.

After assembly, but prior to use, the location designation RFID tag 30, 32 may be programmed, or encoded, so that the RFID reader 20 may properly distinguish and/or identify one location designation RFID tag 30, 32 from another location designation RFID tag 30, 32. In particular, each location designation RFID tag 30, 32 can be encoded with a unique identifier indicative of a particular shelf 12, or bay 14A-X of the shelf 12, using, for example, text encoding, hexadecimal encoding, or serialized global trade item number ("SGTIN"). Once the location designation RFID tags 30, 32 have been encoded, it may not be possible to determine which unique identifier was encoded to which location designation RFID tag 30, 32 without the use of an RFID reader 20. It is therefore desirable that the printing layer 67 include words, letters, numbers, phrases, or any combination thereof, associated with the unique identifier printed, or otherwise disposed, thereon. So configured, the printing layer 67 may provide a visual indication of which unique identifier was encoded thereon and, ultimately, provide a visual indication of where the location designation RFID tag 30, 32 is to be placed within the environment 10.

Turning back to FIG. 6, which illustrates the printing layer 67' of a first location designation RFID tag 30, 32' and the printing layer 67" of a second location designation RFID tag 30, 32". If, for example, a user would like to place the first location designation RFID tag 30, 32" at bay "001" of shelf "A11," then the first location designation RFID tag 30, 32' can be encoded to store that information on an electronic product code ("EPC") memory of the RFID chip 54. In turn, the printing layer 67' may have a first designation such as, "A11-001" printed, or otherwise deposited thereon to visually indicate to the user where the first location designation RFID tag 30, 32" is to be placed without the use of an electronic device capable of reading and displaying the information stored in the EPC memory of the RFID chip 54. Similarly, if, for example, a user would like to place the second location designation RFID tag 30, 32" at bay "010" of shelf "D18," then the second location designation RFID tag 30, 32" can be encoded to store that information on the EPC memory of the RFID chip 54. In turn, the printing layer 67" may have a second designation such as, "D18-010" printed, or otherwise deposited thereon to visually indicate to the user where the second location designation RFID tag 30, 32" is to be placed without the use of an electronic device capable of reading and displaying the information stored in the EPC memory of the RFID chip 54.

Once all of the desired location designation RFID tags 30, 32 have been encoded and placed throughout the environment 10, the RFID reader 20 disposed on the forklift 34 uses an antenna 21 disposed thereon to read and detect the information encoded on the location designation RFID tag 30, 32 within range of the antenna 21. In particular, the RFID reader 20 provides power to the antenna 21, which then sends the interrogation signal in the direction that the antenna 21 is facing. The interrogation signal transmits both power and a request signal to the antenna 51 of the location designation RFID tag 30, 32, which transmits both the power and request signal to the RFID chip 54. In response to receiving the request signal, the RFID chip 54 queries the EPC memory for the encoded information stored thereon. In turn, the antenna 51 receives the encoded information from the RFID chip 54 and transmits the interrogation response signal including the encoded information to the antenna 21, which will ultimately transmit the interrogation response signal to the RFID reader 20.

As a result of the issues experienced by known location designation tags discussed above, establishing a strong communication connection between an RFID reader and an RFID tag disposed on the floor has been met with little success. While detuning is, among other factors, what may prevent establishing the strong communication connection, the orientation of an RFID tag relative to an RFID reader plays an important role in establishing a strong communication connection. In particular the strength of the communication connection established between the RFID reader 20 and the location designation RFID tag 30, 32 depends on the direction at which a signal arrives relative to the plane at which the antenna 51, 21 is disposed. It is therefore important that the location designation RFID tag 30, 32 not only utilize hardware components that provide the RFID reader 20 with the largest feasible surface area to reach and detect, but also to orient the location designation RFID tags 30, 32 in a manner that provides the strongest communication connection as the forklift 34 with the RFID reader 20 travels throughout the environment 10. It has been determined that disposing the location designation RFID tag 30, 32 on the floor of the environment 10 at an orientation that is perpendicular to the direction the direction of travel of the forklift 34 may establish a strong communication connection between the location designation RFID tag 30, 32 and the RFID reader 20 on the forklift.

Figure 7:
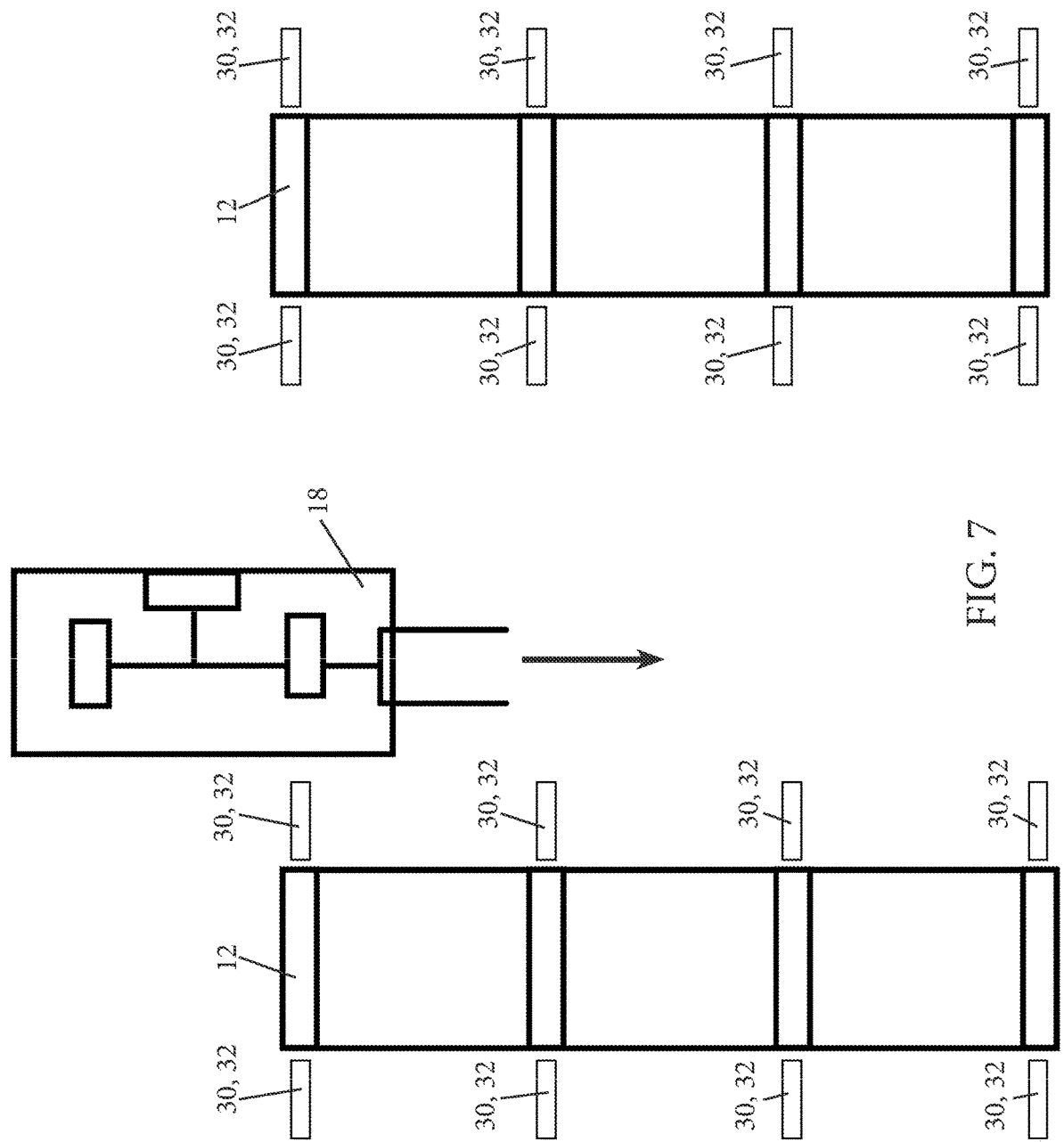
FIG. 7 is a top view of a plurality of shelves in a storage and shipping environment of FIG. 1 illustrating a movable device traveling and reading the location designation RFID tag of FIG. 3.

FIG. 7 illustrates one example location designation RFID tag placement scheme that can provide a strong communication connection between the location designation RFID tag 30, 32 and the RFID reader 20 based on the direction of travel of the forklift 34. In particular, several location designation RFID tags 30, 32 are oriented relative to a direction of travel (indicated with an arrow) of the forklift 34 that may establish the strongest communication connection between the location designation RFID tag 30, 32 and the RFID reader 20 disposed on the forklift 34. In particular, the shelves 12 may be arranged within the environment so that the forklift 34 drives parallel to the shelves 12 as the forklift driver is travels to place or pick up a product 30, 32. The antenna 21 may then be arranged on the forklift 34 so that a signal transmitted from the antenna 21 is transmitted in the direction of travel of the forklift 34. In turn, the location designation RFID tags 30, 32 may be oriented on the floor of the environment 10 so they are perpendicular to the direction of travel of the forklift 34 and the signal transmission direction of the antenna 21. Because the location designation RFID tag 30, 32 may not be symmetrical, some orientations of the location designation RFID tag 30, 32 may provide a stronger communication connection than others. For example, the overall length of location designation RFID tag 30, 32 is greater than an overall width of the location designation RFID tag 30, 32. So configured, orienting the location designation RFID tag 30, 32 so that the length of the of the location designation RFID tag 30, 32 is perpendicular to the direction of travel of the forklift 34 provides the antenna 21 with the largest surface area of the location designation RFID tag 30, 32 to read and detect. In particular, orienting the location designation RFID tag 30, 32 in this manner ensures that the dimension of the antenna 51 of the inlay 38 having the largest surface area is perpendicular to the direction of signal transmission of the antenna 21 disposed on the forklift 34. As defined herein, substantially perpendicular may mean exactly 90° between the longest edge of the location designation RFID tag and the direction of signal transmission of the antenna 21 disposed on the forklift 34. However, substantially perpendicular may also mean between 45° and 90° between the longest edge of the location designation RFID tag and the direction of signal transmission of the antenna 21 disposed on the forklift 34; between 90° and 135° between the longest edge of the location designation RFID tag and the direction of signal transmission of the antenna 21 disposed on the forklift 34; and/or between 45° and 135° between the longest edge of the location designation RFID tag and the direction of signal transmission of the antenna 21 disposed on the forklift 34.

However, some location designation RFID tags 30, 32 may have overall dimensions that do not mirror the dimensions of the inlay 38. In such examples, the printing layer 67 can have an orientation indicator disposed thereon that visually indicates the proper orientation of the location designation RFID tag 30, 32 relative to the direction of travel of the moving device that includes the RFID reader 20 and antenna 21. In other words, the orientation indicator may provide a visual guide to a user on how to place the location designation RFID tag 30, 32 on the floor, or other surface, of the environment 10 such that a strong communication connection may be established between the RFID reader 20 and the location designation RFID tag 30, 32.

Moreover, because the environment 10 may several locations to be designated, or otherwise marked, several location designation RFID tags 30, 32 may be placed in close proximity to one another. Such close placement of several location designation RFID tags 30, 32, however, may cause the RFID reader 20 to read and detect multiple location designation RFID tags 30, 32 at once thereby preventing the RFID reader 20 from "locking on" to a particular location designation RFID tag. It is therefore important the location designation RFID tags 30, 32 be placed on the floor of the environment 10 with an adequate distance between each location designation RFID tag 30, 32 so that the RFID reader 20 reads one location designation RFID tag 30, 32 at a time. It has been found that, for example, placing each location designation RFID tag 30, 32 at least 12 inches apart from every other location designation RFID tag 30, 32 allows the RFID reader 20 to read and lock-on to one location designation RFID tag 30, 32 at a time.

However, several location designation RFID tags 30, 32 may be placed in close proximity to one another at a single location purposefully. For example, there may be locations within the environment 10 that have a considerable number of objects that may be between the RFID reader 20 and location designation RFID tag 30, 32 which may interfere with the communication connection between the RFID reader 20 and the location designation RFID tag 30, 32. As a result, several location designation RFID tags 30, 32 may be placed in a group (e.g., 2, 3, 4, or 5) to designate a single location. Accordingly, each of the location designation RFID tags 30, 32 placed in the group may be encoded with the same location but include a unique identifier to be able to easily identify each location designation RFID tag 30, 32 in the group.

Figure 8:
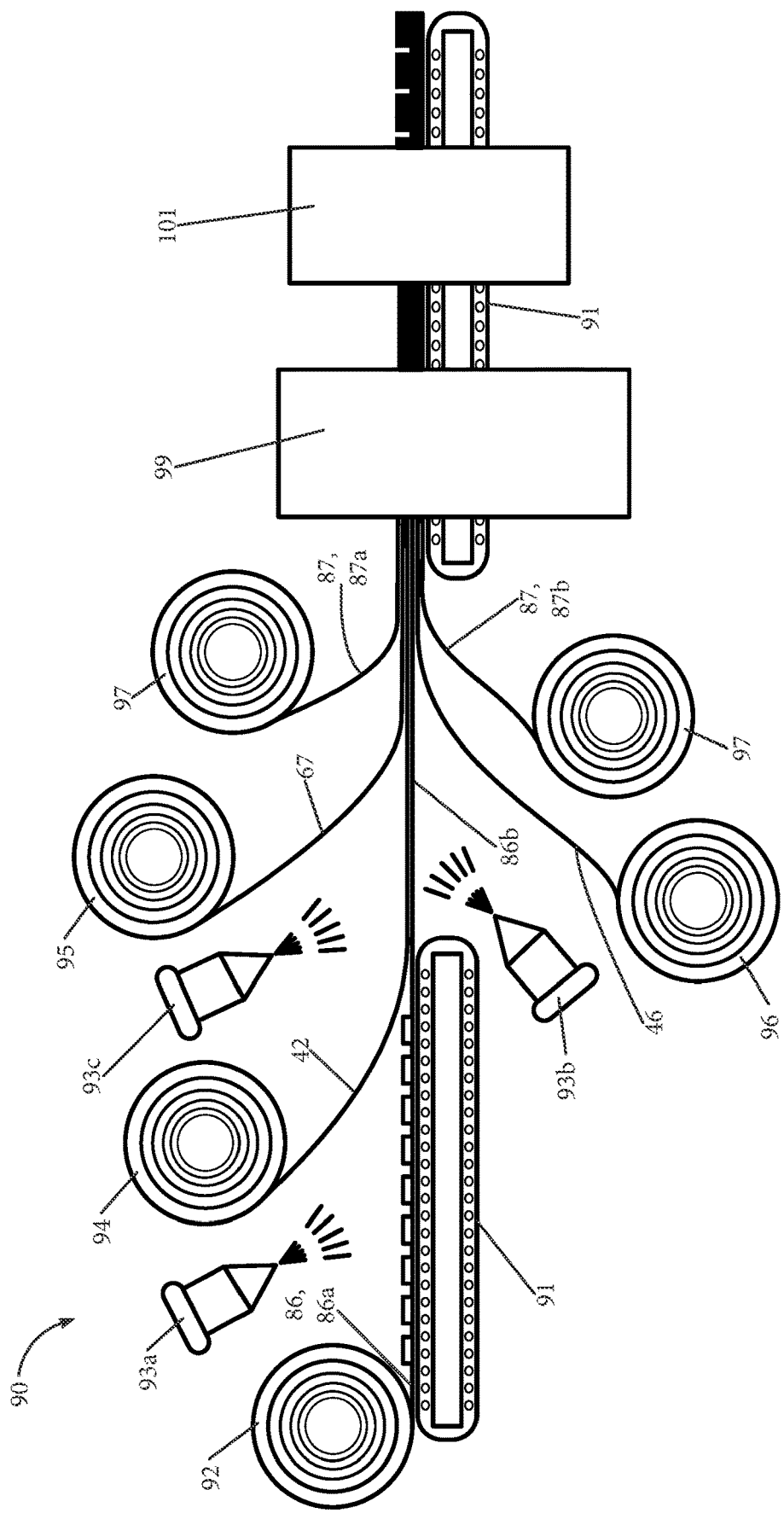
FIG. 8 is an example assembly line for producing the location designation RFID tag of FIG. 3.
Figure 9:
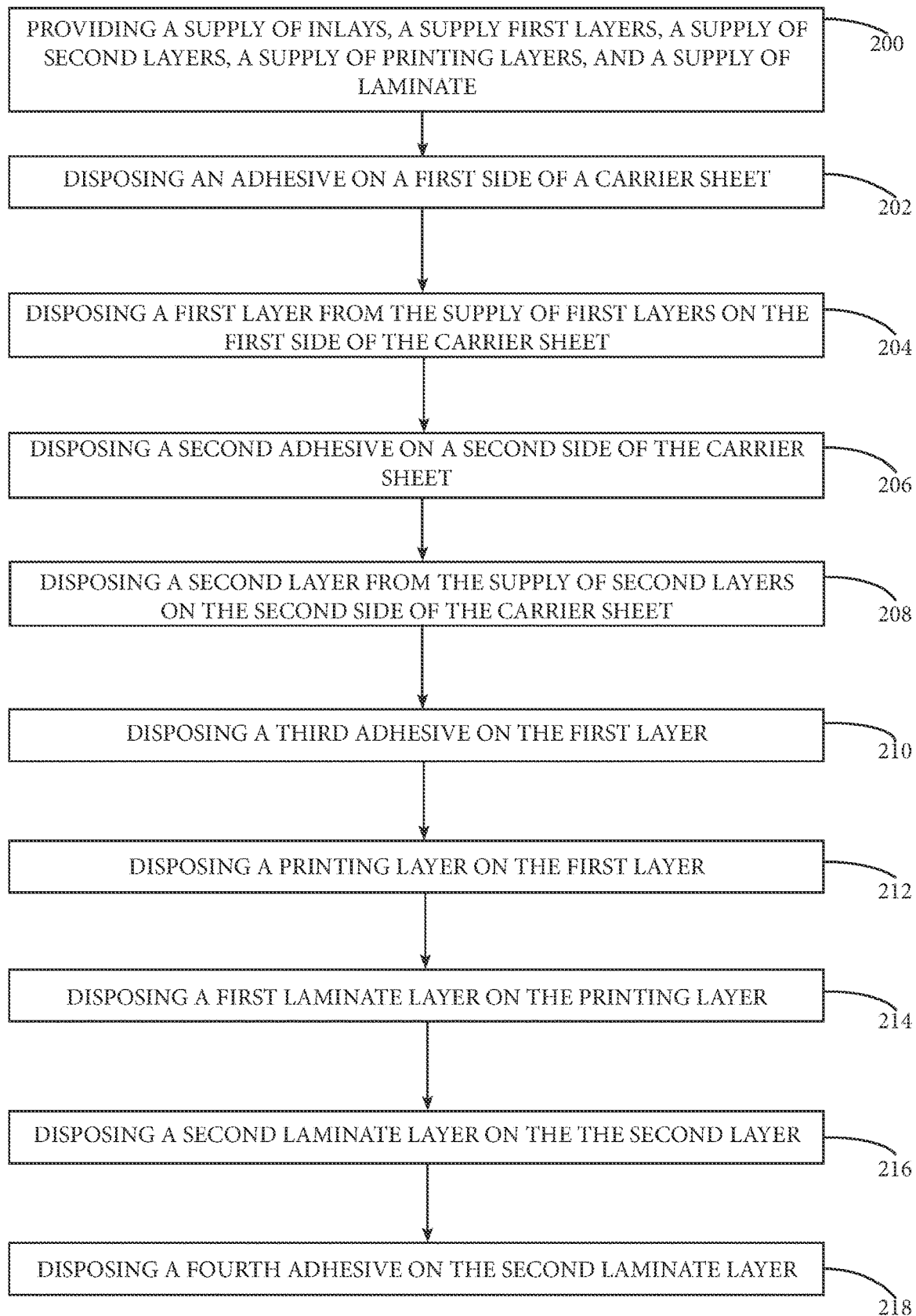
FIG. 9 is a flow chart illustrating an example method of manufacturing the location designation RFID tag of FIG. 3.

FIGS. 8 and 9 illustrate methods of manufacturing the location designation RFID tag 30, 32 of FIG. 2. In particular, FIG. 8 illustrates an assembly line 190 for mass producing the location designation RFID tag 30, 32 and FIG. 9 illustrates a method of manufacturing the location designation RFID tags 30, 32 of FIG. 3. As discussed above, known location designation tags were either placed in a clunky or oblong housing or constructed to withstand being placed in a floor and then coved with an epoxy. Assembly and preparation for such known RFID tags may require an involved manufacturing and assembly process. One manufacturing process is disclosed with reference to FIG. 8, but other processes can be used to manufacture the location designation RFID tag.

As illustrated in FIG. 8, the assembly line 190 for manufacturing the location designation RFID tag 30, 32 generally includes a conveyor belt 91, or other transport mechanisms, a supply of inlays 38, a supply of the first layer 42, and a supply of the second layer 42. The supply of inlays 38 may be an inlay roll 92 that is disposed toward a beginning of the assembly line 190 and formed by disposing multiple inlays 38 on a carrier sheet 86 where each inlay 38 is disposed a fixed distance from every other inlay 38. The inlay roll 92 may be operably coupled to the conveyor belt 91 such that the inlay roll 92 unrolls under the force exerted thereon as the conveyor belt 91 moves forward thereby providing a continuous supply of the carrier sheet 86 with the inlays 38 disposed thereon. So configured the inlay roll 92 may be mounted, or otherwise secured, to a structure allowing the inlay roll 92 to continuously unroll in response to the conveyor belt moving. In some examples, however, the inlay roll 92 can be disposed within a container having an opening through which the carrier sheet 86 passes. The opening of the container can have a cover that allows the carrier sheet 86 to pass through while mitigation, or preventing, debris from entering the container.

The supply of first layers 42 may be a first layer roll 94 formed by disposing multiple first layers on a carrier sheet where each first layer 42 is disposed a fixed distance from every other first layer 42. The first layer roll 94 may be operably coupled to the conveyor belt 91 such the first layer roll 94 unrolls under the force exerted thereon as the as the conveyor belt 91 moves forward thereby providing a continuous stream of the carrier sheet with the first layer 42 disposed thereon. So configured, the first layer roll 94 may be mounted, or otherwise secured, to a structure allowing the first layer roll 94 to continuous unroll in response to the conveyor belt 91 moving. In some examples, the first layer roll 94 can be disposed within a container having an opening through which the carrier sheet with the first layers 42 passes. The opening of the container can have a cover that allows the carrier sheet to pass through while mitigation, or preventing, debris from entering the container.

The supply of second layers 42 may be a second layer roll 196 formed by disposing multiple second layers on a carrier sheet where each second layer 46 is disposed a fixed distance from every other second layer 46. The second layer roll 196 may be operably coupled to the conveyor belt 91 such the second layer roll 196 unrolls under the force exerted thereon as the as the conveyor belt 91 moves forward thereby providing a continuous stream of the carrier sheet with the second layer 46 disposed thereon. So configured, the second layer roll 196 may be mounted, or otherwise secured, to a structure allowing the second layer roll 196 to continuous unroll in response to the conveyor belt 91 moving. In some examples, the second layer roll 196 can be disposed within a container having an opening through which the carrier sheet with the second layers 46 passes. The opening of the container can have a cover that allows the carrier sheet to pass through while mitigation, or preventing, debris from entering the container.

It is desirable, for example, that the distance between each inlay 38 disposed on the inlay roll 92, the distance between each first layer 42 disposed on the first layer roll 94, and the distance between each second layer 46 disposed on the second layer roll 196 be substantially the same. In other examples, however, rather than having a carrier sheet with first layers 42 or second layers 46 disposed thereon, the first layer roll 94 and the second layer roll 196 can be made entire from the material used to form the first layer 42 and second layer 46, respectively. In such examples, the inlays 38 disposed on the carrier sheet 86 can be disposed from every other inlay 38 disposed thereby on any distance that may assist with the assembly of the location designation RFID tags.

As illustrated in FIG. 8, the inlay roll 92 may be disposed toward a beginning of the conveyor belt 91, the first layer roll 94 may be disposed a first distance from the inlay roll 92 proximate the conveyor belt 91, and the second layer roll 196 may be disposed a second distance from the inlay roll 92 proximate the conveyor belt 91. The first and second distances may be great enough such that the inlay roll 92 may be inspected prior to reaching the first layer roll 94 and/or the second layer roll 196. In particular, the first and second distances may be substantially similar such that the first layer roll 94 is disposed above the conveyor belt 91 while the second layer roll 196 is disposed below the conveyor belt 91. Doing so may allow the first layer 42 and the second layer 46 to be simultaneously applied to either side of the carrier sheet 86 with the inlay 38 disposed thereon. However, the first distance can be different from the second distance in other examples.

The assembly line 190 may also include a supply of printing layers 95 as well as a supply of laminate 97, which may be operably coupled to the conveyor belt 91 in a similar manner as the supplies of first and second layers. In particular, the supply of printing layers 95 and the supply of laminate 97 may be disposed away from both the supply of first layers and the supply of second layers so as not to interfere with the application of the first and second layers 42, 46 to the inlays 38. In other examples of the assembly line 190, the inlay roll 92 may be configured to accept the carrier sheet 86 of another inlay roll 92 providing a seamless transition from one inlay roll 92 to another. The first layer roll 94, the second layer roll 196, the supply of printing layers, and the supply of laminate can also be so configured, which may prevent, or at least mitigate, the need for a significant downtime to replenish the supply of the various components used to assemble the location designation RFID tags 30, 32.

The assembly line 190 may also include an applicator 97 for securing the first and second layers 42, 46 to the inlay 38 and a cutter 98 capable to cutting, puncturing, punching, perforating, or otherwise modifying the inlay roll 92, the first layer roll 94, and the second layer roll 196 before or after assembly of the location designation RFID tag 30, 32. As illustrated in FIG. 8, the applicator 97 is disposed on the assembly line 190 such that the conveyor belt passes through the applicator 97. The application 97 may act upon the first layer 42, the inlay 38, and the second layer 46 in a variety of ways that are dependent on how the first and second layers 42, 46 are to be secured to the inlay 38. For example, the first and second layers 42, 46 can have an adhesive applied to at least one side that secures the first and second layers 42, 46 to the inlay 38 upon making contact with the inlay 38. In such an example, the applicator 97 simultaneously applies a force to both the first and second layers 42, 46 as the conveyor belt 91 passes through the applicator 97 thereby ensuring the first and second layers 42, 46 are properly adhered to the inlay 38. As another example, the first and second layers 42, 46 can have a heat activated adhesive applied to at least one side thereof. In such an example, the applicator 97 can supply the heat necessary to activate the adhesive as the conveyor belt 91 passes through the applicator 97 thereby securing the first and second layers 42, 46 to the inlay 38.

Similarly, the cutter 98 may be disposed on the assembly line 190 such that the conveyor belt 91 passes through or near the cutter 98. In particular, as illustrated in FIG. 8, the cutter 98 may be disposed on the conveyor belt 91 after the applicator 97 thereby interacting with the location designation RFID tag 30, 32 after it has been formed. For example, the cutter 98 can cut individual location designation RFID tags 30, 32 away from the carrier sheet 86 or other excess material. Alternatively, the cutter 98 can perforate, or otherwise puncture, the carrier sheet 86 such that individual location designation RFID tags 30, 32 or groups of location designation RFID tags 30, 32 can be torn away from the carrier sheet 86. Additionally, the cutter 98 may both cut and perforate the carrier sheet 86 such that the carrier sheet 86 is divided into segments that are easily shipped or delivered to a facility using the location designation RFID tags 30, 32.

Referring now to FIG. 9, which illustrates the method of forming the location designation RFID tags 30, 32 using the assembly line 190 illustrated in FIG. 8. The method includes providing the supply of inlays, the supply of first layers, and the supply of second layers (step 200). Once each supply is properly coupled to the conveyor belt 91, an adhesive is applied to a first side of the carrier sheet 86 (step 202). The first layer 42 is then disposed on a first side of the carrier sheet 86, so that each inlay 38 is substantially covered by the first layer (step 204). A second adhesive is then applied to a second side of the carrier sheet 86 (step 206). The second layer 46 is then disposed on the second side of the carrier sheet 86, so that each of the inlay 38 is substantially covered by the second layer (step 208). The application of the first and second layers 42, 46 can be applied to the carrier sheet 86 simultaneously in some examples, or the first and second layers 42, 46 can be applied to the carrier sheet 86 one after another, in other examples. A third adhesive is then applied to the first layer (step 210) after which the printing layer is then applied on top of the third adhesive (step 212). After the printing layer is disposed on the third adhesive, a first lamination layer is disposed on the printing layer (step 214) and a second lamination layer is disposed on the second layer (step 216) Once each layer and adhesive is disposed on the first and second sides of the carrier sheet 86 the method includes adhering or securing the layers to the carrier sheet 86 using the applicator 97. After the first and second layers 42, 46 are adhered to the carrier sheet 86, an adhesive is applied to at least one of the second laminate (step 218). The method may also include disposing a removably layer over the applied adhesive thereby preventing the assembled location designation RFID tag 30, 32 from inadvertently adhering to a surface. Once the adhesive is applied, the method includes cutting, puncturing, and/or perforating the carrier sheet 86.

While the above steps have been discussed in a particular order, the order of steps may be rearranged in order to accommodate additional steps in the manufacturing process. Similarly, the steps discussed above may be rearranged in order to accommodate fewer steps than the steps disclosed above.

Once the location designation RFID tags 30, 32 are assembled and disposed on the carrier sheet 86, the carrier sheet 86 containing the assembled location designation RFID tags 30, 32 may be rolled or otherwise packaged so that the carrier sheet can be loaded into an application device that allows the location designation RFID tags 30, 32 to be rolled onto a surface (e.g., the floor or other structure) rather than peeled manually off of the carrier sheet and affixed to the surface. Such an application device allows the location designation RFID tags 30, 32 to be placed on surfaces faster and more efficiently than peeling and placing the location designation RFID tags 30, 32 manually. Further, the application device may be programmed to deposit the location designation RFID tags 30, 32 at a preset distance from one another. For example, the location designation RFID tags 30, 32 can spaced at least twelve (12) inches apart from one another. The application device can also deposit the location designation RFID tags 30, 32 at variable distances from one another, in some examples, and can deposit the location designation RFID tags at constant distances from one another, in other examples.

Still further, a product designation RFID tag 34 is located on each product 13. Products 13 may be, for example, any type of product or material and or any group of product or material, such as individual rolls of paper or other products, pallets of similar materials, boxes of materials or components, etc. The product designation RFID tags 34 may be releasably attached to products 13 so that these tags may be later used on different products 13. How the product designation RFID tag 34 is releasably attached to the product 13 depends on the product, but may, for example, be achieved using an adhesive, a clip, a magnet, a sticker, etc. Importantly, each of the RFID tags 30, 32, and 34 has a different and unique ID associated therewith and these IDs are known by the asset tracking and management device 26, so that the asset tracking and management device 26 can associate each of the particular location designation RFID tags 30 with a particular bay 14, can associate each of the particular location designation RFID tags 32 with a loading bay 16, and can associate each of the particular product designation RFID tags 34 with a particular product 13.

Generally speaking, the centralized asset tracking and management device 26, which may be a user workstation, a server, or any other type of computing device, may be located in a different room or in a less harsh environment than the shipping or warehouse floor. The asset tracking and management device 26 includes a centralized tracking and management application 36 that is stored in a memory of and executed on a processor of the device 26. The tracking application 36 is communicatively connected to one of the nodes 24 (via a wired or a wireless connection and a communication interface of the device 26) and so is connected to the wireless communication network within the facility 10. The tracking application 36 operates to communicate with the user interface devices 23 and the RFID tag readers 20 to obtain information from and to provide information to the user interface devices 23 and additionally operates to track and manage the movement of the various different products 13 between the shelves 12 and the loading bays 16.

More particularly, the tracking application 36 stores information regarding the RFID tags 30 and 32 identifying particular bays 14 of each shelf 12 and identifying particular loading bays 16 in the product and order database 27 of the device 26. Likewise, the tracking application 36 stores information for each of the RFID tags 34 associated with each product 13, such as the product name, type, quantity, etc. of the product. The tracking application 36 may further create, store, and use a list of orders, order numbers, or job numbers identifying various jobs or shipping orders that are to be placed or executed within the environment 10 including any details of the order or job. In particular, each order may include a list of one or more products 13 that needs to be shipped to a particular customer, that needs to be moved from one location in the facility 10 to another location in the facility 10, or that are to be received from a customer or supplier and placed on a storage shelf 12 for storage in some manner. Each such job or order number includes a specific product or group of products and, if desired, may include the RFID tag or ID numbers for the RFID tags 34 that are on those products 13. Thus, when a product 13 arrives via the loading bays 16 or otherwise, a unique RFID tag 34 is placed on the product 13 and that unique ID is then stored in the product and order database 27 of the tracking application 26 as being associated with that product 13 and potentially with an order. If no order yet exists, when an order is made, the tracking application 36 will select a particular product 13 and its corresponding RFID tag 34 to be associated with the order.

Additionally, each order may include a customer to whom the product 13 was shipped, an address for the customer or other customer or shipping information, such as the time or day of the shipment, the truck that was used to perform the shipping, a driver name of the truck, the loading bay 16 of the truck for the shipment or order, etc. Of course, order information such as the truck number, driver of the truck, etc., can be filled out when that information is available such as when an order is placed or when an order is actually being shipped or fulfilled. Further, as each order is being fulfilled, the tracking application 36 may store, on a memory of the centralized asset tracking and management device 26, real time information regarding the progress of each order, such as, for example, temporal and quantity information regarding each particular order. In particular, the tracking application 36 may store when a particular product that is part of an order, is loaded onto a trailer truck waiting in a particular loading bay through a time-stamp.

Importantly, as illustrated best in FIG. 2, each of the forklifts 18 includes a sensor based detection device 40 (which may be, for example, a laser-based detection device, an optical detection device, etc.) disposed on the front of the forklift 18 and positioned to detect the existence of a product 13 loaded on the forklift 18, i.e., loaded on or positioned on the lift or tongs of the forklift 18, and to detect the existence of a product 13 disposed near the forklift 18, i.e., near the lift or tongs of the forklift 18 that has not been loaded on the lift or tongs of the forklift. If the detection device 40 is a laser based detection device, the detection device 40 may have a laser transmitter that directs a laser beam toward the product 13 on the forklift 18 and a detector that detects reflected light from the product 13. The detection device 40 may detect the presence of a product 13 on or near the forklift 18 via a sensor that senses the reflection. When no product 13 is on or near the forklift 18, the laser beam does not reflect off of any product close to the detection device 40 and thus gets sent out into space where the beam is diffused enough, that if it reflects back, it does not reflect back in a manner that would indicate to the detection device 40 that a product is on or near the forklift 18. However, if a product 13 is on or near the forklift 18, the light reflects back at a high enough magnitude to be sensed by the detection device 40, which then determines that a product 13 is on or near the front of the forklift 18. However, other types of sensors besides lasers could be used in or for the detection device 40 including, for example, weight sensors on the forklift 18, electromagnetic sensors that use other wavelengths of electromagnetic energy to detect the presence of product on or near the forklift 18, sonic detectors, optical detection devices, etc. In examples including a weight sensor on the forklift 18, the system may further determine how much product was delivered at a particular location. In particular, system records a first weight when the product 13 is first picked up and a second weight when the product 13 is delivered. The system then determines a different between the first weight and the second weight, thereby calculating an amount of product 13 that was dropped off. That amount of product 13 may be recorded in a memory of the system. Further, the detection device 40 may be placed in a location on the front of the forklift 18 that minimizes the possibility of damage due to shifting or sliding products 13 that are picked up by the forklift 18. The detection device 40 may also be covered to minimize impact damage from products picked up by the forklift 18. As illustrated in FIG. 2, the detection device 40 is communicatively coupled to the user interface device 23 on the forklift 18 and communicates signals indicative of the existence or non-existence of a product 13 on the tongs or lift of the forklift 18. When the detection device 40 indicates that a product 13 is present on the forklift 18, or near the forklift 18, the detection device 40 then turns on the RFID reader 20. The RFID reader 20 then turns on the antennas 21A, 21B, 21C and then reads the product designation RFID tag 34 disposed on the product 13 that is on the tongs or lift of the forklift 18, or near the front of the forklift 18. After the RFID reader 20 reads the product designation RFID tag 34, the RFID reader 20 queries the tracking application 36 via the communication network using the communication devices 22 and 24. Once queried, the tracking application 36 analyzes the product designation RFID tag 34 information sent relative to the data stored in the product and order database 27 to determine if the forklift operator picked up the correct product 13. The user interface device 23 may then visually and audibly alert the forklift operator that he or she picked up the correct product 13, using, for example, a green alert and a first audible alert, or that he or she picked up the incorrect product 13 using, for example a red alert and a second audible alert. FIGS. 13, 16, 17, and 21-23 depict an example display 50 produced by the user interface device 23 to indicate to the forklift operator that he or she picked up the correct product 13 or that he or she picked up the incorrect product 13. FIGS. 13, 16, 17, and 21-23 will be explained in greater detail later.

While the RFID-based inventory tracking system has been described as using the detection device 40 to detect a product 13 disposed at or near the forklift 18 and, in response, turning on the RFID reader 20 to read the product designation RFID tag 34, the RFID-based inventory tracking system does not require use of the detection device 40. For example, in one exemplary aspect of the system, the RFID-reader 20 can be in an activated, or on state, constantly while the forklift 18 is in use. In a second exemplary aspect of the system, the RFID-reader 20 can be selectively turned on by a forklift operator. For example, the forklift operator can interact with the interface screen 28 of the user interface device 23 (e.g., by touching, pressing, swiping, clicking, etc. the interface screen 28) after a product 13 is on the tongs of the forklift 18 or when a product 13 is near the forklift 18. Further, in such an example, the forklift operator can selectively turn off the RFID-reader 20 by interacting with the interface screen 28 of the user interface device 23 (e.g., by touching, pressing, swiping, clicking, etc. the interface screen 28) once the RFID-reader 20 identified the product 13 being transported or near the forklift 18.

The inventory tracking system operates so that, when a product is first introduced into the environment 10, the product 13 is provided with a product designation RFID tag 34. The tag ID and description, or other details, of the product 13 are stored in the asset tracking and management device 26 and in particular in the product and order database 27 in some manner by the tracking application 36. For example, an inventory manager may input this information in response to the arrival of a new product 13. The input process will be described in greater detail with respect to FIGS. 27-29 later. In some cases, the system 26 may accept a description of or other identification of a product 13, and may store this information in the product and order database 27. Then, when the product 13 arrives in the environment 10, warehouse personnel may use a user interface device 23 (which may or may not be on a forklift 18) to indicate to the tracking application 36 what product has arrived and the tracking application 36 may store or find the product 13 in the product and order database 27 of the asset tracking and management device 26. The tracking application 36 may then instruct the person, via the user interface device 23, to place an RFID tag on the product 13 and to scan that RFID tag using an RFID reader 20 (or a handheld reader if so desired). The RFID reader 20 may then communicate with the system (e.g., via a user interface device 23 which may or may not be on a forklift 18) to indicate the RFID tag number or ID for the product designation RFID tag 34 placed on the product 13. The tracking application 36 then stores that RFID tag number or ID for that product in the product database 27.

As a result, each product 13 has its own unique product designation RFID tag 34, and that product designation RFID tag 34 may be used to track the location of that product 13 within the storage environment 10. In particular, when a forklift 18 picks up a product 13, for example, at the loading bay 16, the laser or other detection device 40 detects that a product 13 is currently disposed on the forklift 18 (e.g., is resting on the tongs or lift of the forklift 18) and signals this pick-up event to the RFID reader 20. At this time, the laser detection device 40 instructs the RFID reader 20 on the forklift 18 to turn on. The RFID reader 20 then turns on the multiple antennas 21A, 21B, 21C and pings or reads the RFID tag ID associated with the product designation RFID tag 34 on the product 13 that is on the forklift 18. The RFID reader 20 sends this RFID tag ID to the user interface device 23 and in particular to the remote tracking application of the user interface device 23, which may then query the tracking application 36 via the wireless network devices 22 and 24, which communicates with the asset tracking and management device 26 and the product and order database 27 to determine what product 13 the forklift operator picked up and where the product 13 needs to go or to determine whether the forklift operated picked up the correct product 13. In this manner, the detection device 40, the RFID reader 20, and the user interface device 23 detect and inform the tracking application 36 that the product 13 with a particular RFID tag 34 is now on the forklift 18.

As the forklift 18 moves throughout the environment 10, the RFID reader 20, through the use of the antennas 21A, 21B, 21C, also detects the current location of the of the forklift 18 by observing or detecting the closest or nearest location designation RFID tag 30 or 32 associated with one of the shelves 12 or associated with one of the loading bays 16, so long as the forklift 18 has a product 13. If the forklift operator does not have the product 13 on the forklift 18, the RFID reader 20 and the antennas 21A-C may remained turned off because it is not necessary to have the RFID reader 20 and antennas 21A-C reading RFID tags 30, 32, and 34 when there is no product 13 on the forklift 18. The RFID tag reader 20 may provide or store the last detected or closest location designation RFID tag as the one with the highest return signal therefrom, but need not communicate this information to the asset tracking and management device 26 until a drop-off action occurs. More particularly, as the forklift operator drives the forklift 18 to a particular bay 14 of one of the shelves 12, the RFID reader 20 in communication with the antennas 21A-C (e.g., antennas 21B, 21C) of the forklift 18 determines the ID of the RFID tag 30 associated with that bay 14 as being the last detected or closest tag 30. The forklift operator may then place the product 13 on one of the shelves 12 in the bay 14 and back away from the product 13, thereby removing the product 13 from the forklift tongs and causing the detection of a drop-off event. That is, at this point, the detection device 40 and the user interface device 23 recognizes that the product 13 has been dropped off of or has been removed from the tongs of the forklift 18 (a drop-off event) and may register that information with the central tracking system 26, along with the current location of the forklift 18 as specified by the last detected location designation RFID tag 30. In particular, the RFID reader 20 or the user interface device 23 sends the last detected location designation RFID tag ID to the tracking application 36, which will register the product 13 having the product designation RFID tag 34 at that location (e.g., at the bay 14 having the last detected location designation RFID tag 30). As a result, the centralized tracking computer 26 knows, via this communication and detection circuitry, which bay 14 of which shelf 12 upon which a particular product 13 with a particular RFID tag 34 has been placed. The tracking application 36 then stores this information in the product database 27 as being the current location of the product 13. However, in some exemplary aspects, the forklift 18 may not be equipped with a detection device 40 and, as such, a drop off event cannot be detected by the system. In such an example, the forklift operator can interact with the interface screen 28 of the user interface device 23 by, for example, touching, pressing, swiping, clicking, the interface screen 28 to indicate to the system that a drop off event has occurred. In other examples, the RFID reader 20 can indicate to the user interface device 23 that the RFID reader is no longer locked onto a product 13 and, thus, signal a drop off event to the user interface device 23.

Likewise, when a forklift 18 is used to obtain one of the products 13 off of a shelf 12 and to move the product 13 to a different shelf 12, the same detection and tracking actions take place. That is, when the forklift 18 arrives at a particular shelf 12, the forklift 18 picks up a product 13 off the shelf 12 by placing the product 13 on the tongs of the forklift 18. At that time, the detection device 40 of the forklift 18 recognizes that a product 13 has been placed onto the forklift 18 and turns on the RFID reader 20, which causes the RFID reader 20 of the forklift 18 to then turn on antennas 21A-C and read the tag number or ID of the product designation RFID tag 34 on the product 13 just picked up from the shelf 12. Once the RFID reader 20 locks onto the product 13 just picked up from the shelf 12, the RFID reader 20 then queries the tracking application 36 via the communication devices 22 and 24 with the product 13 information obtained from the product designation RFID tag 34. Then, the RFID reader 20 of the forklift 18 detects the closest location designation RFID tag 30 or 32, using the antennas 21A-C, as the product 13 is moved within the environment 10 to another bay 14, for example. When the product 13 is placed on a shelf 12 at the bay 14, the detection device 40 detects that the product 13 has been removed from the forklift 18 (signaling a drop-off event), and the detection device 40 causes the RFID reader 20 to signal the antennas 21A-C to detect the new location (if it has not already) and registers that new location with the tracking application 36 of the asset tracking and management device 26 by providing the asset tracking and management device 26 with the product tag ID and with the closest or latest detected location designation RFID tag ID 30 or 32. The tracking application 36 then stores this new location information with the product information in the product and order database 27.

In a similar manner, as a forklift 18 delivers a product 13 to a truck via one of the loading bays 16, and when the detection device 40 on the forklift 18 detects a drop-off event, the RFID reader 20, through the use of the antennas 21A-C of the forklift 18 reads the closest location designation RFID tag 32 from the closest loading bay 16 and the RFID reader 20 receives and provides that information to the tracking application 36 to indicate that the product 13 with the detected RFID tag has been dropped off or delivered to a particular loading bay 16 (based on the location designation RFID tag 32 of the bay 16).

Figure 12:
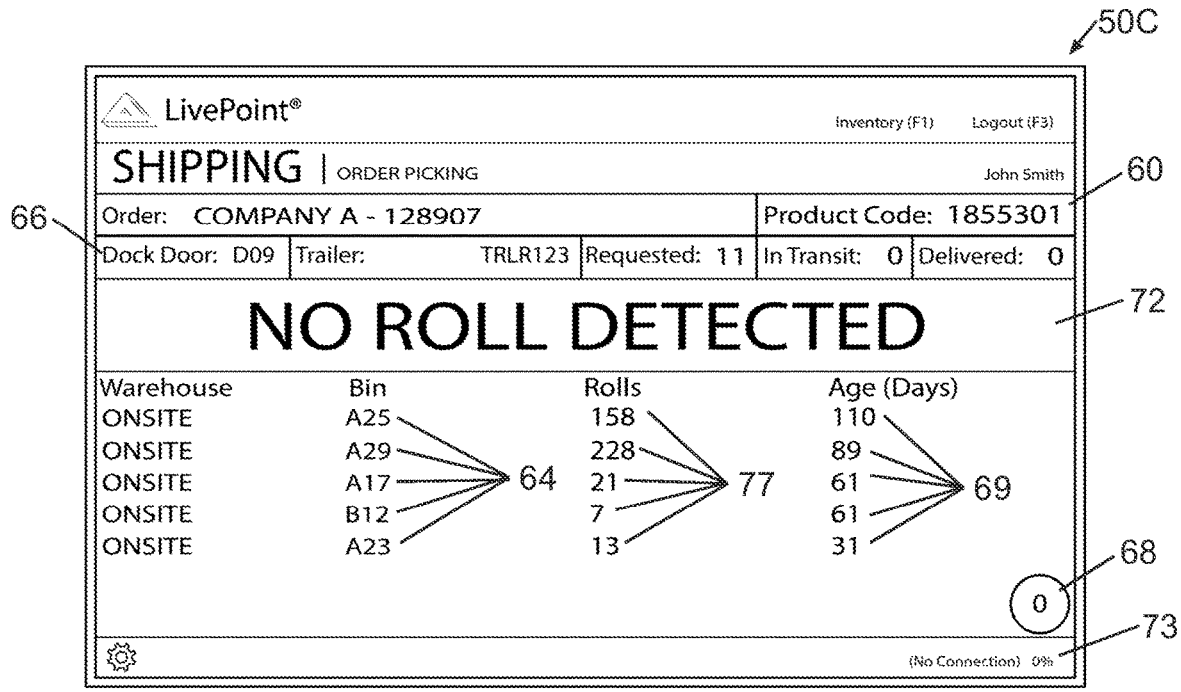
FIG. 12 is an example of a display screen of a user interface device used to move products within a storage facility.
Figure 16:
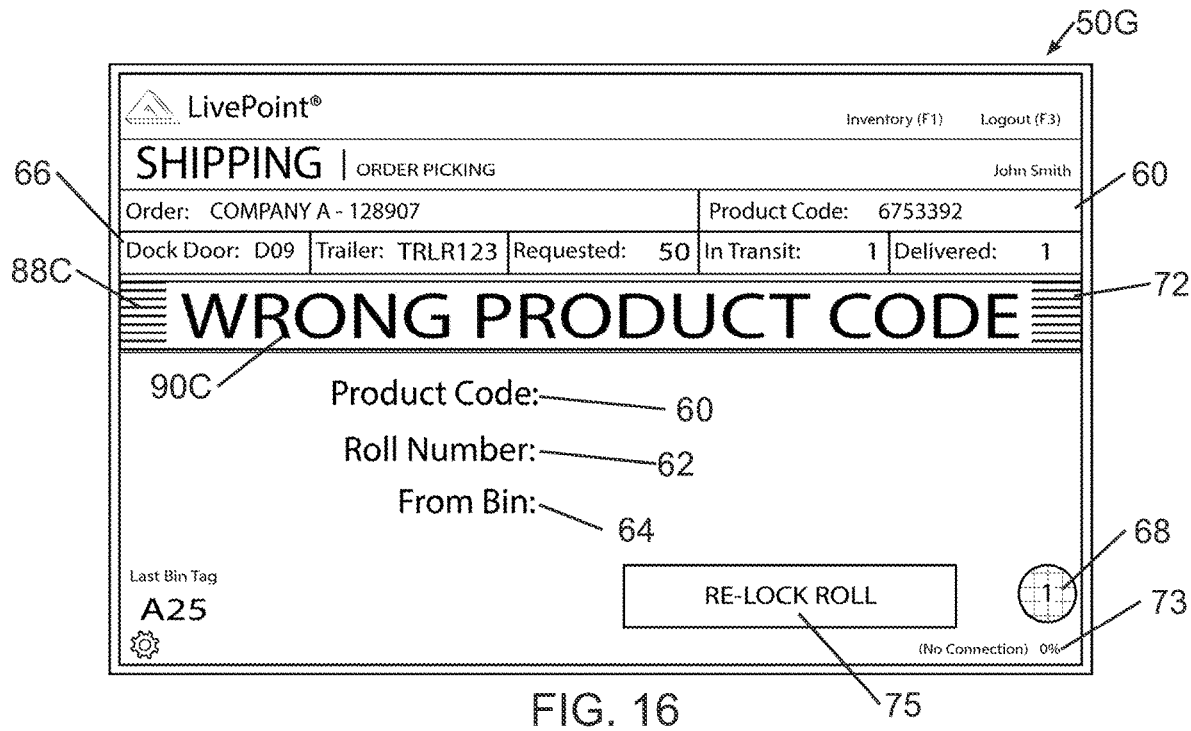
FIG. 16 is an example of a warning shown on a display screen of a user interface to indicate an incorrect pick up of a product.
Figure 20:
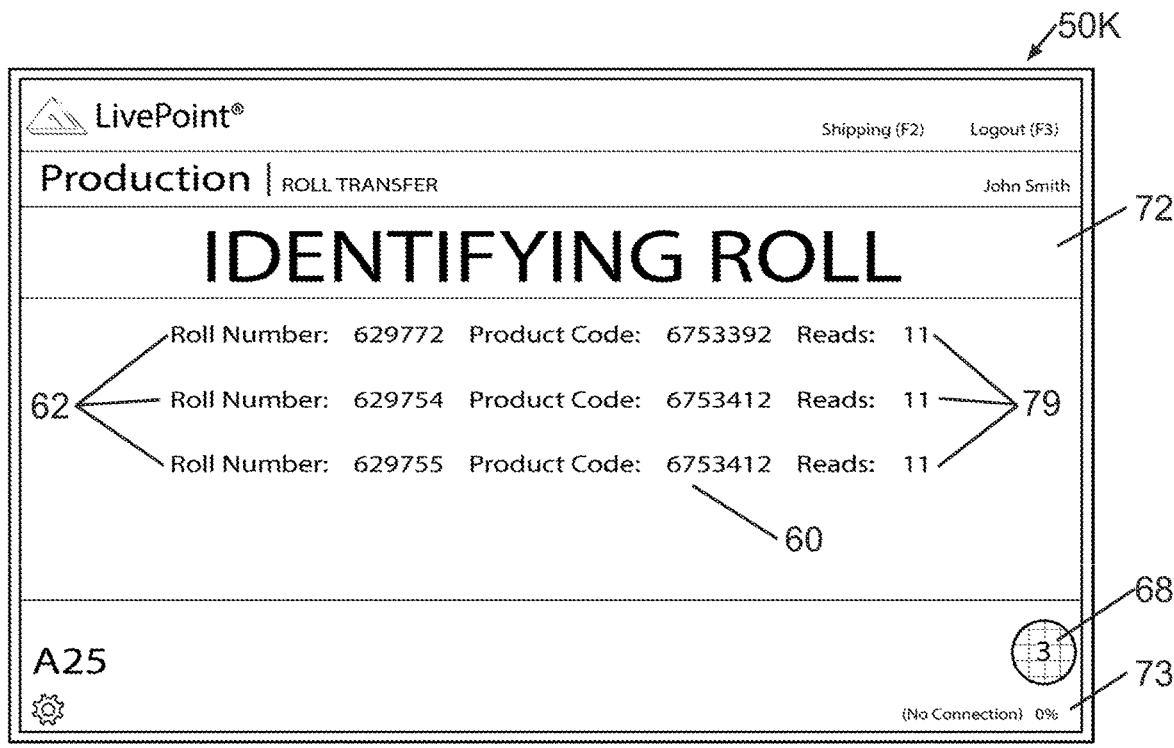
FIG. 20 is an example of a display screen of a user interface device when a radio frequency identification (RFID) reader has detected multiple products within a detection radius.
Figure 22:
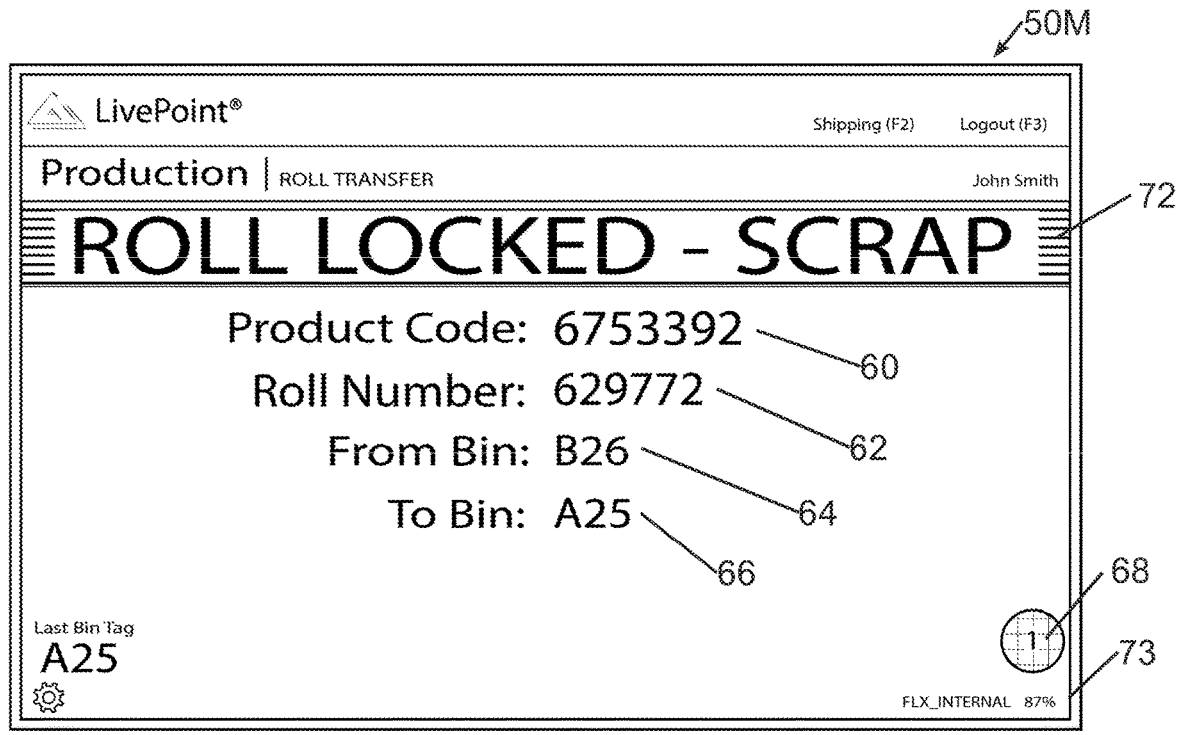
FIG. 22 is an example of a warning shown on a display screen of a user interface device to indicate a radio frequency identification (RFID) reader has locked onto a product designated as "scrap."
Figure 23:
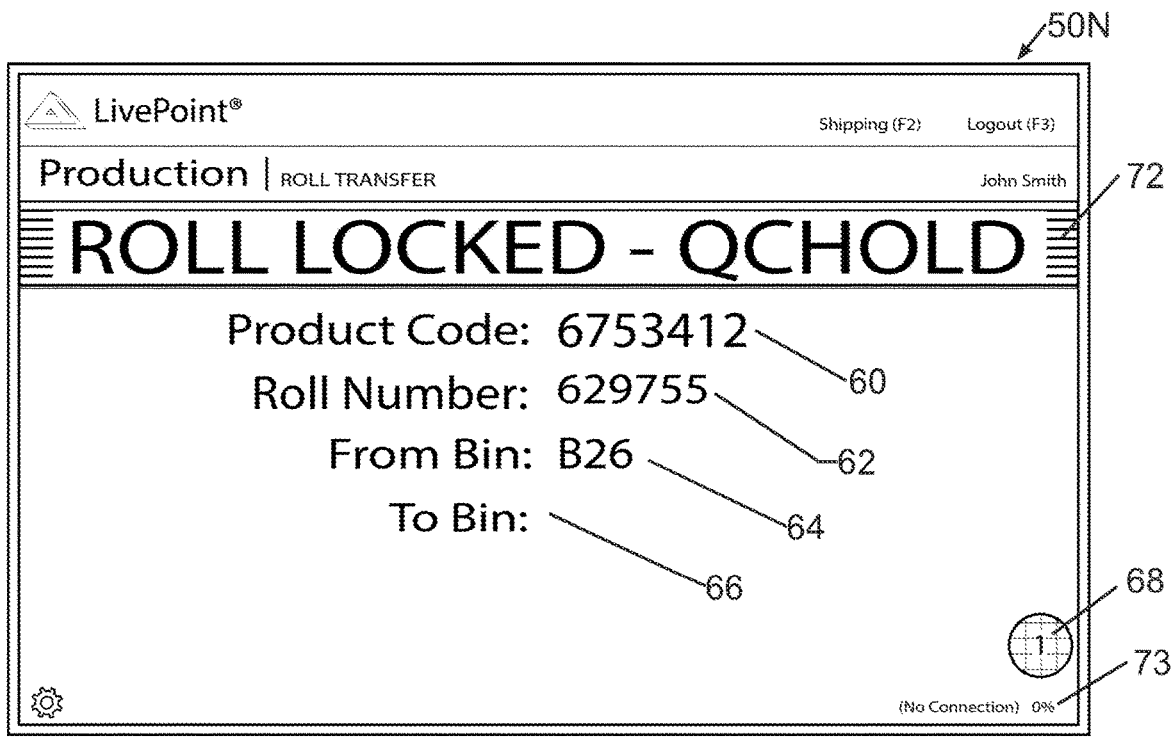
FIG. 23 is an example of a warning shown on a display screen of a user interface device to indicate a radio frequency identification (RFID) reader has locked onto a product on hold for quality control "QC".

As will be understood, when a particular order is to be implemented (i.e., a product or group of products 13 are to be placed on a truck to be delivered to a customer, for example), the tracking application 36 may generate a signal to a user interface device 23 on one of the forklifts 18 telling the forklift operator to pick up a particular product 13 and deliver that product 13 to a particular loading bay 16 to be placed on a particular truck which will be accepting the product 13 for delivery of the order. In this case, the tracking application 26 may provide the forklift operator with an indication of the bay 14 at which the product 13 is located based on the last known position of the product 13 as stored by the product and order database 27. The forklift operator may then drive the forklift 18 to the appropriate bay 14, find the product 13, and pick up the product 13 using the forklift 18, thereby generating a pick-up event. Thus, at this time, the detection device 40 on the forklift 18 detects the presence of a product 13 on the forklift 18 and may turn on the RFID reader 20 of the forklift 18. The RFID reader 20 then turns on the antennas 21A-C and signals the antennas 21A-C to read the RFID tag ID associated with the product designation RFID tag 34 on the product 13. The RFID reader 20 may communicate that information directly, or via the user interface device 23, to the tracking application 36 using the communication network devices 22, 24 and queries the tracking application 36. The tracking application 36 then determines whether the RFID tag ID associated with the product 13 that is now currently on the forklift 18 is the correct RFID tag ID for the actual product 13 associated with the order that is being implemented (using the order and product information in the database 27). The application 36 then sends information indicative of this analysis to the user interface device 23 on the forklift 18 informing the forklift operator whether the correct product 13 for the order is now on the forklift 18. If the forklift operator has picked up an incorrect product for the order, the user interface device 23 may indicate to the operator that the wrong product is on the forklift 18 using any desired method, such as by flashing a red screen and sounding an audible alarm, providing a message on the screen of the user interface device, etc. In particular, the user interface device 23 may display a red error box and emit a first audible alarm, for example, to the forklift operator to indicate that the incorrect product 13 has been picked up for the order that is being implemented, as shown in FIGS. 16, 22, and 23. On the other hand, if the correct product is on the forklift 18, the user interface device 23 may indicate a message to the operator, flash or causes the screen to turn a particular color, such as green for example, and/or sound an audible signal indicating that the correct product for the order being implemented is on the forklift 18. In particular, the user interface device 23 may display a green box and emit a second audible alarm, for example, to the forklift operator to indicate that the correct product 13 has been picked up for the order that is being implemented, as shown in FIGS. 12 and 20.

After the forklift operator picks up the correct product 13 and gets, for example, a green screen and audible alarm, or other indication on the user interface device 23 to proceed, the forklift operator then drives to one of the loading bays 16 to deliver the product 13 to a truck. The RFID reader 20 on the forklift 18 may turn on the antennas 21A-C (if not on already) and signal the antennas 21A-C to determine the position of the forklift 18 as it approaches a particular loading bay 16 by reading the location designation RFID tags 32 associated with each loading bay 16 as the forklift 18 passes the loading bays 16. The user interface device 23 or the RFID reader 20 may communicate this location information to the tracking application 36 which may determine if the loading bay 16 being detected is the loading bay 16 at which the product 13 is to be placed on a truck for this order, and may send the results of the determination to the user interface device 23 of the forklift 18 in real time, to thereby instruct the forklift operator if he or she is at the correct loading bay 16. In another case, when the forklift 18 goes up to or onto a truck at a loading bay 16 and performs a drop-off event, the user interface device 23 or the RFID tag reader 20 of the forklift 18 may send the current location of the forklift 18 (based on the currently detected or last detected location designation RFID tag 32) to the tracking application 36 which determines if the forklift 18 is at the correct loading bay 16 for the order being implemented. Thus, the tracking application 36 determines whether the forklift 18 is near or at the appropriate loading bay 16 that is associated with the truck that is actually used for delivering the product 13 sitting on the forklift 18 for the order that is being implemented. In any event, the tracking application 36 sends a signal to the user interface device 23 of the forklift 18 to indicate to the forklift operator that the forklift 18 is at the wrong truck or loading bay 16 or that the forklift 18 is at the correct truck or loading bay 16. The tracking application 36 or the user interface device 23 may use any desired mechanism for notifying the forklift operator of this determination, such as by flashing red or green signals to the user, by sounding an audible alarm or signal, etc., to tell the forklift operator that he or she is at the correct or incorrect truck or loading bay 16. In particular, the user interface device 23 may display a purple box and emit an audible alarm, for example, to the forklift operator to indicate that the correct product 13 has been delivered to the correct truck or loading bay 16. In this manner, the centralized asset tracking and management device 26 directs the forklift operator to pick up the appropriate product 13 for an order, may indicate that the appropriate or non-appropriate product 13 for a particular order is actually on the forklift 18, direct the forklift operator to the appropriate loading bay 16 to which to take the product 13 for an order, and tracks and indicates to the forklift operator that the product 13 is being dropped off at the correct loading bay 16, all based on the RFID tag location information and the RFID product tag information sent to the tracking application 36 from the forklift 18 during operation of the forklift 18.

Various different operations of the inventory tracking and management system will now be described in relation to FIGS. 10-33. As discussed above, when a particular order is to be implemented (i.e., a product or group of products are to be placed on a truck to be believed to a customer, for example), the tracking application 36 may generate a signal to a user interface device 23 on one of the forklifts 18 telling the forklift operator to pick up a particular product 13 and deliver that product 13 to a particular loading bay 16 to be placed on a particular truck which will be accepting the product 13 for delivery of the order.

Figure 10:
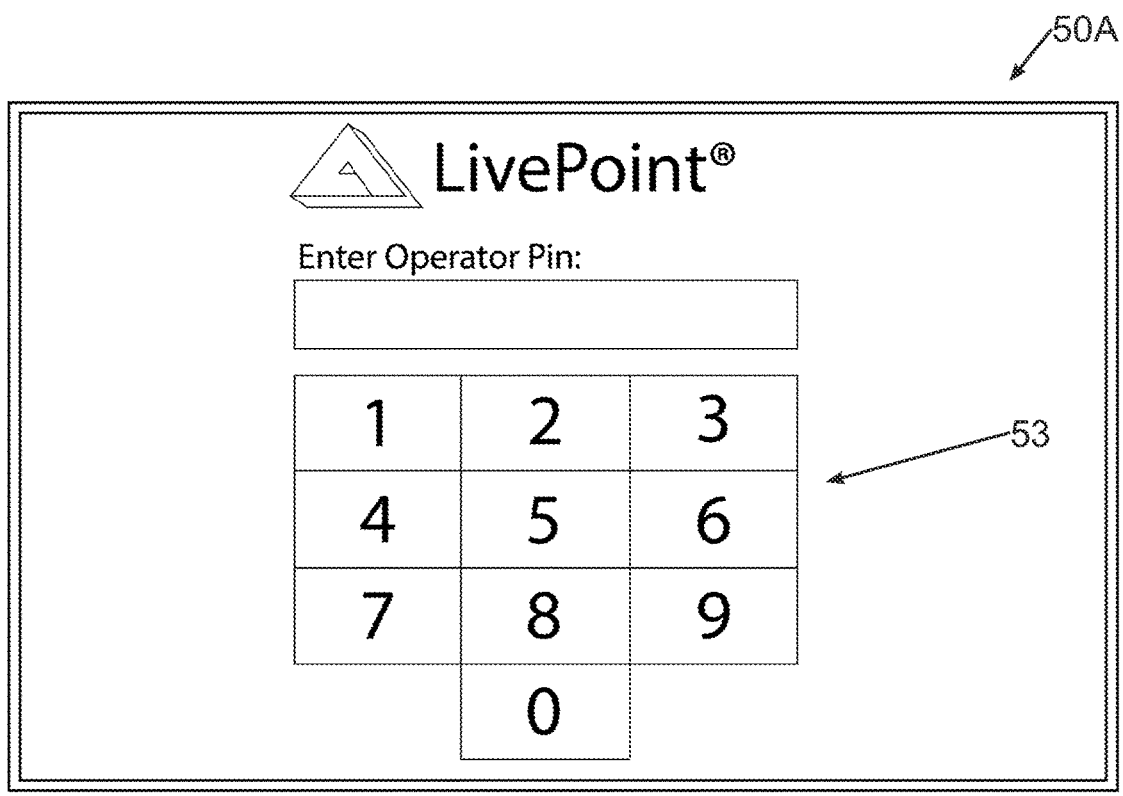
FIG. 10 is an example of a display screen of a user interface device used to log into an RFID-based inventory tracking system.

FIG. 10 illustrates an example of a sign-in screen that may be shown on a display screen 50A of the user interface device 23. When displayed, the sign-in screen may require a forklift operator to enter an operator pin using a keypad 53 prior to using the system as described above. Each forklift operator may have a unique operator pin that is stored on a memory of the centralized asset tracking and management device 36. A forklift operator name, forklift operation description, and other forklift operator identifiers may be associated with each unique operator pin and also stored on the memory of the centralized asset tracking and management device 26. In other examples, the user interface device 23 can include a biometric scanner in lieu of, or in addition to, the keypad 53 to determine which forklift operator is operating the forklift 18. In such an example, the biometric scanner can be any device that uses a unique biometric identifier to determine the identity of the forklift operation, such as, an iris scanner, a fingerprint scanner, or face scanner. By requiring each forklift operator to sign-in, or login, prior to using the system, the user interface device 23, along with the centralized asset tracking and management device 26 can track when a particular forklift operator picked up a particular product 13 at a particular bay 14 and when the particular forklift operator dropped off the particular product 13 at a particular truck or loading bay 16, through the use of time-stamps. Once the forklift operator signs into the system, the display screen 50B of the user interface device 23 may display a number of pending orders that are to be completed, as illustrated in FIG. 10. In particular, FIG. 10 illustrates a display screen 50B of the user interface device 23 displaying a customer, order number, dock 16 that a product 13 is to be delivered to, a product code 60, the number of products 13 requested, the number of products in transit, and the number of products 13 actually delivered. From this display screen 50B the forklift operator may select a particular order to fulfill by interacting with the display screen 50B of the user interface device 23 (for example, by touching, swiping, or pressing the display screen 50B). Once the forklift operator selects an order the fulfill, the forklift operator pressed a start order input 29 to begin the order. In some examples of the system, the tracking application 36 may periodically update the information displayed on the display screen 50B by querying the product and order database 27 and sending the results of that query to the user interface device 23, which is then displayed on the display screen 50B. In other examples, a forklift operator can manually update the information displayed on the display screen 50B by pressing the refresh input 27.

Figure 13:
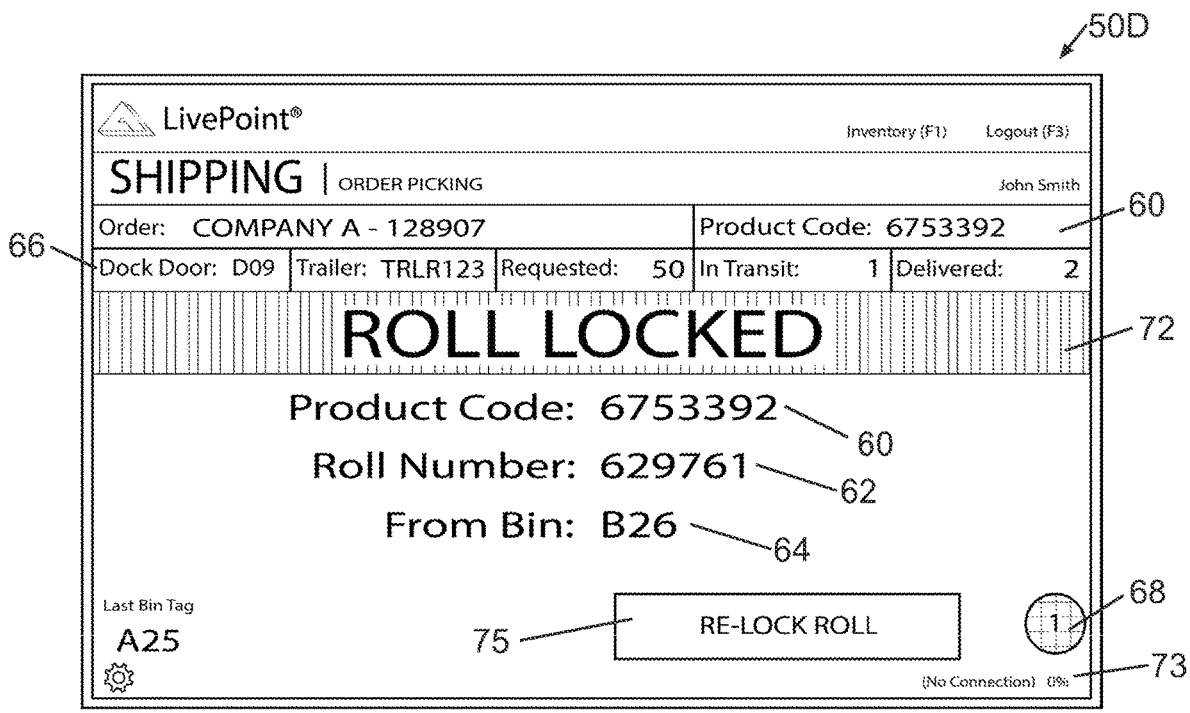
FIG. 13 is an example of a display screen of a user interface device used to move products within a storage facility once a product is picked up.

FIGS. 12-25 illustrate examples of information that may be shown on a display screen 50 of the user interface device 23 during this activity. Common elements between FIGS. 12-25 are shown using common reference numerals. In particular, FIGS. 12-17 illustrate examples of the information displayed to the forklift operator on a display screen 50 of the user interface device 23 when a product 13 in the storage and shipping environment 10 needs to be relocated to a particular bin 14 or delivered to a particular loading bay 16 and placed on a truck. FIGS. 12, 13, 14, 15, 16, and 17 illustrate a display screen 50C, 50D, 50E, 50F, 50G, and 50H, respectively, of the user interface device 23 displaying a product code 60, a roll number 62 (as in this case the product 13 is a roll of material), a current location 64 of a product 13, a destination 66 of the product 13, an RFID tag counter 68, a next roll input 70, a product information menu 72, and a relock-roll input 75. The product code 60 and the roll number 62 are displayed on the display screen 50D and correlate to the product information stored in the product and order database 27. Such information may be used by the forklift operator, for example, to confirm product delivery information (e.g., the product code 60 or the roll number 62) with a truck driver or other storage facility worker. Additionally, the product delivery information is shown in multiple locations 60, 64, and 66 on the display screens 50C, 50D, 50E, 50F, 50G, and 50H. In particular, when the RFID reader 20 queries the tracking application 36, for example, the tracking application 36 sends product information from the product and order database 27 to the user interface device 23, after the RFID reader 20 has locked on to one product 13, as illustrated in FIG. 13. The product information sent by the tracking application 36 to the user interface device 23 shown on the display screen 50B includes, for example, the current location 64 of the product 13, the destination 66 of the product 13, and the trailer truck, if the destination 66 of the product is a bay 16 with a truck waiting to be loaded.

Figure 11:
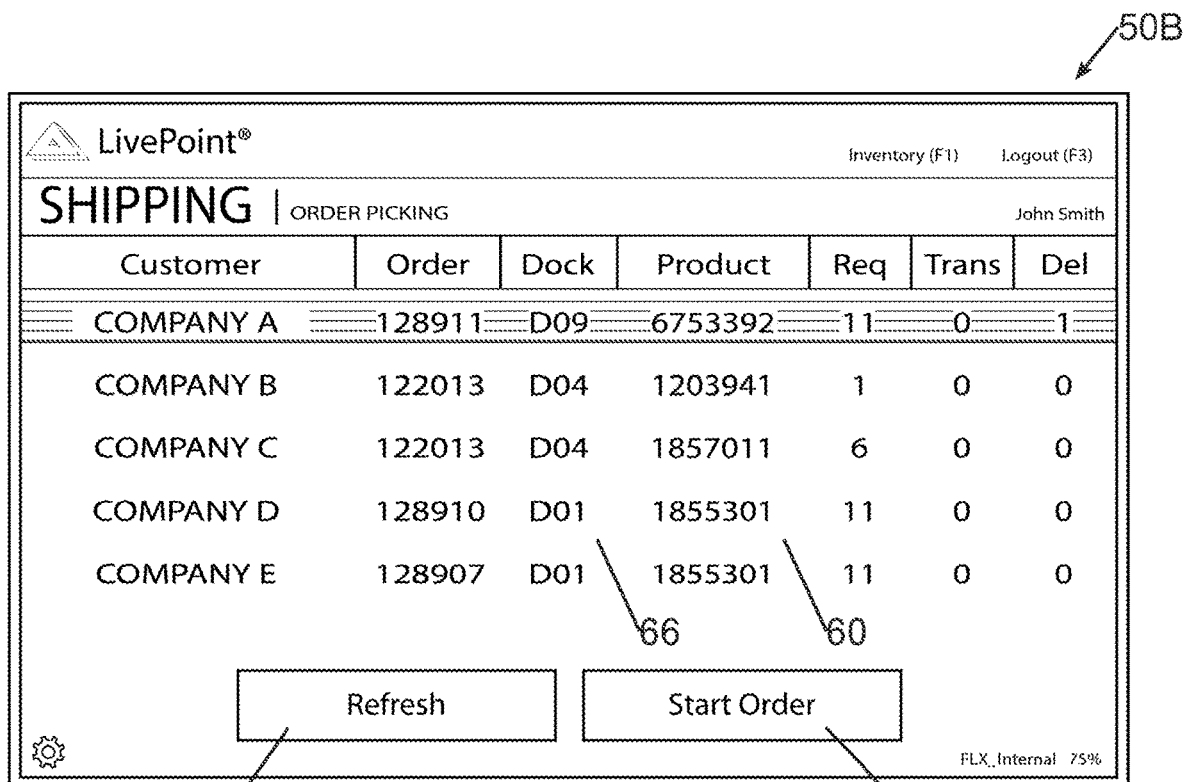
FIG. 11 is an example of a display screen of a user interface device used to select an order to fulfill.

FIGS. 12 and 13 also illustrate the RFID tag counter 68 displaying zero (0) RFID tags read by the RFID reader 20 and one (1) RFID tag read by the RFID reader 20, respectively. The user interface device 23 receives information about how many RFID tags 34 the RFID reader 20 currently reads or detects from the antennas 21A-C, which are stored when the RFID reader 20 sends such information to the user interface device 23 or the tracking application 36. In particular, as the forklift operator drives toward the product 13, there may be multiple other products 13 located nearby. As a result, when the detection device 40 instructs the RFID reader 20 to turn on and, thus, signal the antennas 21A-C to begin reading the product designation RFID tags 34, the antennas 21A-C may pick up multiple product designation RFID tags 34. Accordingly, the RFID reader 20 queries the tracking application 36 as the RFID reader 20 reads or detects the multiple product designation RFID tags. The remote tracking application may receive this information and may send it to the centralized tracking application 36 which may verify these codes. However, prior to the remote tracking application sending the read information or querying the centralized asset tracking and management device 36, the RFID read 20 must "lock onto" one product designation RFID tag 34, as illustrated in FIG. 13. The tracking application 36 may also relay the detected product information from the centralized asset tracking and management device 26 to the user interface device 23 and the number of valid product codes may then be shown on the display screen 50C-H. Of course, the remote tracking application may simply display the number of detected product codes or tags on the screen 50C-H of the user interface device 23 without communicating with the centralized tracking application 36. In any event, the number of RFID tags read by the RFID reader 20 is thus displayed in real time to the forklift operator. Additionally, the RFID tag counter 68 serves to inform the forklift operator when the RFID reader 20 has identified the product 13 being carried by the forklift 18. As discussed above, the RFID reader 20 may detect multiple product designation RFID tags 34 in the process of the forklift operator picking up the desired product 13. The RFID reader 20 may detect, for example, zero (0) product designation RFID tags 34 when not in proximity to any products 13, as depicted in FIG. 11, four (4) product designation RFID tags 34 when between shelves 12 and in proximity to multiple products 13, or one (1) product designation RFID tag 34 when the product 13 is picked up by the forklift 18 and is the only product in the range of the antennas 21A-C, as depicted in FIG. 13. To reduce the number of tags being read to one, once the forklift 18 picks up the product 13 from the required bay 14, the forklift 18 may reverse out of the bay 14 and maneuver into the path between shelves 12, and then turn to be substantially parallel to the shelves 12 that surround the forklift 18. During this process, multiple product designation RFID tags 34 may be detected as a result of the detection radius of the RFID reader 20 and the antennas 21A-C. However, once the forklift 18 is substantially parallel to and in the middle of the shelves 12, the RFID reader 20 and the antennas 21A-C will read or detect only the product designation RFID tag 34 that is associated with the product 13 being carried by the forklift 18. In particular, when one (1) product designation RFID tag 34 is detected by the RFID reader 20, the display screen 50C of the user interface device 23 shows that one product designation RFID tag 34 is detected and may further indicate to the forklift operator that the product 13 has been positively identified as the correct product 13 for the particular order to be implemented. As depicted in FIG. 12, the user interface device 23 may display such a confirmation by, for example, indicating that the product 13 has been successfully identified as the correct product for the delivery being implemented using the RFID reader 20, detection device 40, and the tracking application 36, as described extensively above. Such an indication may be shown by either the RFID tag counter 68 showing only one RFID tag 34 is being read and displaying "PRODUCT LOCKED" in the product information menu 72. In some examples, however, the forklift 18 does not need to be substantially parallel to the shelves 12 that surround the forklift 18 for the RFID reader 20 to lock onto the product 13 carried by the forklift 18. In such examples, the forklift 18 can move five (5) to eight (8) feet away from the shelves 12 that surround the forklift 18 to allow the RFID reader 20 to lock onto the product 13 carried by the forklift 18.

The display screen 50C may display additional product information received from the product and order database 27 of the tracking application 36 once the forklift operator begins a particular job. In use, after the particular job has been selected from the display 50 of the user interface device 23, the user interface device 23 may, in response to a selection of the particular job, query the centralized tracking application 36 or the product database 27 to locate the oldest product 13 in the environment 10 that is suitable for the particular order that the forklift operator is completing. For example, the tracking application 36 can send product information such as, at what bay 14 the product 13 is located, how much of the product is located at each of the bays 14, and how long 69 the product 13 has been stored at the bay 14. Many products 13 stored in the environment 10 may have a limited shelf life and, as a result, it may be important to ensure that the products 13 stored longer are first used to fill orders rather than the most recently stored products 13. To perform this function, the product database 27 may store an age or time (e.g., an arrival time) for each product 13 to be able to track how long each product 13 has been on a shelf 12 or in the system database 27, and the tracking application 36 may query the product and order database 27 for the oldest (or newest) product of a particular type to use for an order. The application 36 may then return this product designation in response to a forklift operator being assigned an order. Further, in some aspects of the system, rather than displaying multiple products 13 on the display screen 50C, the product and order database 27 may send to the user interface device 23, via the tracking application 36, product information for only the oldest product (i.e., the product 13 that has been stored the longest) that would satisfy the order, which would force a forklift operator to select the oldest product.

Figures 26, 27:
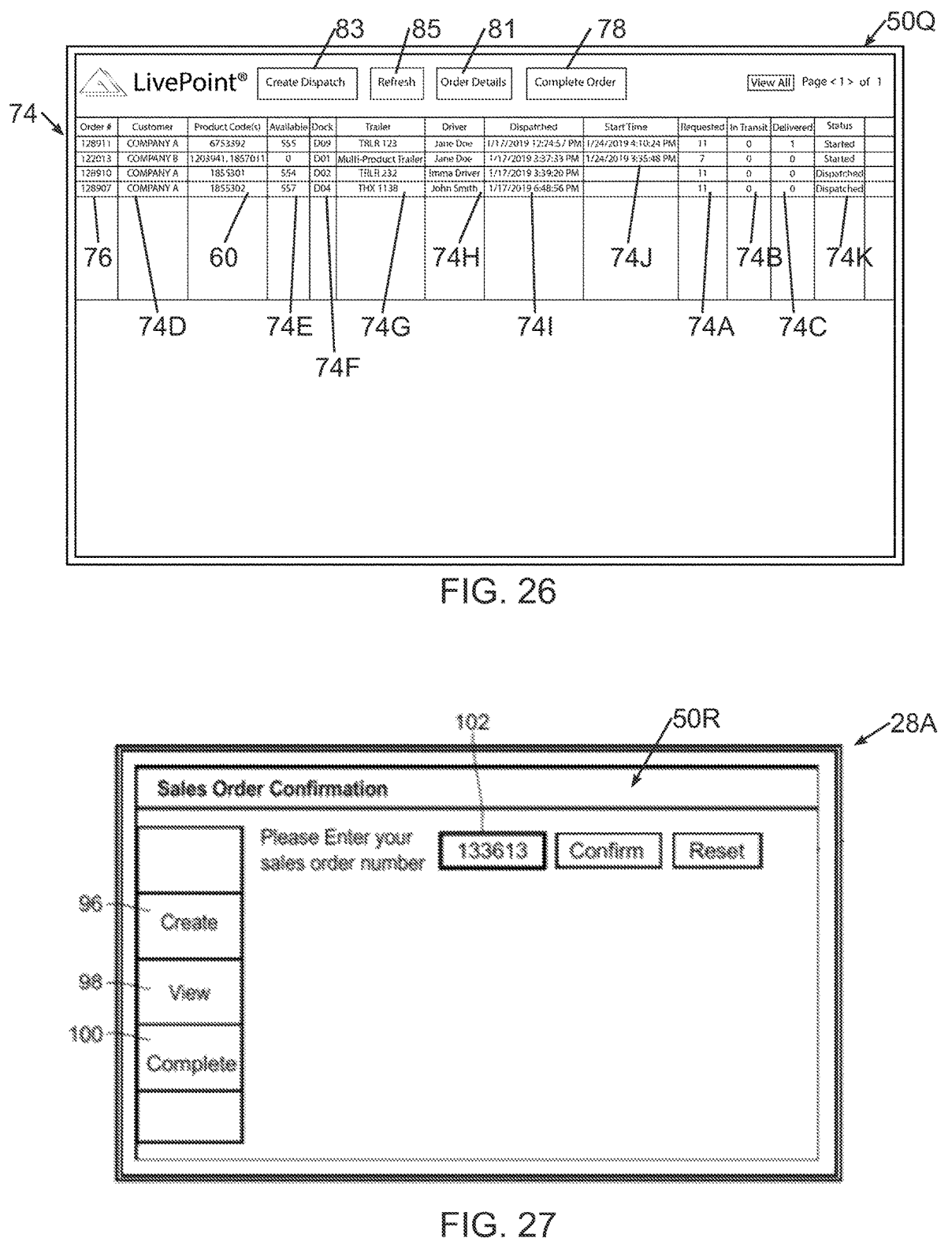

In addition to the information displayed on the display screen 50C of FIG. 12, FIGS. 13, 14, and 15 illustrate the re-lock roll input 75, the next roll input 70, a next order input 80, and a force complete input 84. The re-lock roll input 75 allows the user interface device 23 to signal to the RFID reader 20 that the RFID reader 20, for example, "locked" onto a product 13, but not the product 13 that the forklift operator picked up. For example, if a forklift operator picks up a product 13 from a stack of products 13, the RFID reader 20 can lock onto a product 13 at the bottom of the stack of products rather than a product 13 at the top of the stack of products 13 that was actually picked up by the forklift operator. To re-lock the RFID reader 20 on the product 13 actually carried by the forklift 18, the forklift operator interacts with the display screen 50C of the user interface device 23 (e.g., by touching or pressing the re-lock roll input 75) and, in response, the user interface device 23 sends a signal to the RFID reader 20 to detect and read the product designation RFID tag 34 disposed on the product 13 on the tongs of the forklift 18. The RFID reader 20 then uses the antennas 21A-C to read and detect the product designation RFID tag 34 disposed on the product 13 on the tongs of the forklift 18 again. The user interface device 23 may, however, automatically "re-lock" the product 13 without being prompted to do so. For example, the user interface device 23 can automatically send a signal to the RFID reader 20 after a predetermined duration (e.g., 3 seconds, 5 seconds, 7 seconds) once a pick-up event is detected, as extensively described above, to have the RFID reader 20, through the use of the antennas 21A-C, re-read and re-detect the product designation RFID tag 34 disposed on the product 13 carried by the forklift 18. The next roll input 70 allows the user interface device 23 to signal to the tracking application 36 that the forklift operator has dropped off a particular product (e.g., a roll of product 13) and needs to know the location of another product that would satisfy the order. Once the forklift operator interacts with the user interface device 23 (e.g., by touching, swiping, or pressing the next roll input 70 on the display screen 50), the user interface device queries the order and product database 27 and the tracking application 36 sends the user interface device 23 the product information requested. The user interface device 23 may then display, via the display screen 50C, the requested product information as depicted in FIG. 12. The next order input 80 allows the user interface device 23 to signal to the tracking application 36 that a forklift operator is no longer working on a particular job, for example, because there are enough products 13 in transit to fulfill the particular job, a rush job must be completed before the current job is completed, etc. To end the particular job, the forklift operator may interact with the user interface device 23 (e.g., by touching, swiping, or pressing the next order input 50 display screen 50). In response, the user interface device 23 sends a signal to the tracking application 36 indicating that a particular operator is no longer working on the particular job. The tracking application 36 stores the information in the product and order database 27 and sends the user interface device 23 a list of outstanding jobs the forklift operator may choose, as depicted in FIGS. 11 and 26. The force complete input 84 allows the user interface device 23 to signal to the tracking application 36 that a particular order has been completed even if the number of requested product transfers 74A stored in the database 27 is not zero for that particular order. For example, if a client requires weekly delivers of a particular product 13 that is stored in the environment 10 and sends the same sized truck (i.e., each truck has the same or similar capacity to store and transport products 13) each week, but on occasion the client sends a smaller truck (i.e., a truck that has a smaller storage and transport capacity than trucks usual sent), the forklift operator will not be able to place the required amount of requested product transfers 74A as is reflected in the product and order database 27. In such a situation, the operator may use the force complete input 84 as displayed via the user interface device 23, to force complete or close the order to reflect the actual number of products delivered for that particular order. Additionally, a job (i.e., a roll or product that needs to be transported from one location to another, such as from a particular bin 14 to a particular loading bay 16 to be put on a truck) may not be reflected in the tracking application 36 as being completed until the forklift operator has exited the particular job (i.e., by interacting with the display screen 50 by either touching, swiping, or pressing the next order input 80).

Figure 14:
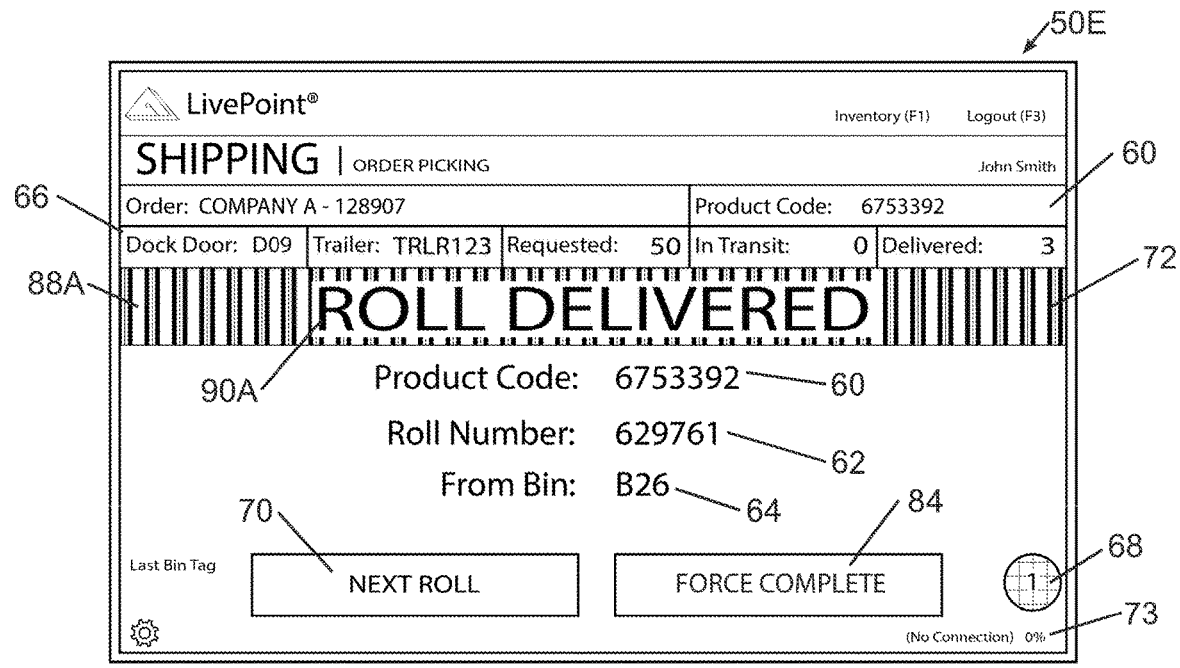
FIG. 14 is an example of a display screen of a user interface device when a particular product has been delivered to a destination.
Figure 15:
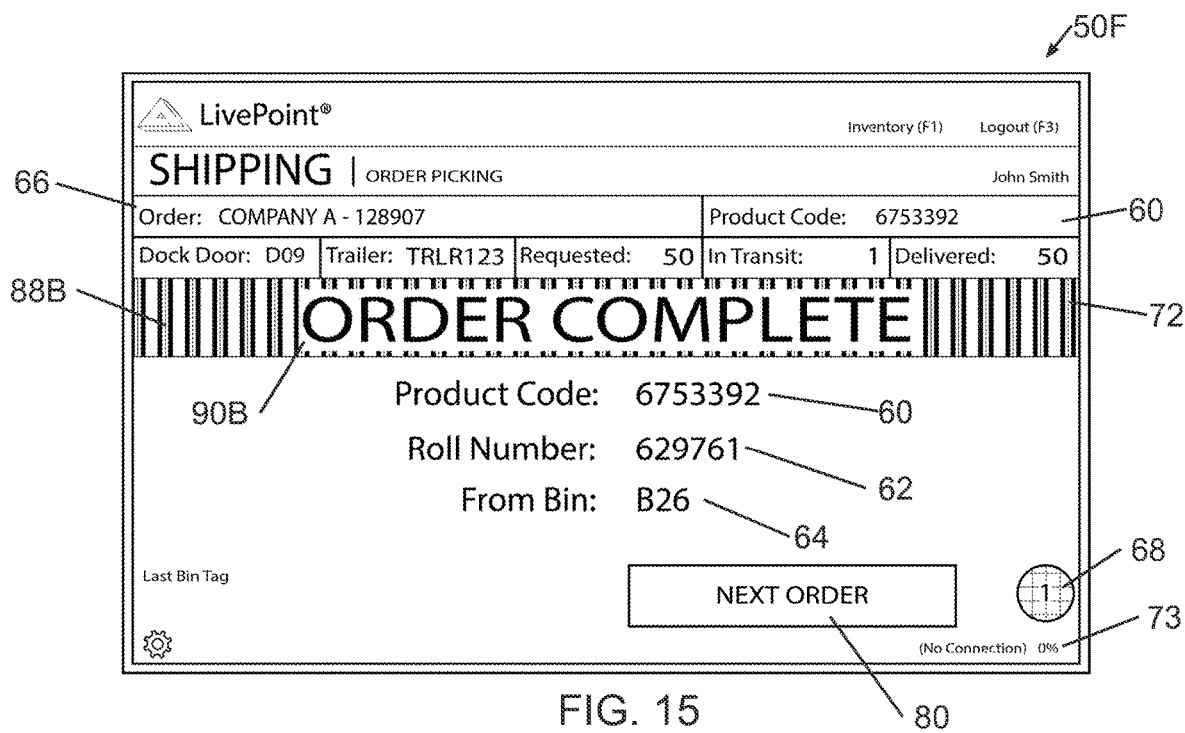
FIG. 15 is another example of a display screen of a user interface device when a when particular order for a particular product has been fulfilled.
Figure 17:
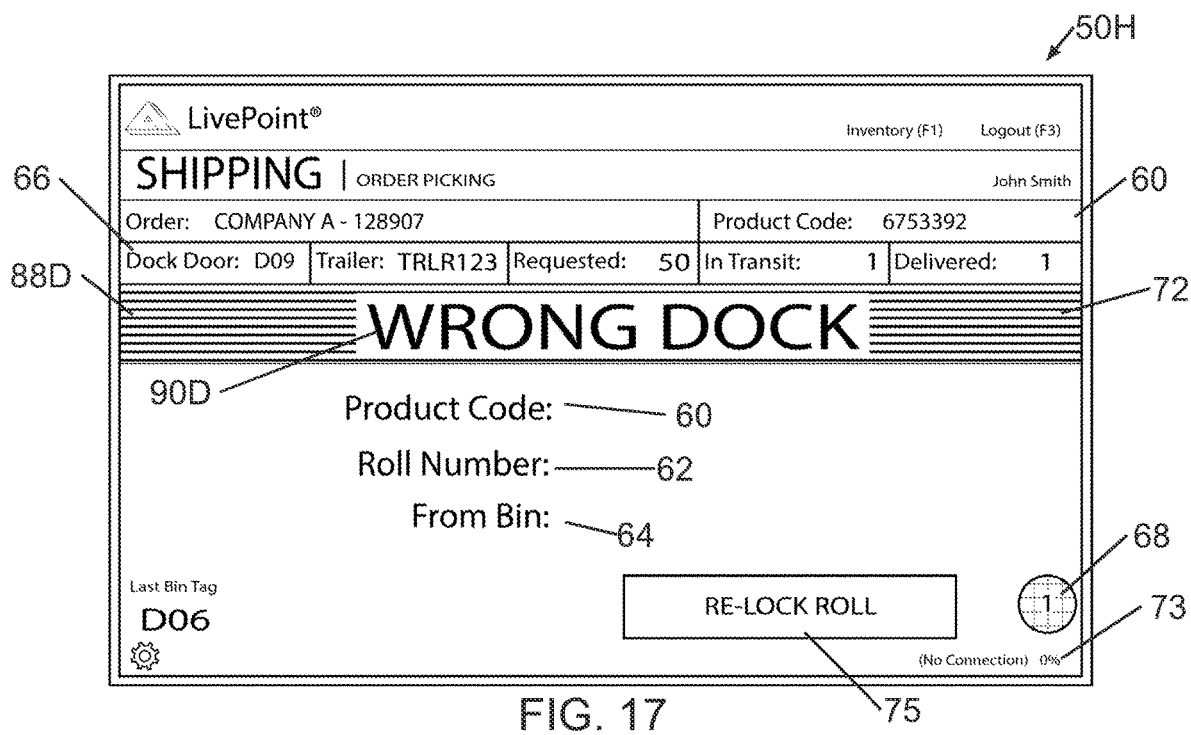
FIG. 17 is an example of warning shown on a display screen of a user interface device to indicate a product has been brought to an incorrect loading dock.
Figure 18:
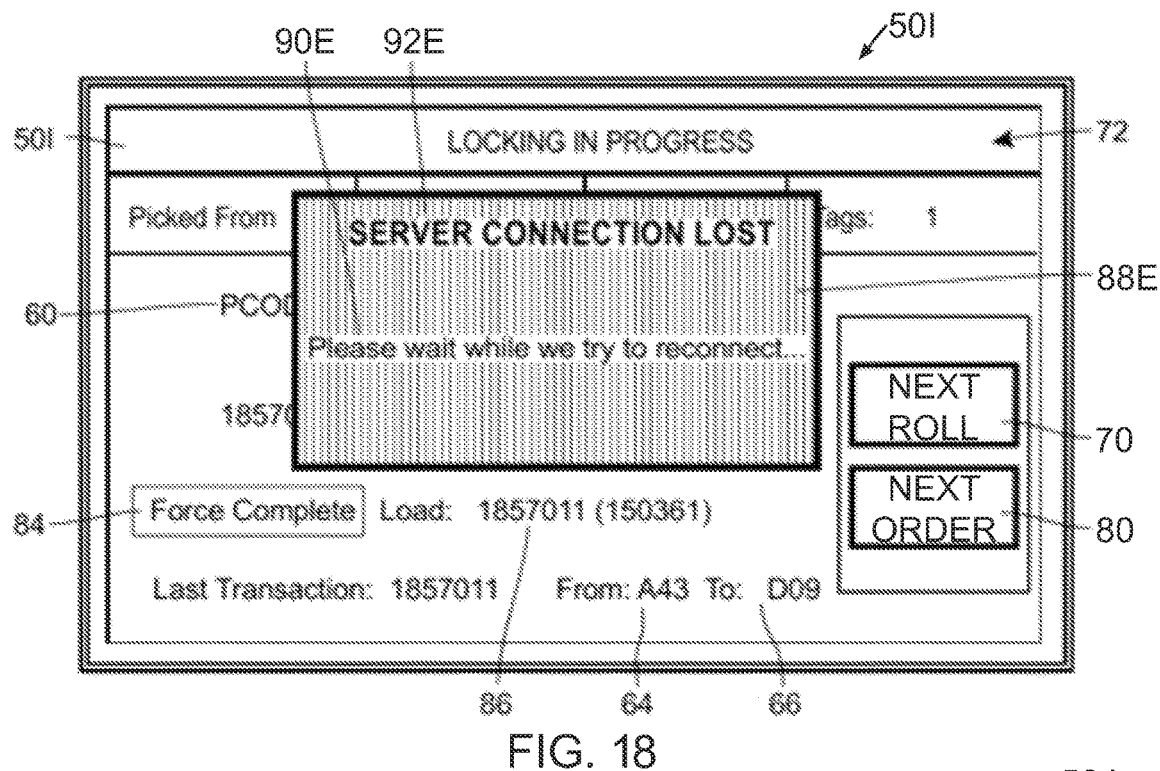
FIG. 18 is an example of a warning shown on a display screen of a user interface device to indicate a loss of communication signal from a centralized tracking system device.

In the process of transporting products 13 within the environment 10 to either move the product 13 from one bin 14 to another bin 14 or move the product 13 from a particular bin 14 and deliver the product 13 to a loading bay 16 to be put on a truck, the user interface device 23 may display a variety of messages on the displace screen 50. FIGS. 14 and 17 illustrate two possible positive messages 88A and 88B and FIGS. 16, 17, and 18 illustrate three possible error messages 88C, 88D, and 88E. In particular, FIG. 14 illustrates a roll delivered message 88A, which includes a message 90A; FIG. 15 illustrates an order complete message 88B, which includes a message 90B; FIG. 16 illustrates an incorrect product pick up error message 88C, which includes an error message 90C; and FIG. 17 illustrates an incorrect bay message 88D, which includes an error message 90D. FIG. 18 illustrates a connection loss error message 88E, which includes an error message 90E and an error title 92E. As discussed above, the RFID reader 20 queries the tracking application 36 when the RFID reader 20 locks onto (i.e., reads or pings) only one product 13 and, in the process of implementing an order, the forklift operator may pick up and deliver a correct product 13, pick up and deliver a correct 13 product that completes a particular job, inadvertently pick up an incorrect product 13 for the particular order that is being implemented, or inadvertently pick up a correct product 13, but deliver the correct product 13 to an incorrect bay 16. If the RFID reader 20 queries the tracking application 36 when a product 13 is dropped off and the analysis determines that a correct product 13 has been dropped off, the tracking application 36 may signal the user interface device 23 to display on the display screen 50 the roll delivered message 88A, thereby alerting the forklift operator that the correct product was delivered. If the RFID reader 20 queries the tracking application 36 when a product 13 is dropped off and the analysis determines that a product that has just been dropped off is the last product 13 required to fulfill the order, the tracking application 36 may signal the user interface device 23 to display on the display screen 50 the order complete message 88B, thereby alerting the forklift operator that the particular order is complete. Similarly, if the RFID reader 20 queries the tracking application 36 when a new product 13 is picked up and the analysis determines that an incorrect product 13 has been picked up, the tracking application 36 may signal the user interface device 23 to display on the display screen 50 the incorrect product pick up error message 88C, thereby alerting the forklift operator that a mistake has been made. If the RFID reader 20 queries the tracking application 36 when a new product 13 is en route to be dropped off at a particular bay 16 and the analysis determines that the forklift operator is at an incorrect bay 16, the tracking application 36 may signal the user interface device 23 to display on the display screen 50 the incorrect bay error message 88D, thereby alerting the forklift operator that a mistake has been made. It is important to note that if a forklift operator ignores the incorrect product pick up error message 88C or the incorrect bay error message 88D and places a product 13 incorrectly on a truck at a bay 16, the tracking application 36 will not print the final paperwork necessary for the truck driver to complete his load. Such a feature prevents the truck driver from leaving the facility with incorrect products on his or her truck. Finally, if during the use of the inventory tracking and management system a connected device (e.g., the wireless RFID reader 20, the wireless router or gateway 22, wireless communication node 24, etc.) loses connection to the asset tracking and management device 23, product database 27, or tracking application 36, the connected device that lost connection may signal the user interface device 23 to display on the display screen 50 the connection loss error message 88E of FIG. 18.

Figure 19:
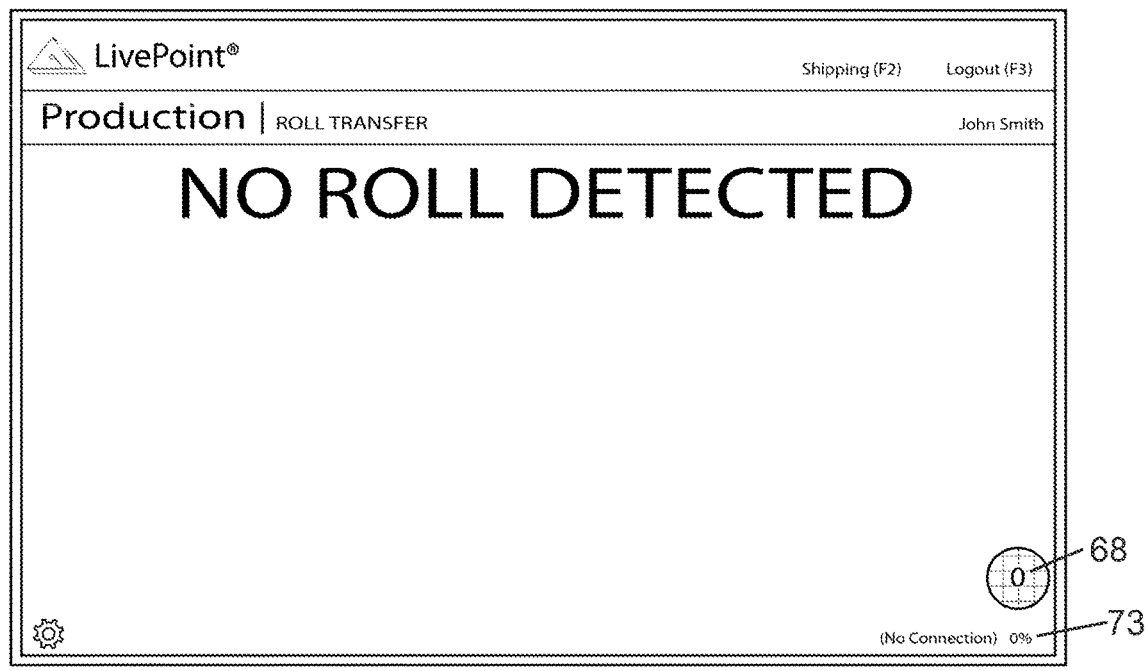
FIG. 19 is an example of a display screen of a user interface device used to move products within a storage facility before picking up a product.
Figure 21:
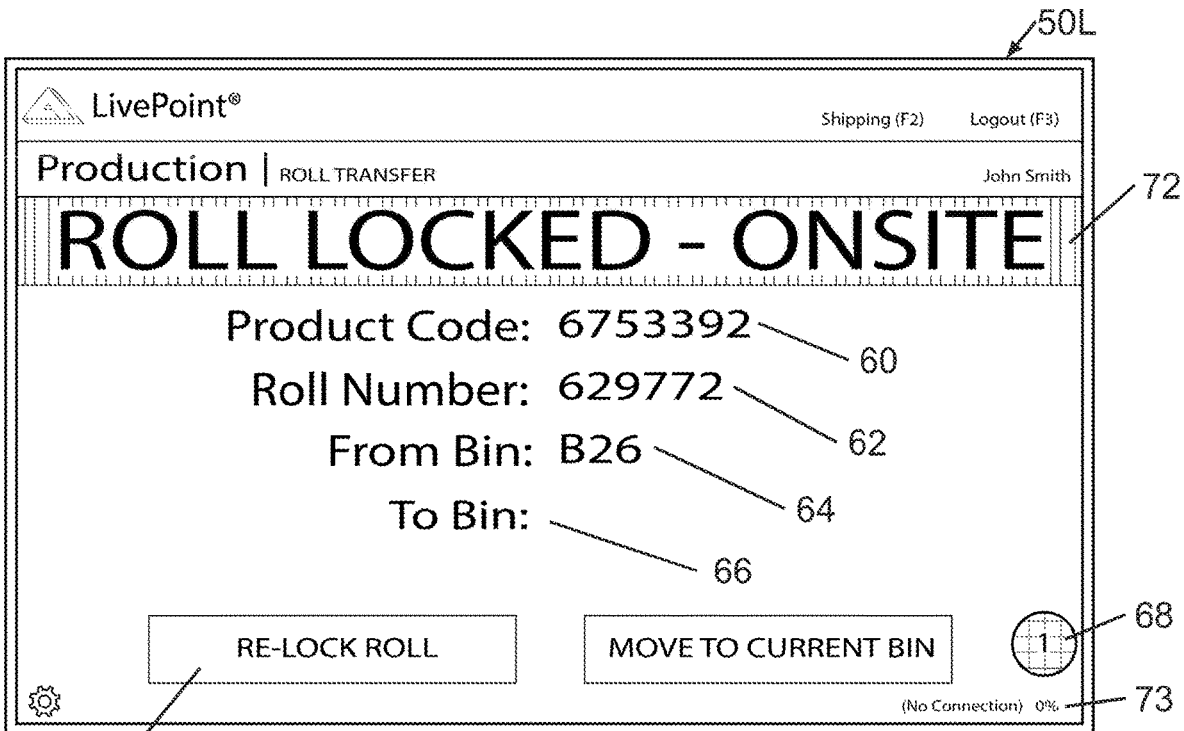
FIG. 21 is an example of a display screen of a user interface device when a radio frequency identification (RFID) reader has locked onto a product.

FIGS. 19-23 illustrate examples of the information displayed to the forklift operator on a display screen 50 of the user interface device 23 when the forklift operator picks up a product prior to, or without, receiving a signal from the tracking application 36 (e.g., the forklift operator is moving a manufactured product into a storage warehouse, the forklift operator is organizing products disposed in a warehouse, etc.). FIG. 19 depicts a display screen 50J of the user interface device 23 displaying a message to the forklift operator that the RFID reader 20, using the antennas 21A-C, does not detect a product 13. FIGS. 20-23 depict a display screen 50K, 50L, 50M, and 50N respectively, of the user interface device 23 displaying the product code 60, a roll number 62 (as in this case the product 13 is a roll of material), the current location of the product 13, a destination of the product 13, an RFID tag counter 68, a re-lock roll option 75, a move to current bin option 71, and a strength of the network connection 73. FIG. 20 also depicts a read number 79, which indicates how many times the RFID reader 20 has read a particular product designation RFID tag 34. Such a feature can be used, for example, as a diagnostic tool to determine the accuracy of the RFID reader 20. The product code 60 and the roll number 62 correlate to the product information stored in the product and order database 27 and may be used by the forklift operator, for example, to determine what bay 14 or shelf 12 the product 13 must be placed in. Similar to the display screens 50C, 50D, 50E, the RFID reader 20 queries the tracking application 36 when the forklift operator picks up the product 13, and the tracking application 36 sends product information from the product and order database 27 to the user interface device 23. Depending on the product 13 picked up by the forklift operator, the tracking application 36 may send different information to the user interface device 23 to be displayed on the display screen 50K, 50L, 50M, and 50N. For example, as depicted in FIG. 21, if the product 13 picked up by the forklift operator is a product that can be shipped, then display screen 50L may display a colored message, for example, a green banner with text, indicating the forklift operator can relocate the product 13 to an area of the facility that other forklift operators are going to, to pick up products 13 to fulfill a delivery. In another example, if the product 13 picked up by the forklift operator is a product that is not to be shipped (e.g., if the product is scrap material, the product still must pass quality control), then the display screen 50M, 50N may display a colored message, e.g., a red banner with text, as illustrated in FIGS. 22 and 23, that instructs the forklift operator to drop off the product 13 at a location within the facility not used to house products for deliveries (e.g., from bay B26 to bay A25, as illustrated in FIG. 21). Additionally, each of the display screens 50J-50N of FIGS. 19-23, may display the strength of the network connection 73 of the user interface device 23 to the network disposed within the facility. This can help forklift operators maintain a strong connection to the network disposed within the facility by alerting them when the connection strength 73 falls below a threshold connection strength.

Figure 25:
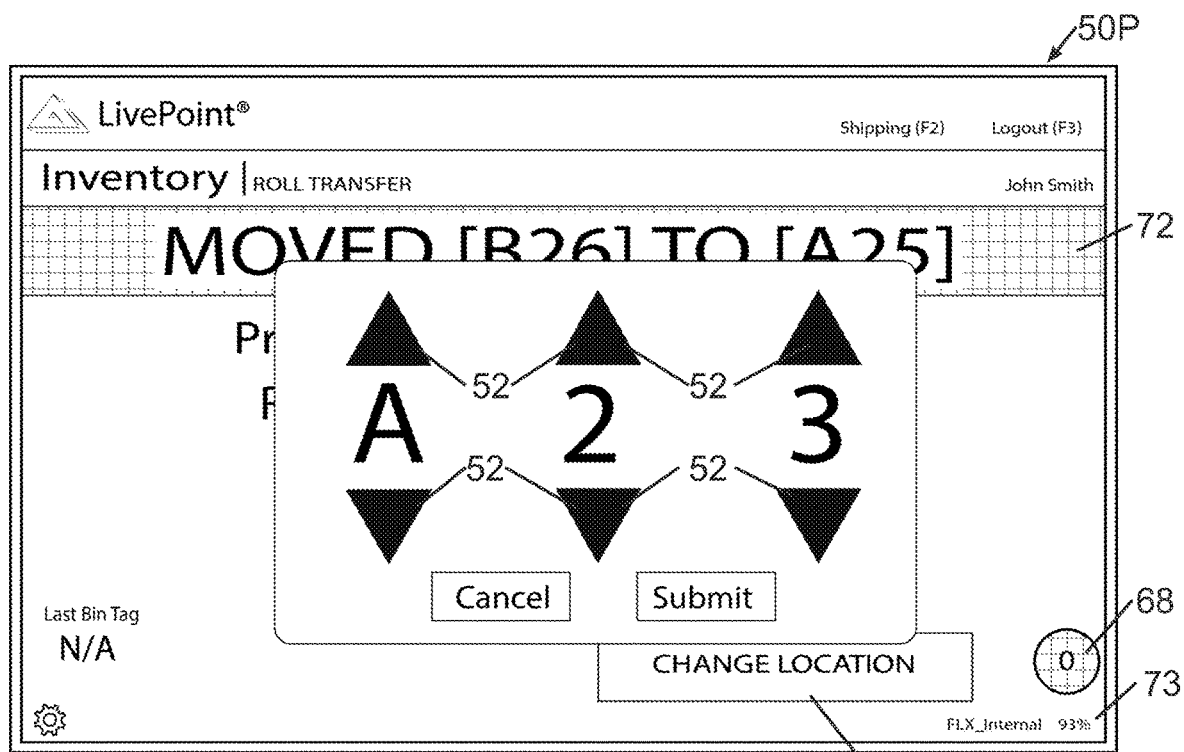
FIG. 25 is an example of a screen display of a user interface device that may be used to manually change or view product location information within a storage facility.

In addition to automatically updating the information about a particular package or product 13 in the product and order database 27 when the product 13 is moved around the environment 10, the tracking system enables a forklift operator to manually modify information about the product 13 stored in the product database 27 through the user interface device 23 as depicted in, for example, FIG. 25. For example, the forklift operator may be driving from one of the loading bays 16 to place a newly delivered product 13 into a particular bay 14. While the forklift operator drives from the loading bay 16 to a particular bay 14, the RFID reader 20 detects the current location of the forklift 18 by observing or detecting the closest or last location designation RFID tag 30 associated with one of the shelves 12 or associated with one of the particular bays 14. However, a signal loss or other signal interference may cause the RFID reader 20 to incorrectly locate the proper location designation RFID tag 30 as the forklift operator drops the product 13 off at the particular bay 14. Additionally, the forklift operator may be dropping off a product 12 in the bay 14 of a shelf 12, which has other shelves 12 and bays 14 around the desired drop off bay 14. While dropping off the product 13 at such a location, it is possible that the RFID reader 20 and the antennas 21A-C read the location designation RFID tag 30 of an adjacent shelf 12 or bay 14 and send incorrect location information to the asset tracking and management device 26 and stored on the product and order database 27. If such an error occurs, the forklift operator may alert a shipping clerk to the mistake or the forklift operator may manually correct the incorrect information stored in the product database 27 directly from the user interface device 23.

Figure 24:
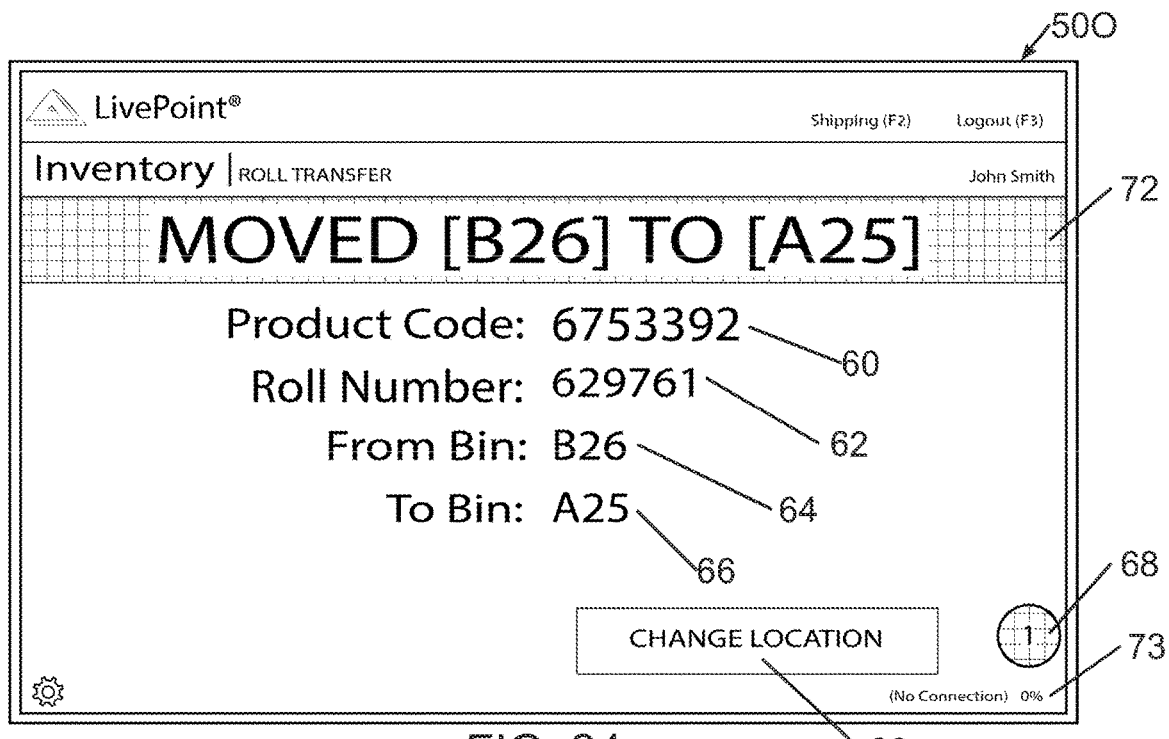
FIG. 24 is an example of a display screen of a user interface device when a product has been moved from one location to a second location.

FIG. 24 depicts a display screen 50O that may be presented on the interface screen 28 of the user interface device 23 to enable the operator to make changes to product locations. In particular, FIG. 24 depicts an example display screen 50O produced by the user interface device 23 when the forklift operator wants to manually change the product location information that is stored in the product database 27 for a particular product 13. The product location information may be stored in the product database 27 using a letter and a number. For example, the letter "A" indicates that the product 13 may be found in column A (or shelf A) and the number "25" indicates that the product may be found in bay 25. Thus, when "A25" is shown on the display screen 50 of the user interface device 23, the forklift operator knows he or she may find the product 13 in bay "25" of column "A". Additionally, if the shelves 12 have multiple rows and a product 13 must be stored on one of the multiple rows, a unique location designation RFID tag 30 may be placed on or near the shelf 12 having multiple rows that would signal to the RFID reader 20 that a particular shelf 12 has multiple rows that could hold a particular product 13. In use, a forklift operator would drive with the product 13 to the shelf 12 indicated on the display screen 50 of the user interface device 23 and when the forklift 18 arrives at the shelf 12, the RFID reader 20, through the use of the multiple antennas 21A-C, reads and detects the unique location designation RFID tag 30. The RFID read 20 then sends a signal to the user interface device 23 indicating that the shelf 12 has multiple rows where a product 13 can be stored. In response, the user interface device 23 displays, via the display screen 50, an additional number that indicates a level, or row, of the shelf 12 at which the product 13 is placed. The forklift operator must select the level, or row, at which the product 13 is place before moving on to another task. For example, if the display 28 of the user interface device 23 shows the product 13 is to be placed on shelf "B23", then the forklift operator knows to navigate to bay 23 in column "B" and, once at the correct shelf 12, the user interface device 23 displays a prompt similar to prompt depicted in FIG. 24, but will also include an additional field with arrows 52 that indicates the particular level, or row, of the shelf 12 the product 13 was placed. However, if such an organizational scheme is desired, additional antennas 21 may need to be placed on the forklift 18 (e.g., the tongs) as well as additional location designation RFID tags 30 may need to be attached to the individual levels of the shelves 12. Additionally, the detection radius of the additional antennas may need to be reduced. It should be understood that various storage and naming schemes may be used based on the particular storage facility or other common practice in the industry.

In any event, in use, the forklift operator may interact with the display screen 50 of the user interface device 23 (e.g., by touching, swiping, or pressing the display screen 50) to modify the location information of the product 13 stored in the product database 27. The type of modification and amount of modification allowable through the user interface device 23 may be tailored to suit the needs of the particular application of the RFID-based tracking system. In particular, the forklift operator may only be allowed to change the information stored when the system detects a drop-off event. Thus, by pressing the change location input 82 depicted in FIG. 23, the forklift operator would navigate to the display 28 shown in FIG. 24 and, for example, press an appropriate one of the arrows 52 for each field of the location information to modify the location information of the product 13 that is stored in the product database 27. After the forklift operator corrects the location information of the product 13 stored in the product database 27, the forklift operator may then interact with the display screen 50 to confirm the modification (e.g., press "submit") or may cancel the modification (e.g., press "cancel").

The user interface device 23 may, in addition to automatically receiving job requests from the asset tracking and management device 26, enable the forklift driver to manually select order requests that are stored on the centralized asset tracker and management device 26 to thereby implement these orders. In particular, the tracking application 36 records each order that needs to be implemented and may assign jobs or orders to forklift drivers as these drivers being their shift, finish an order, etc. FIGS. 26-34 illustrate examples of information that may be shown on the display screen 50Q, 50R, 50S, 50T, 50U, 50V, 50W, 50X, 60Y of the user interface device 23 to manage or implement various orders. Common elements between the figures are shown with common reference numerals.

In particular, FIG. 26 illustrates a summary of pending order information 74, which includes requested product transfers 74A, product transfers in transit 74B, products delivered 74C, customer identification 74D, amount of products available that satisfy a particular order 74E, a dock 74F, trailer truck information 74G, the driver of the truck 74H, a time-stamp of when the order was dispatched 74I, a time-stamp of when a forklift operator began to fulfill an order 74J, and a status of the order 74K, an order ID 76, a job complete input 78, an order details input 81, a create dispatch input 83, and a refresh input 85. In use, the forklift operator may interact with the display screen 50P of the user interface device 23 (e.g., by touching or pressing the display screen 50) to select order requests, find products, receive order details, and complete order requests. As shown in FIG.

26, the display screen 50Q of the user interface device 23 displays pending order information 74 to the forklift operator regarding outstanding or pending orders to be implemented. In particular, the display screen 50Q displays the requested product transfers 74A that are still outstanding for each particular order ID 76, the number of product transfers in transit 74B for a particular order ID 76, products delivered 74C for a particular order ID 76, when the job was dispatched for a particular order ID 76, and when the first forklift operator began to fulfill the job for a particular order ID 76. To ensure that the display screen 50P depicts accurate presentation of information to the forklift operator, the user interface device 23 may be updated in real time, i.e., the centralized asset tracker and management device 26 and the tracking application 36 send updated information to the user interface device 23 as changes to either the number of requested product transfers 74A, the number of product transfers in transit 74B, the number of products delivered 74C, or the number of available products 74E occurs. The forklift operator may interact with the screen 50P in a manner that improves employee efficiency. For example, by having real time information regarding the status of pending order implementations constantly available, the forklift operator may better choose which order implementation needs the most assistance if, for example, a particular order needs to be filled in a more pressing manner than other orders. Once the forklift operator navigates to the desired order to be filled (e.g., by touching or pressing the screen 50P), the operator then selects the order to be filled by, for example, touching or pressing the screen 50P. The displays 50C-50L of FIGS. 12-17, respectively, may then be used to display various information to the operator. For example, the screen 50D of FIG. 13 may be displayed when a product 13 has first been picked up and the screen 50E of FIG. 15 may be displayed when a product 13 has been delivered to the product destination 66. In particular, the display screen 50D of FIG. 13 may display the product information menu 72 in, for example, a green color to alert the forklift driver that they have chosen the correct product. The display screens 50E of FIG. 14 may display the product information menu 72 in, for example, a purple color to alert the forklift driver that he or she has transferred the product 13 to the correct destination (e.g., a trailer truck located at a loading bay 16) successfully.

Figure 28:
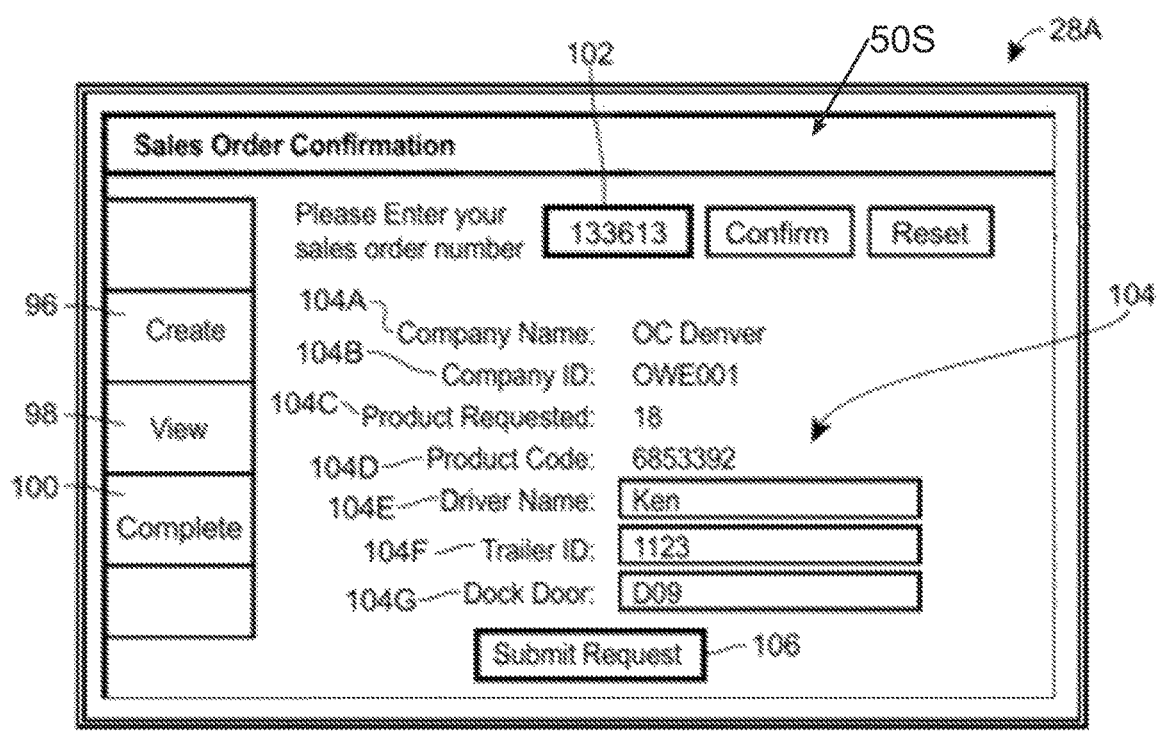
FIG. 28 is an example display screen of a user interface device used to enter or view delivery driver information.
Figure 29:
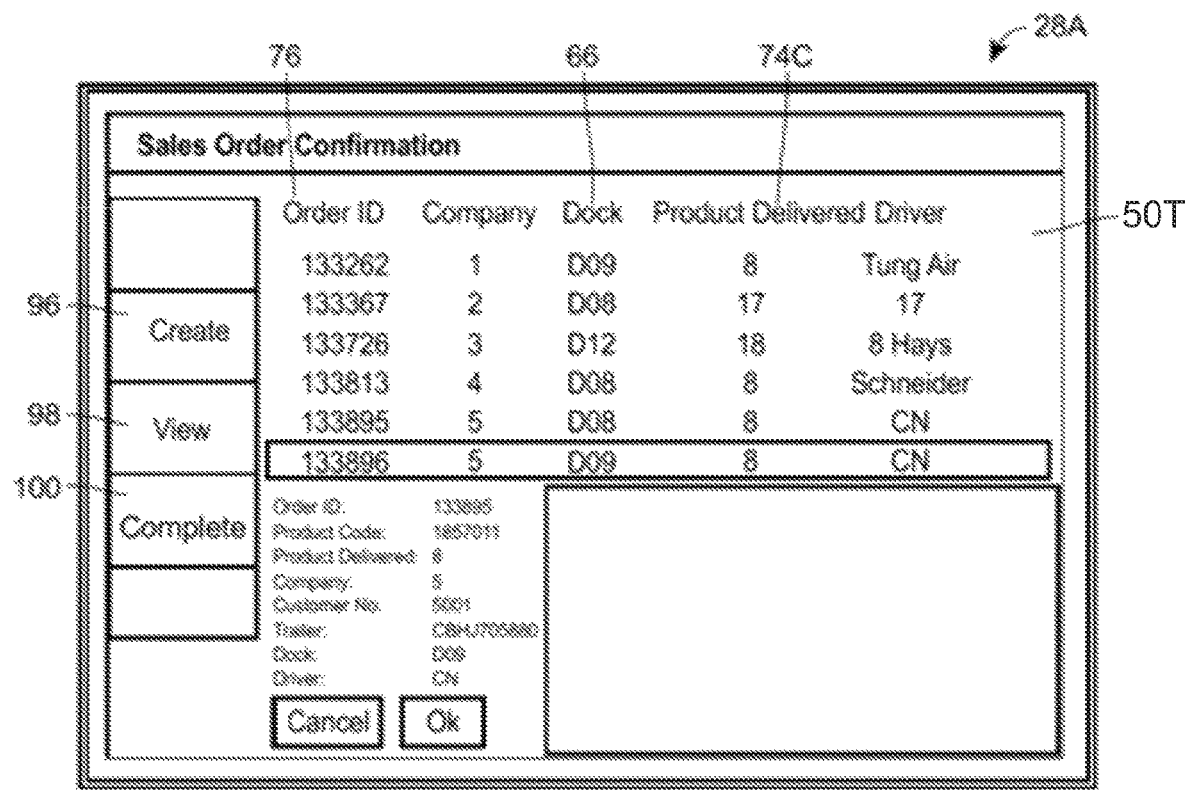
FIG. 29 is an example display screen of a user interface device of a general overview of outstanding orders.

The tracking application 36 may also be used directly by a shipping clerk or an inventory manager for a variety of reasons. In particular, the shipping clerk or inventory manager may use the tracking application 36 to, for example, query the product and order database 27 using a particular order number, to create a new order, to view an existing order, and/or to complete a pending order. The use of the tracking application 36 will be described in reference to FIGS. 27-29, which illustrate various display screens 50R, 50S, 50T that may be displayed on a user interface device 28A. In particular, FIG. 27 illustrates an order selection and input screen or menu which may be presented by the tracking application 36 to enable a user to select or locate an order by order number, for example. FIGS. 28 and 29 also illustrates a create new order input 96 (which when selected, causes the application 36 to enable a user to create a new order), a view order input 98 (which when selected, causes the application 36 to enable a user to view and/or change details of an existing order), a complete order input 100 (which when selected, causes the application 36 to enable a user to manually close or indicate that an order is complete), and an order number input 102 (which indicates the order number for the order). FIG. 28 further illustrates a sales order overview information 104, which includes a company name 104A, a company ID 104B, a product count for a particular order 104C, a product code 104D, a driver name 104E, a trailer ID 104F, and a dock door location 104G. Common elements between the FIGS. 27-29 are depicted using common reference numerals. In use, the tracking application 36 may require the order number 76 (FIG. 26) to be input into the order number input 102, as shown in FIG. 26, which the tracking application 36 may then use to query the product and order database 27. Once the product and order database 27 locates the sales order overview information 104, the product and order database 27 then sends the sales order overview information 104 to the user interface device 28A (which may be an interface connected directly to the computer 26 or which may be connected to the computer 26 via a remote connection). The tracking application 36 may then display the sales overview information 104 on the display screen 50S as shown in FIG. 28. When the sales order overview information 104 is received by the user interface display 28A, some information may be missing and it may be necessary for the sales clerk or inventory manager to manually input that information via an input device, such as a keyboard, a touch screen device, etc. For example, the sales clerk or the inventory manager may input the driver name 104E, the trailer ID 104F, and the dock door 104G (i.e., loading bay 16) into the user interface device 28A as illustrated in FIG. 28. Once the information is input, the sales clerk or the inventory manager may then interact with the display 50 (e.g., by pressing, touching, or using a mouse to click the display 50) to store the new information into the product database 27. In particular, the user interface display 50S may send the driver name 104E, the trailer ID 104F, and the dock door 104G information to the product and order database 27 to be stored. The newly entered information may then be sent to the user interface device 23 of a forklift 18 and displayed on that particular display 23 to be viewed and used by a forklift operator. The newly entered information may also be displayed on the user interface display 50T of the user interface device 28A, as illustrated in FIG. 29. Additionally, the user interface device 50R and 50S of FIGS. 27 and 28, respectively, may allow for the creation of new sales order via section of the input 96, viewing of existing sales orders via the selection of the input 98, and the completion of a sales order via selection of the input 100 once all products for the order have been placed on the truck.

Figure 30:
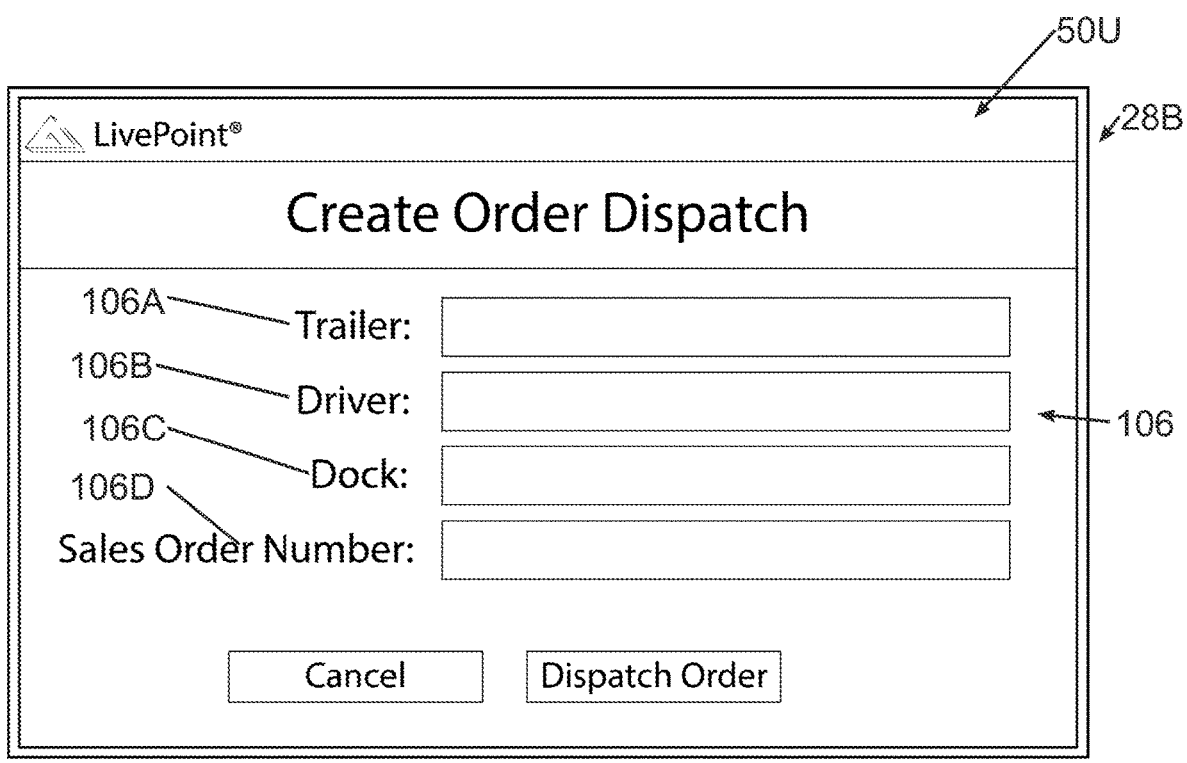
FIG. 30 is an example display screen of a user interface device that may be used to dispatch an order.
Figure 31:
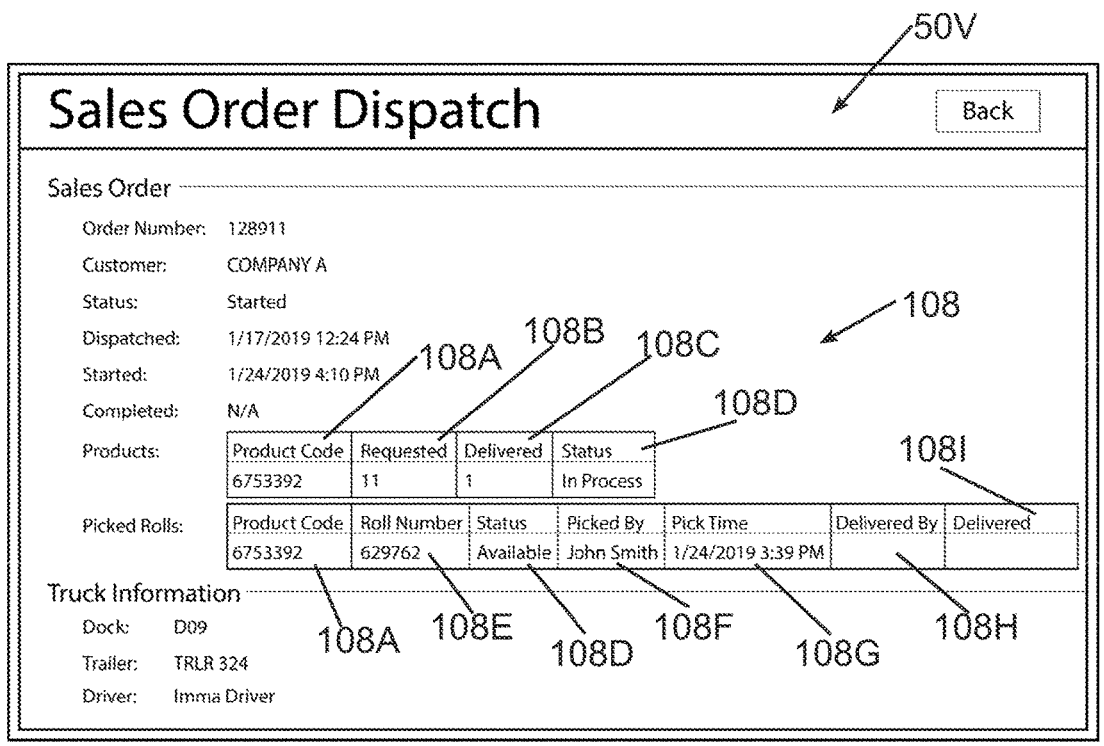
FIG. 31 is an example display screen of a user interface device that may be used to view the progress of an order being currently fulfilled.
Figure 32:
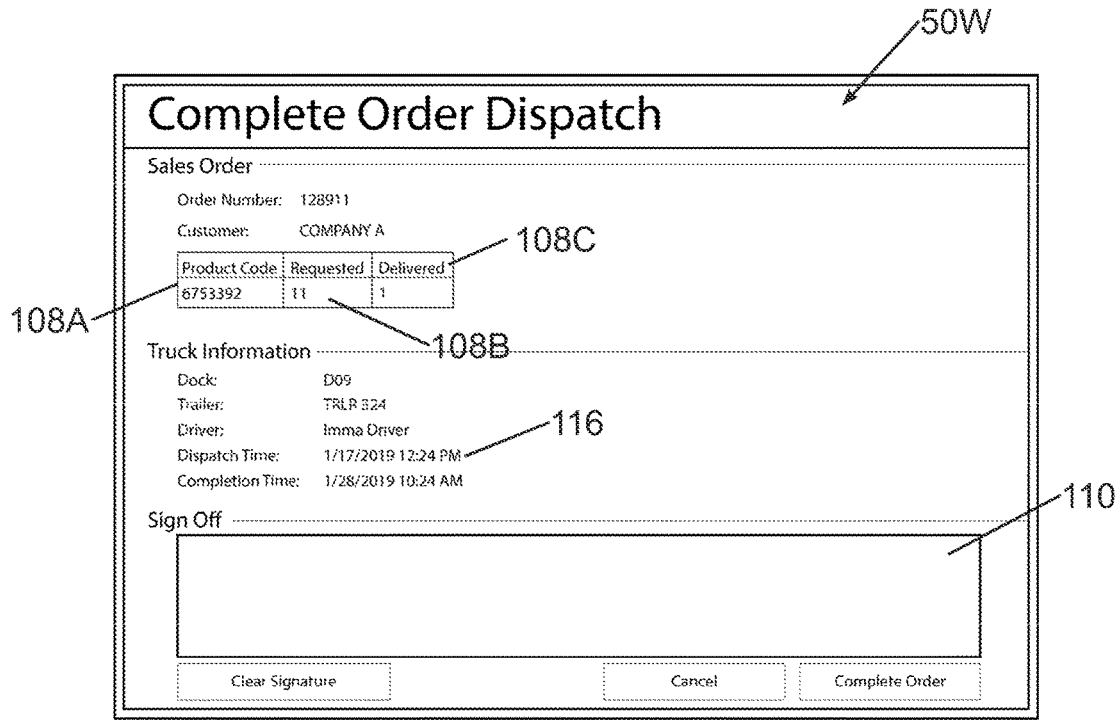
FIG. 32 is an example display screen of a user interface device that may be used to view and complete an order.
Figure 33:
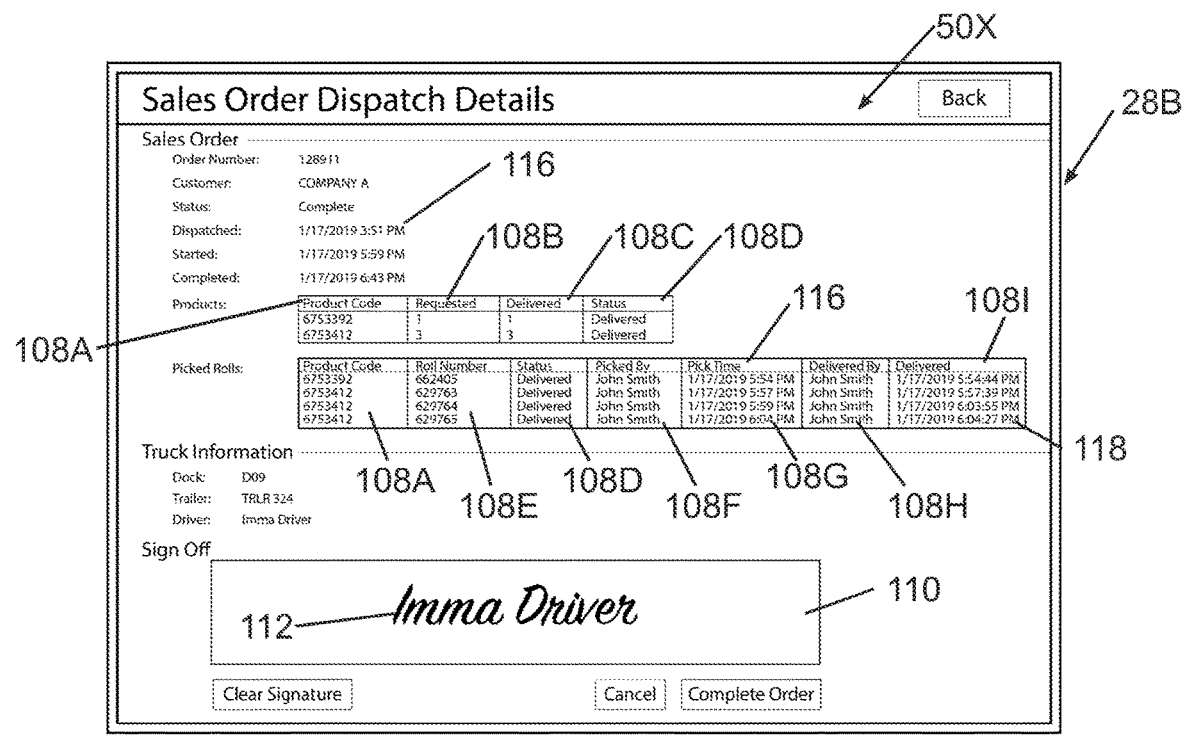
FIG. 33 is an example display screen of a user interface device that may be used to view and complete an order.
Figure 34:
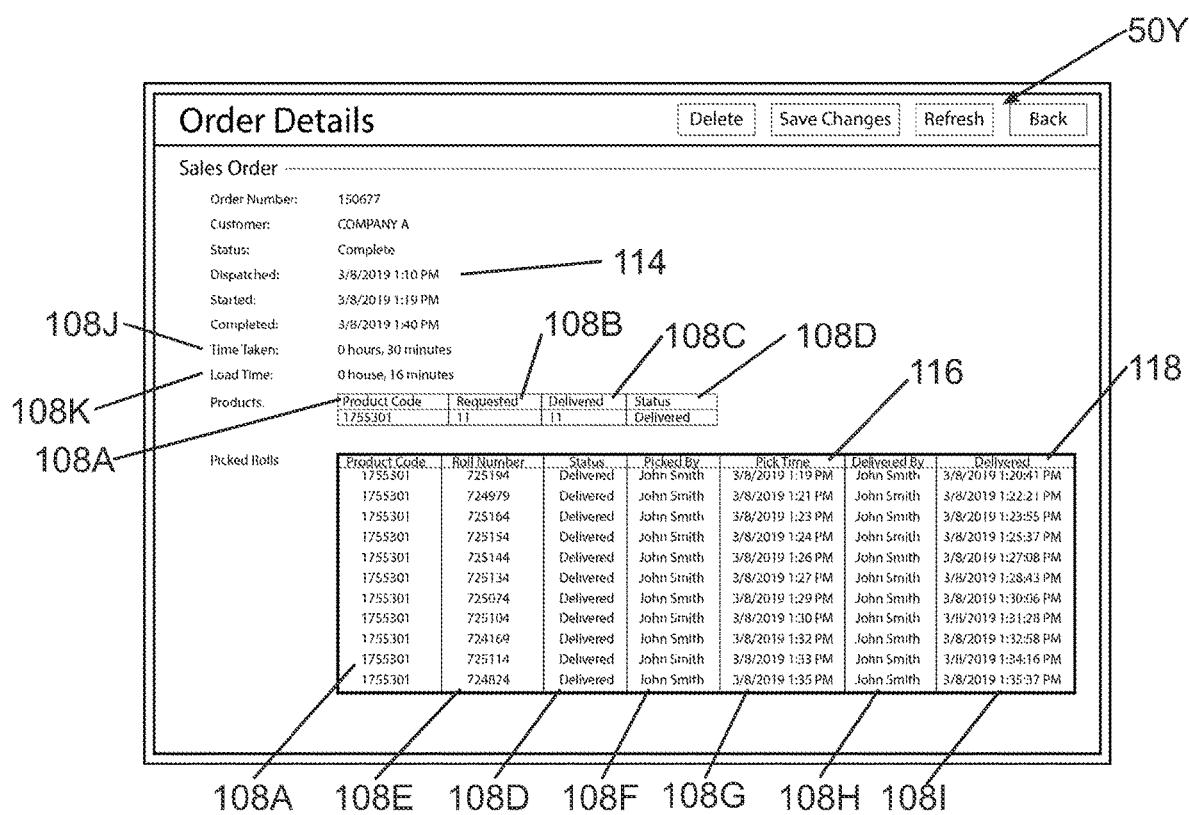
FIG. 34 is an example display screen of a user interface device that may be used to view an order that has been completed.

Moreover, a shipping clerk or an inventory manager may also directly use the tracking application 36 to dispatch an order once a trailer truck has arrived to accept a load of products 13. In particular, the shipping clerk of inventory manager may use the tracking application 36 to, for example, query the product and order database 27 to dispatch a new order to the forklift operators once a trailer truck is ready to be loaded. The use of the tracking application 36 will be described in reference to FIGS. 30-34, which illustrate various display screens 50U, 50V, 50W, 50X, and 50Y that may be displayed on a user interface device 28B. In particular, FIG. 30 illustrates an order dispatch screen or menu which may be displayed by the tracking application 36 to enable a user to dispatch an order once a truck is ready to be loaded with product. FIG. 31 illustrates real-time product information 108, which the tracking application 36 updates as products are delivered; FIG. 32 illustrates an example of a completed order; FIG. 33 illustrates another example of a complete order; and FIG. 34 illustrates an example detailed view of a completed order. FIG. 30 further illustrates order dispatch information 106 which includes a trailer ID 106A, a driver name 106B, a dock door location 106C, and a sales order number 106D. Common elements between the FIGS. 30-34 are depicted using common reference numerals. In use, once the user dispatches an order using the order dispatch information 106, the tracking application 36 may update order information for particular orders in real time by using the received product delivery information 108 from the user interface device 23 and the RFID reader 20 as products 13 are delivered to particular docks, or bays 16. As the tracking application 36 receives the product delivery information 108, the tracking application 36 may display the product delivery information 108 on the display screens 50V-50Y as shown in FIGS. 31-34. In particular, the product delivery information 108 received by the tracking application 36 from the user interface device 20, may include a product code 108A, an amount of product requested 108B, an amount of products actually delivered to the trailer 108C, a status 108D, a roll number 108E (as the product 13 in this example is a roll of material), the name of a forklift operator who picked the product 108F, a time the forklift operator picked the product 108G, the name of forklift operator who delivered the product 108H, and a time the forklift operator delivered the product 108I. It should be noted that the product deliver information 108A-108I is stored in the product and order database 27 of the tracking application 36. Additionally, FIGS. 32 and 33 depict a signature box 110 and FIG. 34 depicts a signature 112 of the truck driver in the signature box 110. In use, prior to the centralized asset tracking and management device 26 printing the final paperwork needed by the truck driver, the driver is required to digitally sign off, which indicates the order has been completed. In particular, the truck driver may digitally sign using a user interface device 23B in a shipping office and a writing utensil capable of interacting with the display screen 50 of the user interface device 23B (e.g., a pen, stylus, driver's finger, etc.). Once signed, the truck driver's signature 112 is stored in the product and order database 27, which may be later referenced by a shipping clerk or other user of the tracking application 36.

FIG. 34 further illustrates additional product delivery information 108 that includes a time taken to complete the order 108J and a time taken to load all the products on the trailer 108K. The tracking application 36 calculates the time taken to complete the order 108J on a processor of the centralized asset tracking and management device 26 by calculating the difference in time between when the order was first dispatched and when the forklift operator completed the order. In particular, when the tracking application 36 dispatches an order, a time-stamp 114 is associated with the particular dispatch and the time-stamp 114 is stored in the product and order database 27. Similarly, each time a product is picked up and subsequently dropped off, a pick up time-stamp 116 and a drop off time-stamp 118 are recorded and stored in the product and order database 27 by the tracking application 36. Thus, the tracking application 36 can calculate the difference between the dispatch time-stamp 114 and the final drop off time-stamp 118 to determine the total time taken to complete the order 108J. Similarly, the tracking application 36 can determine the amount of time taken to load all the products on the trailer 108J in a similar manner. In particular, the tracking application 36 can, for example, calculate the difference, using the processor of the centralized asset tracking and management device 26, between the first pick up time-stamp 116 and the final drop off time-stamp 118 to determine the time taken to load the products on the trailer 108J.

The disclosed asset management and tracking system, when used in a facility having a product designation RFID tag disposed on a product and at least one location designation RFID tag, tracks products within the facility and ensures that products are placed in the correct location within the facility and/or delivered to the correct dock door. Importantly, the asset management and tracking system provides various forms of protection against products being lost within a facility and/or against products being delivered to incorrect transportation vehicles. The system may alert an individual, via a user interface device, if an incorrect product is picked up from a shelf or a bay of a shelf. The system may also alert an individual, via a user interface device, when a product is delivered to an incorrect dock door. The system may also prevent final paperwork from being processed and printed. In other words, the disclosed system provides various forms of protection that include alerting an individual transporting the product(s) around the facility and preventing a driver from receiving necessary paperwork if a truck, or other transportation vehicle, contains any incorrect products.

The invention claimed is:

1. An asset management and tracking system for use in a facility having a product designation radio frequency identification (RFID) tag attached to a product disposed within the facility, the product designation RFID tag including product information, the system comprising:
   at least one location designation radio frequency identification (RFID) tag disposed within the facility and including location information, the location designation RFID tag comprising:
       an inlay having an antenna, an integrated circuit, and a substrate, the antenna and the integrated circuit being disposed on the substrate;
       a first layer disposed on a first side of the inlay, the first layer having a first thickness; and
       a second layer disposed on a second side of the inlay, the second layer having a second thickness;
   a radio frequency identification (RFID) reader configured to read at least one of the product designation RFID tag and the at least one location designation RFID tag, the RFID reader being mounted to a movable device such that the RFID reader is perpendicular to the at least one location designation RFID tag; and
   a portable communication device configured to receive product information from and transmit product information to an asset tracking and management device, the portable communication device being communicatively coupled to the RFID reader and mounted on a movable device; wherein, the RFID reader is configured to transmit the product information read from the product designation RFID tag and the location information read from the location designation RFID tag to the portable communication device; and
   wherein, the portable communication device is configured to transmit the received product information and the received location information to the asset tracking and management device and configured to query the asset tracking and management device for additional product information and additional location information for the product.

2. The system of claim 1, wherein the portable communication device is configured to transmit the received product information after the RFID reader locks onto one product designation RFID tag.

3. The system of claim 1, further comprising a product detection device configured to detect a product disposed within a detection radius via a sensor.

4. The system of claim 1, further comprising at least one antenna disposed on the movable device, the at least one antenna configured to read and detect at least one of the product designation RFID tag and the at least one location designation RFID tag in response to a signal from the RFID reader.

5. The system of claim 4, wherein a first antenna of the at least one antenna is oriented in a first direction and a second antenna of the at least one antenna is oriented in a second direction.

6. The system of claim 1, further comprising a network communication device disposed proximate the product detection device and the RFID reader, the network communication device communicatively coupling the RFID reader to a wireless network.

7. The system of claim 6, wherein the portable communication device is communicatively coupled to the network communication device.

8. The system of claim 1, wherein the portable communication device is a user interface device.

9. The system of claim 1, wherein the portable communication device comprises:
a remote tracking and communication application stored on a memory of and executed on a processor of the portable communication device, the remote tracking application communicatively coupled to the RFID reader and the asset tracking and management device.

10. The system of claim 1, wherein the asset tracking and management device comprises:
a centralized tracking and management application stored on a memory of and executed on a processor of the asset tracking and management device, the centralized tracking and management application communicatively coupled to a wireless network disposed within the facility; and
a product and order database stored on the memory of the asset tracking and management device.

11. The system of claim 10, wherein the remote tracking and communication application queries the centralized tracking and management application via the wireless network and wherein the centralized tracking and management application queries the product and order database.

12. The system of claim 1, wherein the movable device is a product transportation vehicle.

13. The system of claim 12, wherein the product transportation vehicle is a forklift.

14. The system of claim 1, wherein the RFID reader is configured to read at least one of the product designation RFID tag and the at least one location designation RFID tag using at least one antenna.

15. The system of claim 1, wherein the RFID reader is releasably mounted to the movable device.

16. The system of claim 1, wherein the RFID reader is mounted to the movable device via a plate and a shock absorbing material, the shock absorbing material being disposed between the plate the movable device.

17. The system of claim 1, wherein the first thickness is between 0.10 and 0.30 inch and the second thickness is between 0.10 and 0.30 inch.

18. The system of claim 1, wherein the first thickness is approximately 0.1095 inch and the second thickness is approximately 0.1095 inch.

19. The system of claim 1, wherein a first location designation RFID tag of the at least one location designation RFID tag is disposed at least 12 inches from a second location designation RFID tag of the at least one location designation RFID tag.

20. An asset management and tracking system for use in a facility, the system comprising:
at least one location designation radio frequency identification (RFID) tag disposed at various locations within the facility and including location information, the location designation RFID tag comprising:
an inlay having an antenna, an integrated circuit, and a substrate, the antenna and the integrated circuit being disposed on the substrate;
a first layer disposed on a first side of the inlay, the first layer having a first thickness; and
a second layer disposed on a second side of the inlay, the second layer having a second thickness;
a radio frequency identification (RFID) reader configured to read at least one of the at least one location designation RFID tag and a product designation radio frequency identification (RFID) tag, the RFID reader communicatively coupled to a set of antennas;
an asset tracking and management device, comprising:
a centralized tracking and management application stored on a memory of and executed on a processor of the asset tracking and management device; and
a product and order data base stored on the memory of the asset tracking and management device; and
a portable communication device configured to receive information from and transmit information to the asset tracking and management device, the portable communication device comprising:
a remote tracking and communication application stored on a memory of and executed on a processor of the portable communication device, the remote tracking application configured to communicate with the centralized tracking and management application and the RFID reader;
wherein, the remote tracking and communication application is further configured to query the centralized tracking and management application for product information and product location information; and
wherein, the centralized tracking and management application is further configured to query the product and order data based in response to the query from the remote tracking and communication application.

21. The system of claim 20, further comprising a product detection device configured to detect a product disposed within a detection radius of the product detection device.

22. The system of claim 21, wherein the RFID reader activates at least one antenna in the set of antennas in response to the product detection device detecting the product.

23. The system of claim 21, wherein the RFID reader is configured to activate a product facing antenna of the set of antennas in response to the product detection device detecting the product.

24. The system of claim 20, wherein the set of antennas is disposed on a movable device, the set of antennas configured to read and detect the at least one of the at least one location designation RFID tag and the product designation RFID tag in response to a signal from the RFID reader.

25. The system of claim 20, wherein a first antenna of the set of antennas is oriented in a first direction and a second antenna of the set of antennas is oriented in a second direction different from the first direction, at least one of the first direction and the second direction being perpendicular to the at least on location designation RFID tag.

26. The system of claim 20, wherein the remote tracking application is configured to query the centralized application after the RFID reader locks onto one of the product designation RFID tags.

27. The system of claim 20, further comprising a network communication device configured to communicate with at least one wireless node disposed within the facility, the network communication device communicatively coupling the RFID reader and a wireless network disposed within the facility.

28. The system of claim 20, wherein the product detection device, the RFID reader, and the wireless communication device are disposed on a movable device.

29. The system of claim 28, wherein the movable device is a product transportation vehicle.

30. The system of claim 29, where in the product transportation vehicle is a forklift.

31. The system of claim 20, wherein the product designation RFID tag is disposed on the product.

32. The system of claim 20, wherein the inlay includes a length between 2 to 10 inches and a width between 0.10 to 10 inches.

33. The system of claim 32, wherein the inlay includes a length between 3 to 4 inches and a width between 0.10 to 1 inch.

34. The system of claim 20, wherein the location designation RFID tag has a length in a first direction, a width in a second direction that is perpendicular to the first direction, and a thickness in a third direction that is perpendicular to the first and second direction,
wherein the length is between 2 and 10 inches, the width is between 0.5 and 5 inches, and the thickness is between 0.10 and 0.30 inches.

35. The system of claim 20, wherein a first location designation RFID tag of the at least one location designation RFID tag is disposed at least 12 inches from a second location designation RFID tag of the at least one location designation RFID tag.

36. A method of asset tracking and management in a facility having at least one product designation radio frequency identification (RFID) tag disposed within the facility, the RFID tag having product information, the method comprising:
providing at least one location designation radio frequency identification (RFID) tag having an inlay including an antenna, an integrated circuit, and a substrate, the antenna and the integrated circuit being disposed on the substrate, a first layer disposed on a first side of the inlay, the first layer having a first thickness, and a second layer disposed on a second side of the inlay;
acquiring a product disposed within the facility;
reading, via a radio frequency identification (RFID) reader, the product designation RFID tag and the at least one location designation RFID tag disposed within the facility;
transmitting, via the RFID reader, the read product information from the product designation RFID tag and location information from the at least one location designation RFID tag to a portable communication device, the portable communication device configured to transmit product information and location information to and receive product information and location information from an asset tracking and management device;
querying, via the portable communication device, the asset tracking and management device to receive stored product information and location information, the stored product information and the stored location information being stored on a product and order database of the asset tracking and management device;
comparing, via a processor of the asset tracking and management device, the read product information to the stored product information;
comparing, via the processor of the asset tracking and management device, the read location information to the stored location information;
generating, via the asset tracking and management device, a comparison signal and transmitting the comparison signal to the portable communication device, the comparison signal having at least one of product identification information and product destination information;
displaying, via the portable communication device, the product identification information and the product destination information.

37. The method of claim 36, further comprising:
detecting the acquired product, via a product detection device, the product detection device including a sensor configured to detect the product disposed within a detection radius;
transmitting, via the product detection device, a detection signal to the RFID reader in response to detecting the product disposed within the detection radius.

38. The method of claim 37, further comprising activating at least one antenna, via the RFID reader, in response to receiving the detection signal.

39. The method of claim 36, wherein querying the asset tracking and management device further comprises querying the asset tracking and management device after the RFID reader locks onto one location designation RFID tag.

40. The method of claim 36, wherein acquiring the product disposed within the facility further comprises acquiring the product disposed within the facility using a movable device.

41. The method of claim 40, wherein acquiring the product disposed within the facility using the movable device further comprising acquiring the product disposed within the facility using a product transportation vehicle.

42. The method of claim 41, wherein acquiring the product disposed within the facility using the product transportation vehicle further comprising acquiring the product disposed within the facility using a forklift.

43. A method of asset tracking and management in a facility having at least one product designation radio frequency identification (RFID) tag and a product disposed within the facility, the method comprising:
receiving, at a portable communication device, a request signal having product identification information, product location information, and product destination information;
displaying, via the portable communication device, the product identification information, the product location information, and the product destination information;
acquiring the product, via a movable device, in response to receiving the request signal;
reading, via a radio frequency identification (RFID) reader, the product designation RFID tag disposed on the product and at least one location designation radio frequency identification (RFID) tag, the location designation RFID tag being disposed in various locations within the facility;
transmitting, via the RFID reader, product information from the read product designation RFID tag and location information from the at least one location designation RFID tag to the portable communication device, the portable communication device configured to receive product information and location information from and transmit product information and location information to an asset tracking and management device;

querying, via the portable communication device, the asset tracking and management device to compare the read product information from the product designation RFID tag and the location information from the at least one location designation RFID tag to the product identification information and location information sent in the request signal;

displaying, via the portable communication device, a result of comparing the product information from the read product designation RFID tag and the location information from the at least one location designation RFID tag to the product identification information and the location information sent in the request signal.

44. The method of claim 43, further comprising:
generating, via the asset tracking and management device, the request signal; and
transmitting, via the asset tracking and management device, the request signal to the portable communication device.

45. The method of claim 43, further comprising:
detecting, via a product detection device, a pick up event when the product is acquired in response to the request signal, the product detection device including a sensor configured to detect the product.

46. The method of claim 43, further comprising:
transmitting, via the product detection device, a detection signal to the RFID reader in response to detecting the product.

47. The method of claim 46, wherein reading, via the RFID reader, the RFID tag disposed on the product further comprises reading, via the RFID reader, the RFID tag disposed on the product in response to receiving the detection signal from the product detection device.

48. The method of claim 47, wherein generating the request signal further comprises requesting the product information, the product location information, and the product destination information from a product and order database stored on a memory of the asset tracking and management device.

49. The method of claim 47, further comprising displaying an error message, via the portable communication device, when the read product information is different from the product information sent in the request signal.

50. An asset management and tracking system for use in a facility having a product designation radio frequency identification (RFID) tag attached to a product disposed within the facility, the product designation RFID tag including product information, the system comprising:
at least one location designation radio frequency identification (RFID) tag disposed within the facility and including location information;
a product detection device configured to detect a product disposed within a detection radius;
a radio frequency identification (RFID) reader configured to read at least one of the product designation RFID tag and the at least one location designation RFID tag, the RFID reader being mounted to a movable device such that the RFID reader is perpendicular to the at least one location designation RFID tag; and a portable communication device configured to receive product information from and transmit product information to an asset tracking and management device, the portable communication device being communicatively coupled to the RFID reader and mounted on a movable device; wherein, the RFID reader is configured to transmit the product information read from the product designation RFID tag and the location information read from the location designation RFID tag to the portable communication device; and
wherein, the portable communication device is configured to transmit the received product information and the received location information to the asset tracking and management device and configured to query the asset tracking and management device for additional product information and additional location information for the product.

51. The system of claim 50, wherein the portable communication device is configured to transmit the received product information after the RFID reader locks onto one product designation RFID tag.

52. The system of claim 50, wherein the product detection device is a weight sensor, the weight sensor configured to measure a weight of the product disposed within the detection radius.

53. The system of claim 52, wherein the weight sensor is configured to measure a first weight of the product at a first time and a second weight of the product at a second time, after the first time,
wherein the portable communication device is configured to transmit the first weight and the second weight to the asset tracking and management device.

54. The system of claim 53, wherein the asset tracking and management device is configured to determine a difference a third weight based on the received first weight and the received second weight, the third weight being the difference between the first weight and the second weight.

55. The system of claim 50, further comprising at least one antenna disposed on the movable device, the at least one antenna configured to read and detect at least one of the product designation RFID tag and the at least one location designation RFID tag in response to the product detection device detecting the product.

56. The system of claim 55, wherein a first antenna of the at least one antenna is oriented in a first direction and a second antenna of the at least one antenna is oriented in a second direction.

57. The system of claim 50, further comprising a network communication device disposed proximate the product detection device and the RFID reader, the network communication device communicatively coupling the RFID reader to a wireless network.

58. The system of claim 57, wherein the portable communication device is communicatively coupled to the network communication device.

59. The system of claim 50, wherein the portable communication device is a user interface device.

60. The system of claim 50, wherein the portable communication device comprises:
a remote tracking and communication application stored on a memory of and executed on a processor of the portable communication device, the remote tracking application communicatively coupled to the RFID reader and the asset tracking and management device.

61. The system of claim 50, wherein the asset tracking and management device comprises:

a centralized tracking and management application stored on a memory of and executed on a processor of the asset tracking and management device, the centralized tracking and management application communicatively coupled to a wireless network disposed within the facility; and a product and order database stored on the memory of the asset tracking and management device.

62. The system of claim 61, wherein the remote tracking and communication application queries the centralized tracking and management application via the wireless network and wherein the centralized tracking and management application queries the product and order database.

63. The system of claim 50, wherein the product transportation vehicle is a forklift.

64. The system of claim 50, wherein the RFID reader is mounted to the movable device via a plate and a shock absorbing material, the shock absorbing material being disposed between the plate the movable device.

* * * * *